US008339379B2

(12) United States Patent
Goertz et al.

(10) Patent No.: US 8,339,379 B2
(45) Date of Patent: Dec. 25, 2012

(54) LIGHT-BASED TOUCH SCREEN

(75) Inventors: Magnus Goertz, Lidingo (SE); Thomas Eriksson, Stocksund (SE); Joseph Shain, Rehovot (IL)

(73) Assignee: Neonode Inc., Santa Clara, CA (US)

( * ) Notice: Subject to any disclaimer, the term of this patent is extended or adjusted under 35 U.S.C. 154(b) by 602 days.

(21) Appl. No.: 12/371,609

(22) Filed: Feb. 15, 2009

(65) Prior Publication Data
US 2009/0189878 A1 Jul. 30, 2009

Related U.S. Application Data

(63) Continuation-in-part of application No. 10/494,055, filed on Apr. 29, 2004, now Pat. No. 7,880,732.

(51) Int. Cl.
*G06F 3/042* (2006.01)
(52) U.S. Cl. .................... 345/175; 345/156; 345/173
(58) Field of Classification Search ............ 345/156, 345/173, 175
See application file for complete search history.

(56) References Cited

U.S. PATENT DOCUMENTS

| 4,243,879 A | 1/1981 | Carroll et al. |
| 4,301,447 A | 11/1981 | Funk et al. |
| 4,518,249 A | 5/1985 | Murata et al. |
| 4,550,250 A | 10/1985 | Mueller et al. |
| 4,703,316 A | 10/1987 | Sherbeck |
| 4,710,760 A | 12/1987 | Kasday |
| 4,782,328 A * | 11/1988 | Denlinger .................. 341/5 |
| 4,847,606 A | 7/1989 | Beiswenger |
| 4,880,969 A | 11/1989 | Lawrie |
| 5,036,187 A | 7/1991 | Yoshida et al. |
| 5,119,079 A * | 6/1992 | Hube et al. .................... 715/823 |

(Continued)

FOREIGN PATENT DOCUMENTS

EP 0330767 A1 10/1993
(Continued)

OTHER PUBLICATIONS

Hodges, S., Izadi, S., Butler, A., Rrustemi, A., and Buxton, B., ThinSight: Versatile Multi-Touch Sensing for Thin Form-Factor Displays, UIST'07, Oct. 7-10, 2007.

*Primary Examiner* — Bipin Shalwala
*Assistant Examiner* — Afroza Chowdhury
(74) *Attorney, Agent, or Firm* — Soquel Group LLC

(57) ABSTRACT

A light-based touch screen, including a housing for a display screen, a plurality of infra-red light emitting diodes (LEDs), fastened on the housing, for generating light beams, at least one LED selector, fastened on the housing and connected with the plurality of LEDs, for controllably selecting and deselecting one or more of the plurality of LEDs, a plurality of photodiode (PD) receivers, fastened on the housing, for measuring light intensity, at least one PD selector, fastened on the housing and connected with the plurality of PD receivers, for controllably selecting and deselecting one or more of the plurality of PD receivers, an optical assembly, fastened on the housing, for projecting light beams emitted by the plurality of LEDs in substantially parallel planes over the housing, and a controller, fastened on the housing and coupled with the plurality of PD receivers, (i) for controlling the at least one LED selector, (ii) for controlling the at least one PD selector, and (iii) for determining therefrom position and velocity of an object crossing at least one of the substantially parallel planes, based on output currents of the plurality of PD receivers.

39 Claims, 47 Drawing Sheets

U.S. PATENT DOCUMENTS

| | | | |
|---|---|---|---|
| 5,162,783 A | 11/1992 | Moreno | |
| 5,179,369 A | 1/1993 | Person et al. | |
| 5,194,863 A | 3/1993 | Barker et al. | |
| 5,220,409 A * | 6/1993 | Bures | 356/621 |
| 5,414,413 A | 5/1995 | Tamaru et al. | |
| 5,559,727 A | 9/1996 | Deley et al. | |
| 5,577,733 A * | 11/1996 | Downing | 273/348 |
| 5,579,035 A | 11/1996 | Beiswenger | |
| 5,603,053 A | 2/1997 | Gough et al. | |
| 5,729,250 A | 3/1998 | Bishop et al. | |
| 5,785,439 A | 7/1998 | Bowen | |
| 5,825,352 A * | 10/1998 | Bisset et al. | 345/173 |
| 5,838,308 A * | 11/1998 | Knapp et al. | 345/173 |
| 5,889,236 A | 3/1999 | Gillespie et al. | |
| 5,914,709 A | 6/1999 | Graham et al. | |
| 5,936,615 A | 8/1999 | Waters | |
| 5,943,043 A | 8/1999 | Furuhata et al. | |
| 5,988,645 A * | 11/1999 | Downing | 273/348 |
| 6,010,061 A | 1/2000 | Howell | |
| 6,091,405 A * | 7/2000 | Lowe et al. | 345/175 |
| 6,323,846 B1 | 11/2001 | Westerman et al. | |
| 6,346,935 B1 * | 2/2002 | Nakajima et al. | 345/173 |
| 6,359,632 B1 | 3/2002 | Eastty et al. | |
| 6,362,468 B1 * | 3/2002 | Murakami et al. | 250/221 |
| 6,421,042 B1 | 7/2002 | Omura et al. | |
| 6,429,857 B1 | 8/2002 | Masters et al. | |
| 6,570,557 B1 | 5/2003 | Westerman et al. | |
| 6,677,932 B1 | 1/2004 | Westerman | |
| 6,690,365 B2 | 2/2004 | Hinckley et al. | |
| 6,803,906 B1 | 10/2004 | Morrison et al. | |
| 6,836,367 B2 * | 12/2004 | Seino et al. | 359/618 |
| 6,857,746 B2 | 2/2005 | Dyner | |
| 6,864,882 B2 | 3/2005 | Newton | |
| 6,888,536 B2 | 5/2005 | Westerman et al. | |
| 6,944,557 B2 * | 9/2005 | Hama et al. | 702/66 |
| 6,947,032 B2 | 9/2005 | Morrison et al. | |
| 6,954,197 B2 | 10/2005 | Morrison et al. | |
| 6,958,749 B1 | 10/2005 | Matsushita et al. | |
| 6,972,401 B2 | 12/2005 | Akitt et al. | |
| 6,992,660 B2 | 1/2006 | Kawano et al. | |
| 7,030,861 B1 | 4/2006 | Westerman et al. | |
| 7,133,032 B2 | 11/2006 | Cok | |
| 7,176,905 B2 * | 2/2007 | Baharav et al. | 345/175 |
| 7,184,030 B2 * | 2/2007 | McCharles et al. | 345/173 |
| 7,232,986 B2 * | 6/2007 | Worthington et al. | 250/221 |
| 7,254,775 B2 * | 8/2007 | Geaghan et al. | 715/701 |
| RE40,153 E | 3/2008 | Westerman et al. | |
| 7,339,580 B2 | 3/2008 | Westerman et al. | |
| 7,352,940 B2 | 4/2008 | Charters et al. | |
| 7,355,594 B2 * | 4/2008 | Barkan | 345/173 |
| 7,369,724 B2 | 5/2008 | Deane | |
| 7,372,456 B2 | 5/2008 | McLintock | |
| 7,429,706 B2 * | 9/2008 | Ho | 178/18.01 |
| 7,464,110 B2 | 12/2008 | Pyhälammi et al. | |
| 7,469,381 B2 | 12/2008 | Ording | |
| 7,479,949 B2 | 1/2009 | Jobs et al. | |
| 7,633,300 B2 | 12/2009 | Keroe et al. | |
| 7,663,607 B2 | 2/2010 | Hotelling et al. | |
| 7,812,828 B2 | 10/2010 | Westerman et al. | |
| 7,855,716 B2 * | 12/2010 | McCreary et al. | 345/173 |
| 8,022,941 B2 * | 9/2011 | Smoot | 345/175 |
| 8,120,625 B2 | 2/2012 | Hinckley | |
| 2002/0109843 A1 | 8/2002 | Ehsani et al. | |
| 2002/0175900 A1 * | 11/2002 | Armstrong | 345/173 |
| 2003/0002809 A1 | 1/2003 | Jian | |
| 2003/0234346 A1 * | 12/2003 | Kao | 250/221 |
| 2004/0046960 A1 | 3/2004 | Wagner et al. | |
| 2005/0046621 A1 | 3/2005 | Kaikuranta | |
| 2005/0104860 A1 * | 5/2005 | McCreary et al. | 345/173 |
| 2005/0122308 A1 | 6/2005 | Bell et al. | |
| 2005/0174473 A1 | 8/2005 | Morgan et al. | |
| 2005/0253818 A1 * | 11/2005 | Nettamo | 345/173 |
| 2005/0271319 A1 | 12/2005 | Graham | |
| 2006/0001654 A1 | 1/2006 | Smits | |
| 2006/0161870 A1 | 7/2006 | Hotelling et al. | |
| 2006/0161871 A1 | 7/2006 | Hotelling et al. | |
| 2006/0229509 A1 | 10/2006 | Al-Ali et al. | |
| 2007/0024598 A1 | 2/2007 | Miller et al. | |
| 2007/0084989 A1 | 4/2007 | Lange et al. | |
| 2007/0146318 A1 | 6/2007 | Juh et al. | |
| 2007/0152984 A1 | 7/2007 | Ording et al. | |
| 2008/0008472 A1 | 1/2008 | Dress et al. | |
| 2008/0012850 A1 | 1/2008 | Keating, III | |
| 2008/0013913 A1 | 1/2008 | Lieberman et al. | |
| 2008/0055273 A1 | 3/2008 | Forstall | |
| 2008/0068353 A1 | 3/2008 | Lieberman et al. | |
| 2008/0088587 A1 * | 4/2008 | Pryor | 345/158 |
| 2008/0093542 A1 | 4/2008 | Lieberman et al. | |
| 2008/0100593 A1 | 5/2008 | Skillman et al. | |
| 2008/0111797 A1 | 5/2008 | Lee | |
| 2008/0117183 A1 | 5/2008 | Yu et al. | |
| 2008/0121442 A1 | 5/2008 | Boer et al. | |
| 2008/0122792 A1 | 5/2008 | Izadi et al. | |
| 2008/0122796 A1 | 5/2008 | Jobs et al. | |
| 2008/0122803 A1 | 5/2008 | Izadi et al. | |
| 2008/0136790 A1 | 6/2008 | Hio | |
| 2008/0158174 A1 | 7/2008 | Land et al. | |
| 2008/0192025 A1 | 8/2008 | Jaeger et al. | |
| 2008/0259053 A1 | 10/2008 | Newton | |
| 2008/0273019 A1 | 11/2008 | Deane | |
| 2008/0297487 A1 | 12/2008 | Hotelling et al. | |
| 2009/0027357 A1 | 1/2009 | Morrison | |
| 2009/0058833 A1 | 3/2009 | Newton | |
| 2009/0066673 A1 | 3/2009 | Molne et al. | |
| 2009/0096994 A1 | 4/2009 | Smits | |
| 2009/0322699 A1 | 12/2009 | Hansson | |
| 2009/0322701 A1 | 12/2009 | D'Souza et al. | |

FOREIGN PATENT DOCUMENTS

| | | |
|---|---|---|
| EP | 0601651 A1 | 6/1994 |
| WO | 8600446 A1 | 1/1986 |
| WO | 8600447 A1 | 1/1986 |
| WO | 02095668 A1 | 11/2002 |
| WO | 03038592 A1 | 5/2003 |
| WO | 2009008786 A1 | 1/2009 |
| WO | 0102949 A1 | 1/2011 |

\* cited by examiner

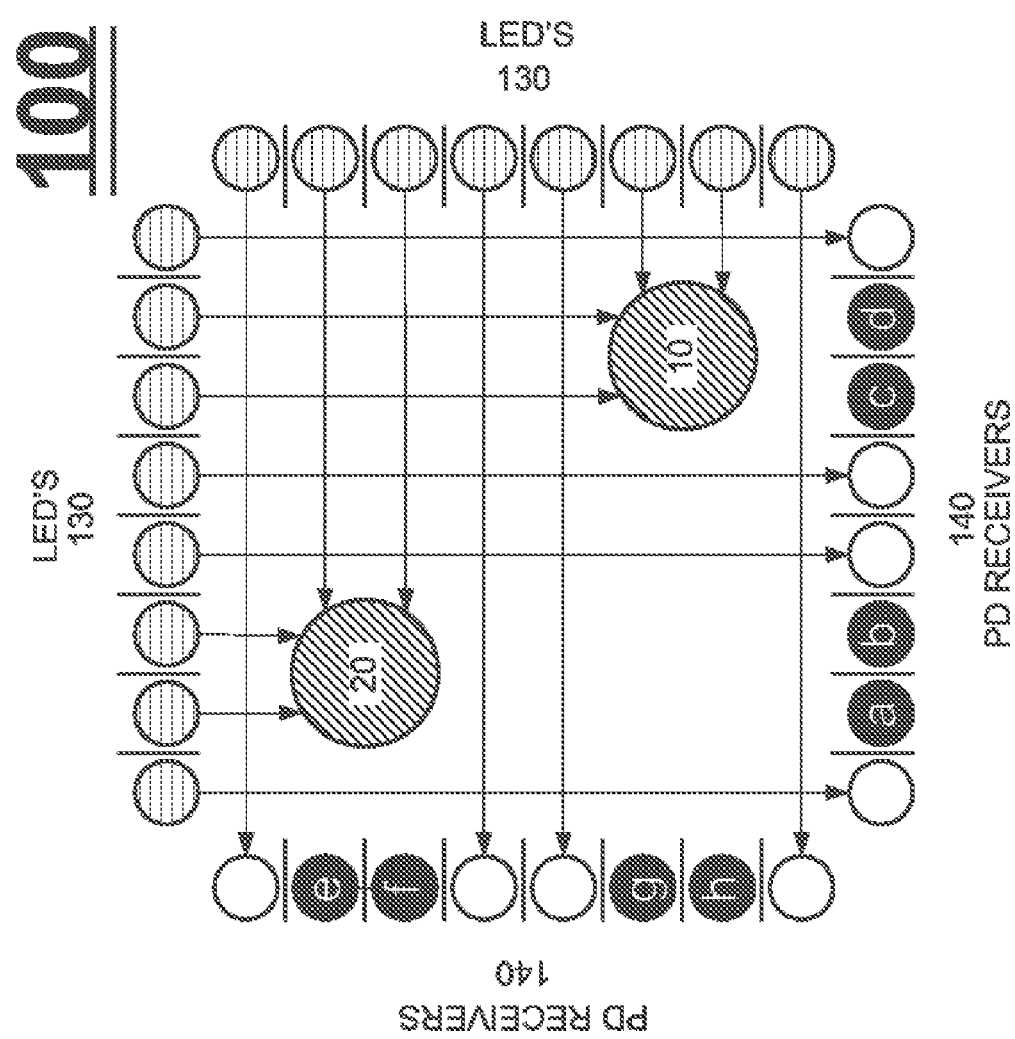

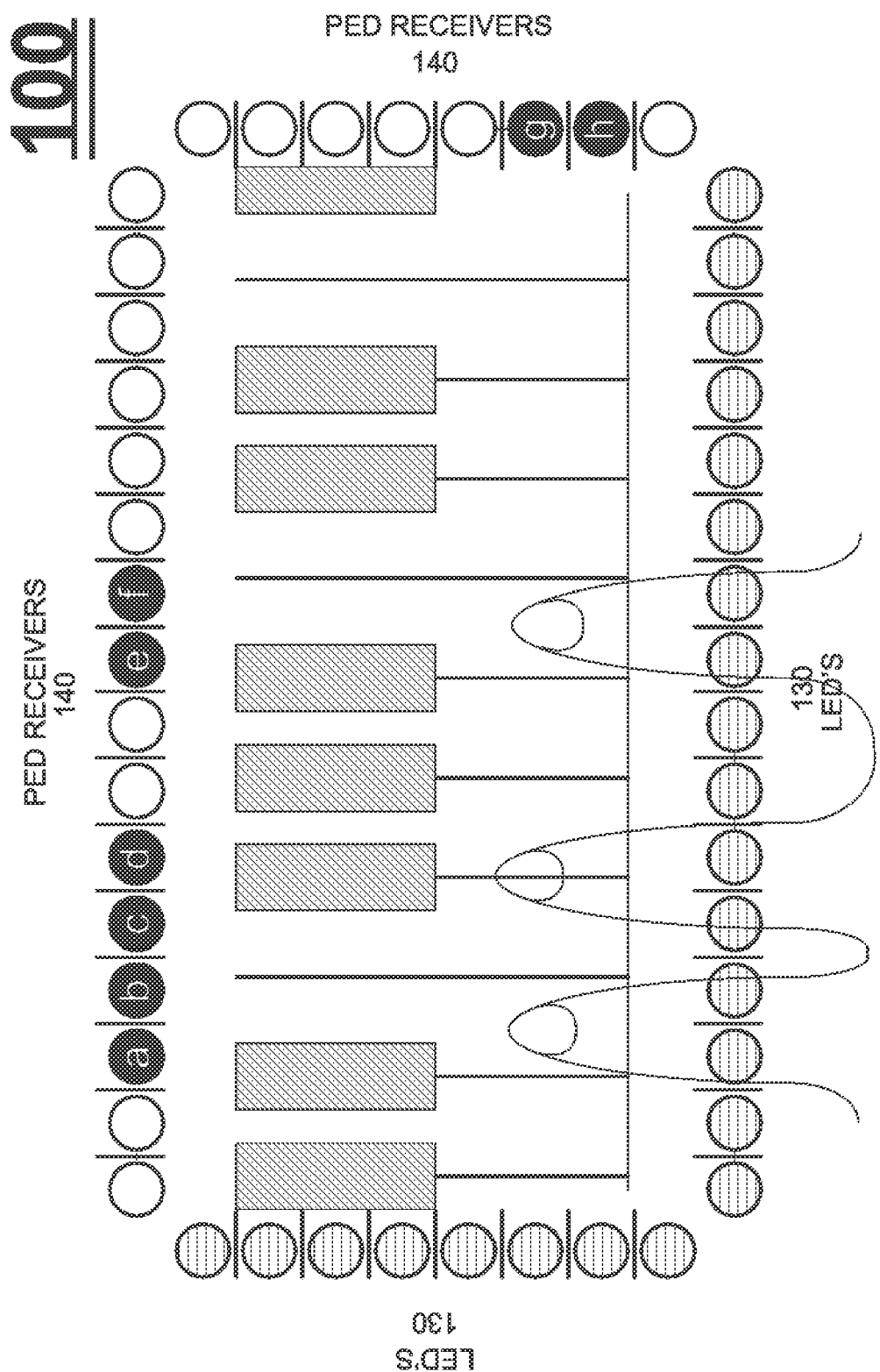

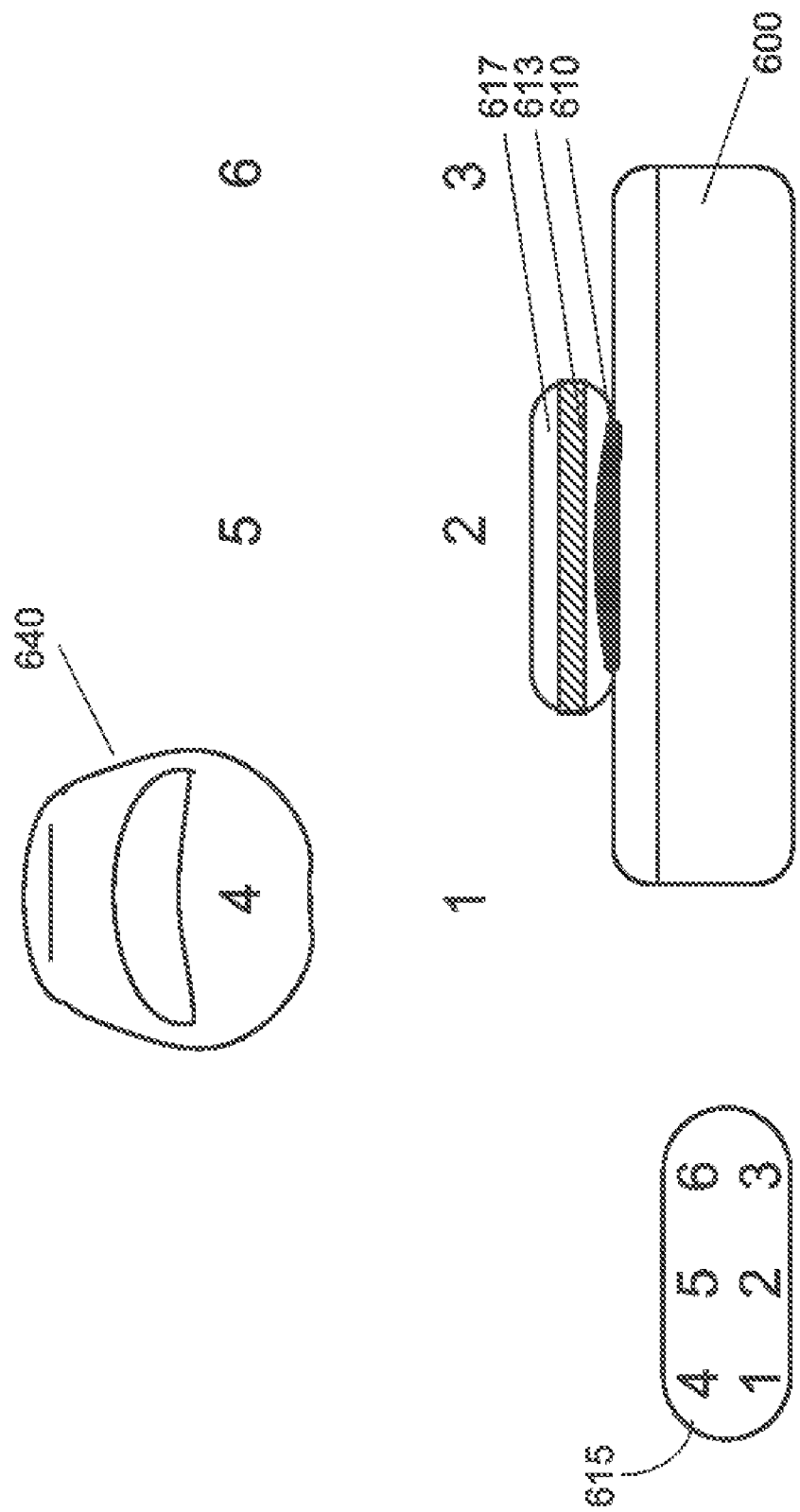

LIGHT-BASED TOUCH SCREEN

CROSS REFERENCES TO RELATED APPLICATIONS

This application is a continuation-in-part of assignee's pending application U.S. Ser. No. 10/494,055, filed on Apr. 29, 2004, entitled ON A SUBSTRATE FORMED OR RESTING DISPLAY ARRANGEMENT.

FIELD OF THE INVENTION

The field of the present invention is touch screens for computers.

BACKGROUND OF THE INVENTION

Conventional touch screens are capacitance-based or resistance-based. These touch screens provide user interfaces through which a user enters input to a computing device by touching a screen at a selected location, with a stylus or with his finger.

Conventional touch screens are generally large. When space is at a premium, such as with small handheld electronic devices, conventional touch screens are limited to only a few user inputs. Moreover, these inputs are not accurately interpreted when the user does not use a stylus.

Conventional touch screens are also limited as to the types of user inputs that they can recognize. For example, conventional touch screens are unable to distinguish between a soft tap and a hard press. Conventional touch screens are unable to recognize fast repeated tapping on the same screen locations. Conventional touch screens are unable to recognize gestures made by a finger or stylus that moves continuously across a touch screen.

It would thus be of advantage to produce touch screens that recognize single soft taps, repeated soft taps, presses, and gestures, for both large and small screens.

SUMMARY OF THE DESCRIPTION

Aspects of the present invention relate to touch screens that operate by measuring light intensities emitted by infra-red light emitting diodes (LEDs). In distinction from prior art touch screens, which are resistance-based or capacitance-based, embodiments of the present invention use light beams.

LEDs and photodiode (PD) receivers are distributed around the perimeter of a touch screen. The LEDs are controlled by a microprocessor to selectively emit light, and the PD receivers are controlled by the microprocessor to selectively measure light intensities. The light emitted by the LEDs is projected by a lens assembly over the touch screen. An object crossing into the projected light obstructs some of the light from reaching the PD receivers. The corresponding decrease in light intensities measured by the PD receivers enables determination of the object's position.

In accordance with embodiments of the present invention, the lens assembly projects light onto parallel planes at multiple heights over the touch screen. In turn, the light intensities measured by the PD receivers enable detection of objects that touch the screen and also objects that are above the screen and nearly touching the screen. By measuring light intensities over time, the motion over time of objects that are nearly touching the screen is also determined. Moreover, determination of motion over time enables derivation of objects' velocity vectors.

The touch screen of the present invention is able to recognize and distinguish still user inputs and motion-based user inputs made by a user's finger, including inter alia a single soft tap on the screen, multiple soft taps on the screen, a hard press on the screen, multiple hard presses on the screen, a directional gesture, such as a rightward moving swipe on the screen, and a figurative gesture such as sliding a finger over the screen in the shape of an "s" or an asterisk "*". The touch screen of the present invention is also able to recognize positions and motions of more than one object simultaneously touching the screen.

The touch screen of the present invention may be used as both an input device and an output display device. In some embodiments of the present invention, paths of motion made by an object on the touch screen are converted to corresponding motion of a mouse, and input as such to a computer.

The user touch-based inputs may be logged and post-processed by a data processor. An application of this is a touch-based storefront window, whereby touch-based inputs from passersby are logged and analyzed to derive information about consumer interest in a storefront showcase display.

In some embodiments of the present invention, LEDs are arranged along two adjacent edges of the touch screen, and PD receivers are arranged along the other two adjacent edges. In other embodiments of the present invention, four LEDs are positioned at the corners of the touch screen, and PD receivers are arranged along the edges.

In some embodiments of the present invention, the LEDs are connected as a matrix to LED row drivers that select rows and LED column drivers that select columns. As such, a designated LED is activated by appropriately setting its corresponding row and column drivers. Such a connection significantly reduces the number of IO connectors required, thereby reducing the cost of materials for the touch screen. Similarly, the PD receivers may be connected as a matrix to PD row selectors and PD column selectors.

Thus the present invention provides touch screens suitable for both small and large electronic devices. Devices that use touch screens of the present invention, such as mobile phones, do not required keypads since the touch screens themselves may serve as keypads.

There is thus provided in accordance with an embodiment of the present invention a light-based touch screen, including a housing for a display screen, a plurality of infra-red light emitting diodes (LEDs), fastened on the housing, for generating light beams, at least one LED selector, fastened on the housing and connected with the plurality of LEDs, for controllably selecting and deselecting one or more of the plurality of LEDs, a plurality of photodiode (PD) receivers, fastened on the housing, for measuring light intensity, at least one PD selector, fastened on the housing and connected with the plurality of PD receivers, for controllably selecting and deselecting one or more of the plurality of PD receivers, an optical assembly, fastened on the housing, for projecting light beams emitted by the plurality of LEDs in substantially parallel planes over the housing, and a controller, fastened on the housing and coupled with the plurality of PD receivers, (i) for controlling the at least one LED selector, (ii) for controlling the at least one PD selector, and (iii) for determining therefrom position and velocity of an object crossing at least one of the substantially parallel planes, based on output currents of the plurality of PD receivers.

There is additionally provided in accordance with an embodiment of the present invention a method for a light-based touch screen, including controlling a plurality of light-emitting diodes (LEDs) to select and deselect at least one of the LEDs, whereby a selected LED emits infra-red light beams, controlling a plurality of photodiode (PD) receivers to select and deselect at least one of the PD receivers, whereby a selected PD measures received light intensity, and determining position and velocity of an object obstructing light from at least one of the PD receivers, based on output currents of the plurality of PD receivers.

There is further provided in accordance with an embodiment of the present invention a touch screen, including a housing for a display screen, a plurality of sensors, fastened on the housing, for sensing location of an object touching the display screen, and a controller, fastened on the housing and coupled with the plurality of sensors, for receiving as input locations sensed by the plurality of sensors, and for determining therefrom positions of two or more objects simultaneously touching the display screen.

BRIEF DESCRIPTION OF THE DRAWINGS

The present invention will be more fully understood and appreciated from the following detailed description, taken in conjunction with the drawings in which:

FIGS. 2A-2C are diagrams of a touch screen that detects two objects that touch the screen simultaneously, in accordance with an embodiment of the present invention;

FIGS. 4A-4C are diagrams of a touch screen for a piano keyboard simulator, that detects multiple keys of a displayed piano keyboard that are touched simultaneously, in accordance with an embodiment of the present invention;

FIGS. 30D and 30E are simplified illustrations of patterns of digits projected into the space above a touch screen, in accordance with an embodiment of the present invention;

DETAILED DESCRIPTION

Aspects of the present invention relate to light-based touch screens. According to embodiments of the present invention, a light-based touch screen includes a plurality of infra-red light-emitting diodes (LEDs) and a plurality of photodiodes (PDs) arranged along the perimeter surrounding the screen. The LEDs project light substantially parallel to the screen surface, and this light is detected by the PDs. An object, such as a finger, placed over a portion of the screen blocks some of the light beams, and correspondingly some of the PDs detect less light intensity. The geometry of the locations of the PDs, and the light intensities they detect, suffice to determine screen coordinates of the object. The LEDs and PDs are controlled for selective activation and de-activation by a controller. Generally, each LED and PD has I/O connectors, and signals are transmitted to specify which LEDs and which PDs are activated.

In one embodiment of the present invention, plural LEDs are arranged along two adjacent sides of a rectangular screen, and plural PDs are arranged along the other two adjacent sides. In this regard, reference is now made to FIG. 1, which is a diagram of a touch screen 100 having 16 LEDs 130 and 16 PDs 140, in accordance with an embodiment of the present invention. The LEDs 130 emit infra-red light beams across the top of the touch screen, which are detected by corresponding PD receivers that are directly opposite the LEDs. When an object touches touch screen 100, it blocks light from reaching some of PD receivers 140. By identifying, from the PD receiver outputs, which light beams have been blocked by the object, the object's position can be determined.

Figure 2A:
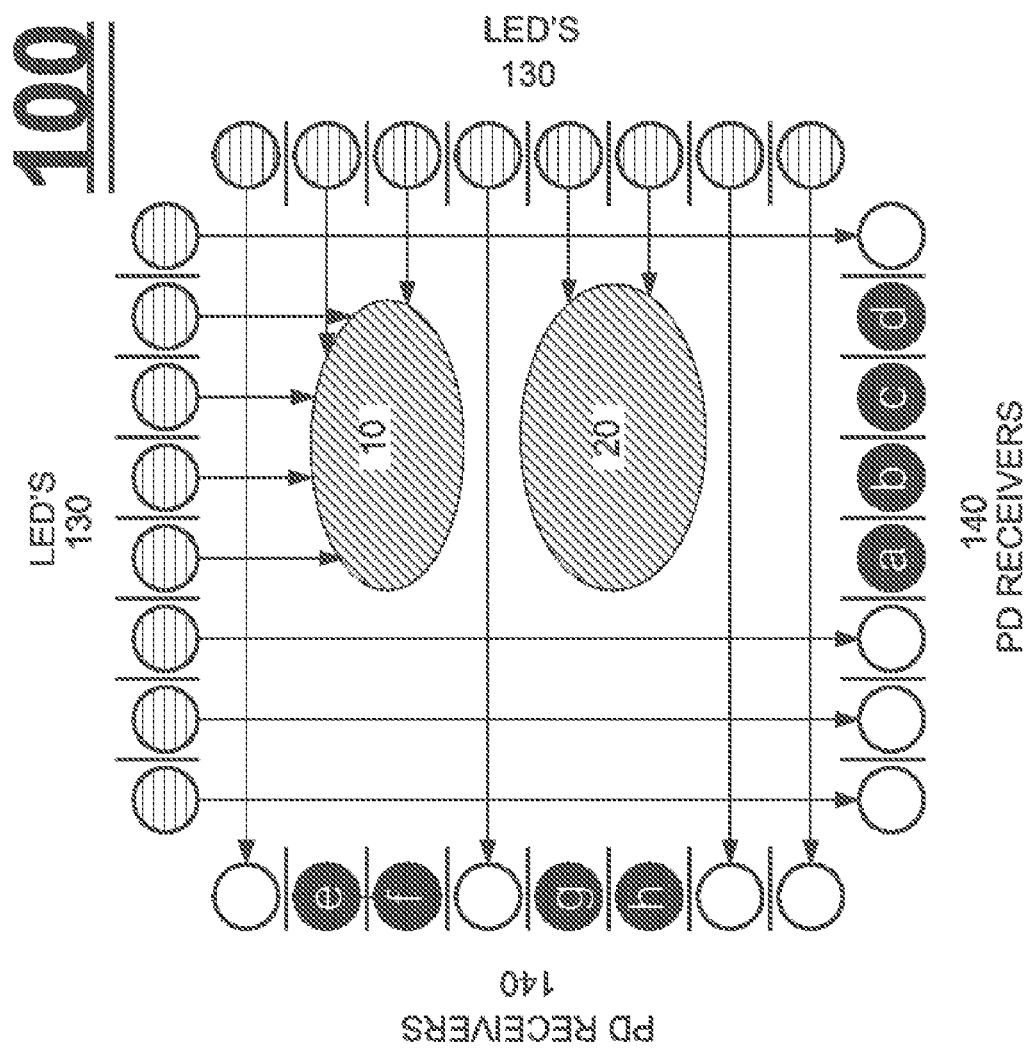
Figure 2B:
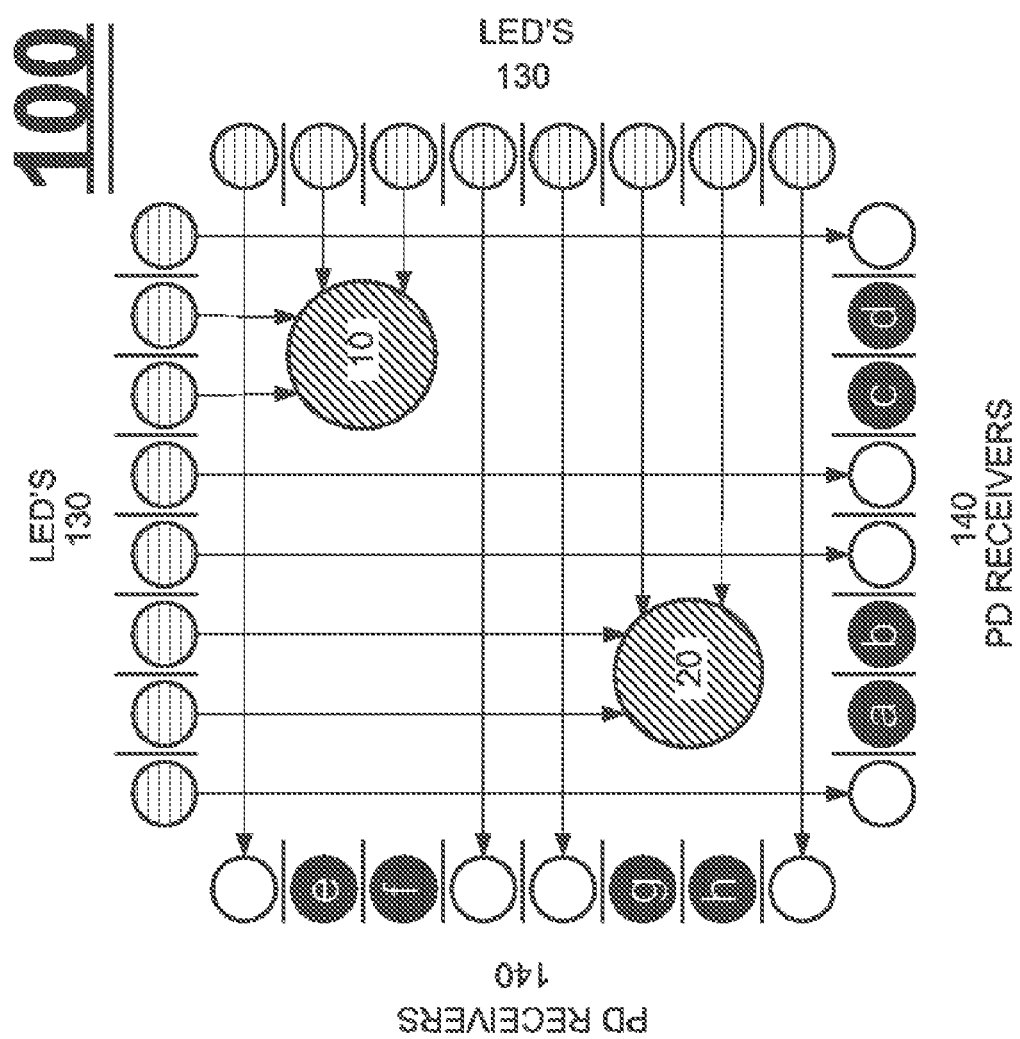

Reference is now made to FIGS. 2A-2C, which are diagrams of a touch screen that detects two objects, 10 and 20, that touch the screen simultaneously, in accordance with an embodiment of the present invention. Objects 10 and 20, which are touching the screen, block light from reaching some of PD receivers 140. In accordance with an embodiment of the present invention, the positions of objects 10 and 20 are determined from the crossed lines of the infra-red beams that the objects block. In distinction, prior art resistance-based and capacitance-based touch screens are unable to detect more than one object simultaneously touching the screen.

When two or more objects touch screen 100 simultaneously along a common horizontal or vertical axis, the positions of the objects are determined by the PD receivers 140 that are blocked. Objects 10 and 20 in FIG. 2A are aligned along a common vertical axis and block substantially the same PD receivers 140 along the bottom edge of touch screen 100; namely the PD receivers marked a, b, c and d. Along the left edge of touch screen, two different sets of PD receivers 140 are blocked. Object 10 blocks the PD receivers marked e and f, and object 20 blocks the PD receivers marked g and h. The two objects are thus determined to be situated at two locations. Object 10 has screen coordinates located at the intersection of the light beams blocked from PD receivers a-d and PD receivers e and f; and object 20 has screen coordinates located at the intersection of the light beams blocked from PD receivers a-d and PD receivers g and h.

Objects 10 and 20 shown in FIGS. 2B and 2C are not aligned along a common horizontal or vertical axis, and they have different horizontal locations and different vertical locations. From the blocked PD receivers a-h, it is determined that objects 10 and 20 are diagonally opposite one another. They are either respectively touching the top right and bottom left of touch screen 100, as illustrated in FIG. 2B; or else respectively touching the bottom right and top left of touch screen 100, as illustrated in FIG. 2C.

Discriminating between FIG. 2B and FIG. 2C is resolved by either (i) associating the same meaning to both touch patterns, or else (ii) by associating meaning to only one of the two touch patterns. In case (i), the UI arranges its icons, or is otherwise configured, such that the effects of both touch patterns FIG. 2B and FIG. 2C are the same. For example, touching any two diagonally opposite corners of touch screen 100 operates to unlock the screen. In case (ii), the UI arranges its icons, or is otherwise configured, such that only one of the touch patterns FIG. 2B and FIG. 2C has a meaning associated therewith. For example, touching the upper right and lower left corners of touch screen 100 operates to unlock the screen, and touch the lower right and upper left of touch screen 100 has no meaning associated therewith. In this case, the UI discriminates that FIG. 2B is the correct touch pattern.

Figure 3A:
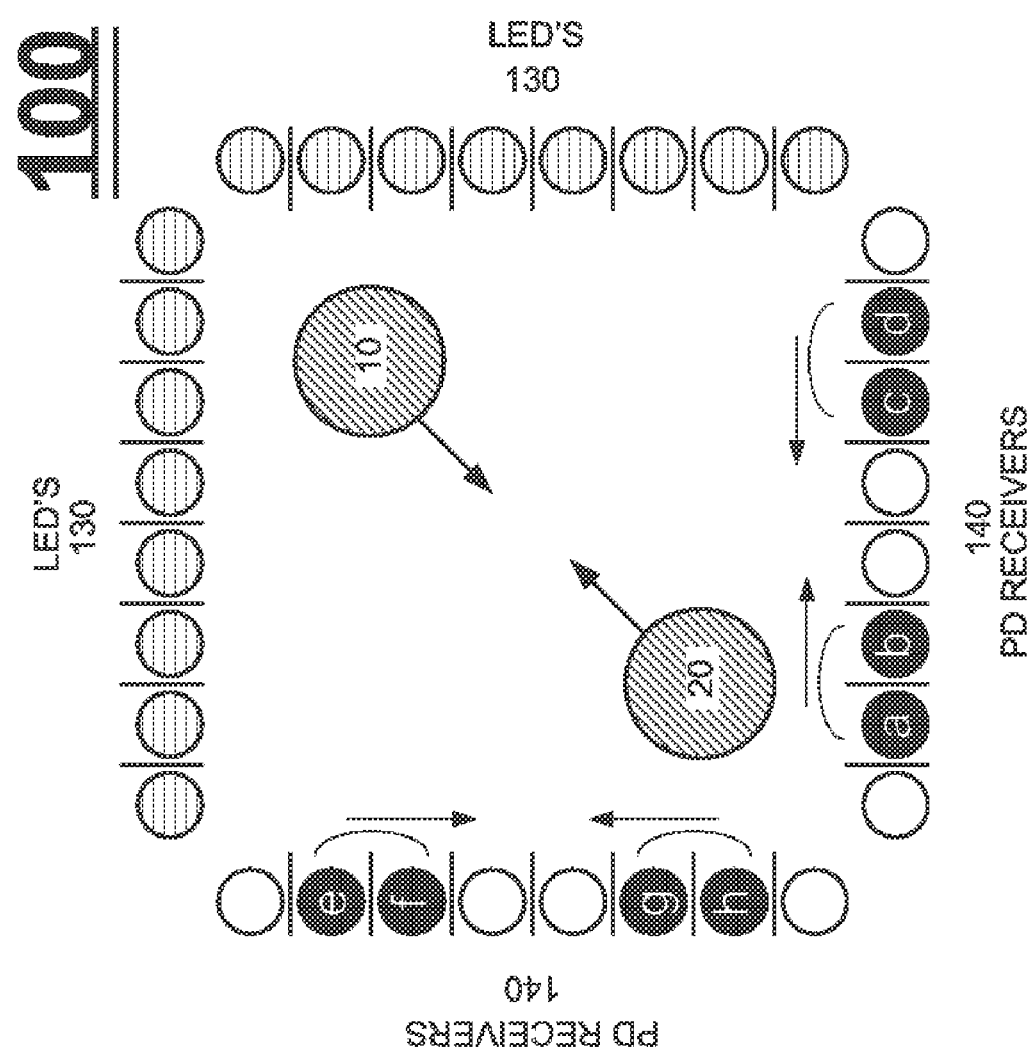
FIGS. 3A and 3B are diagrams of a touch screen that detects a two finger glide movement, in accordance with an embodiment of the present invention.
Figure 3B:
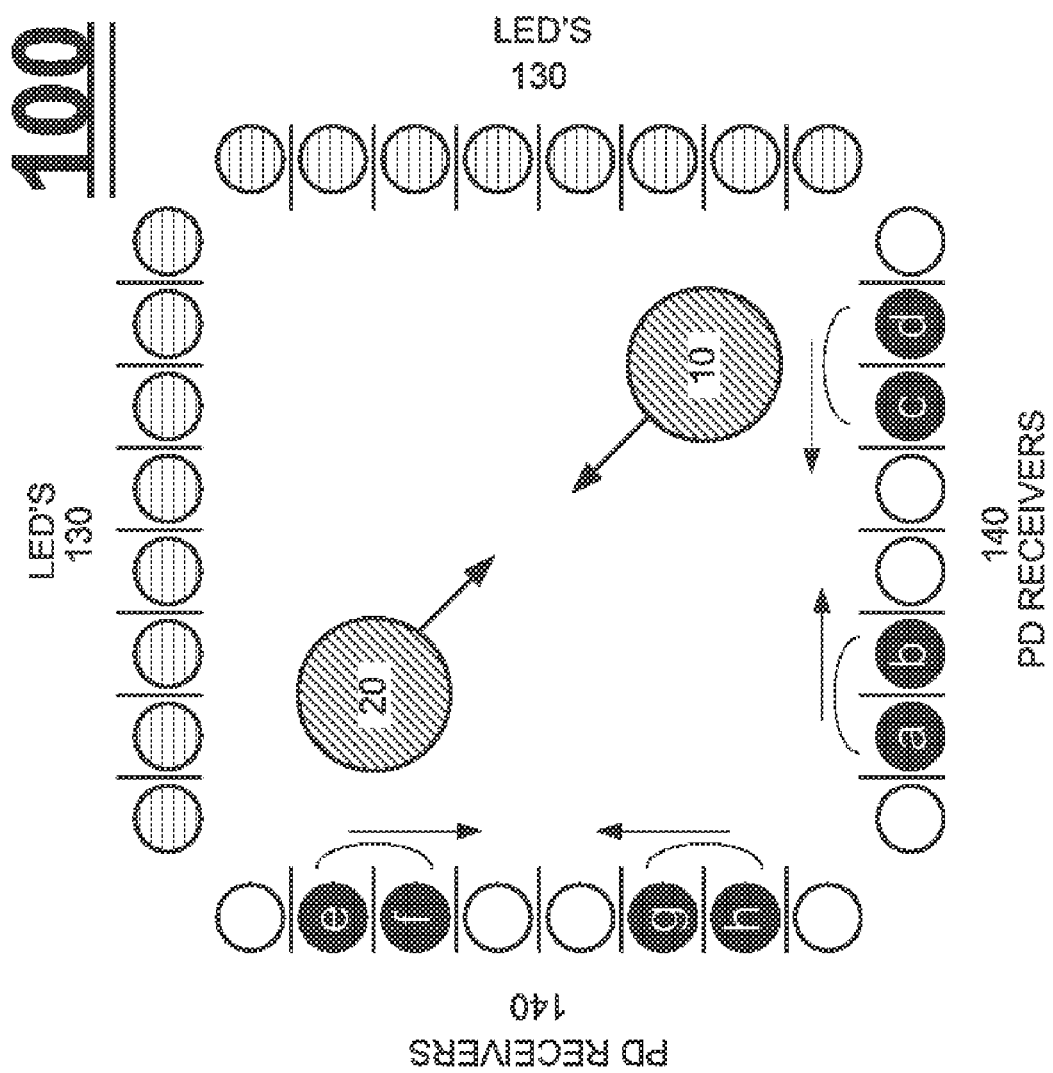

Reference is now made to FIGS. 3A and 3B, which are diagrams of a touch screen that detects a two finger glide movement, in accordance with an embodiment of the present invention. The glide movement illustrated in FIGS. 3A and 3B is a diagonal glide that brings objects 10 and 20 closer together. The direction of the glide is determined from changes in which PD receivers 140 are blocked. As shown in FIGS. 3A and 3B, blocked PD receivers are changing from a and b to PD receivers 140 more to the right, and from c and d to PD receivers 140 more to the left. Similarly, blocked PD receivers are changing from e and f to PD receivers 140 more to the bottom, and from g and h to PD receivers 140 more to the top. For a glide in the opposite direction, that moves objects 10 and 20 farther apart, the blocked PD receivers change in the opposite directions.

When objects 10 and 20 are aligned in a common vertical or horizontal axis, there is no ambiguity in identifying glide patterns. When objects 10 and 20 are not aligned in a common vertical or horizontal axis, there may be ambiguity in identifying glide patterns, as illustrated in FIGS. 3A and 3B. In case of such ambiguity, and as described hereinabove with reference to FIGS. 2B and 2C, discriminating between FIG. 3A and FIG. 3B is resolved by either (i) associating the same meaning to both glide patterns, or else (ii) by associating meaning to only one of the two glide patterns.

Figure 4A:
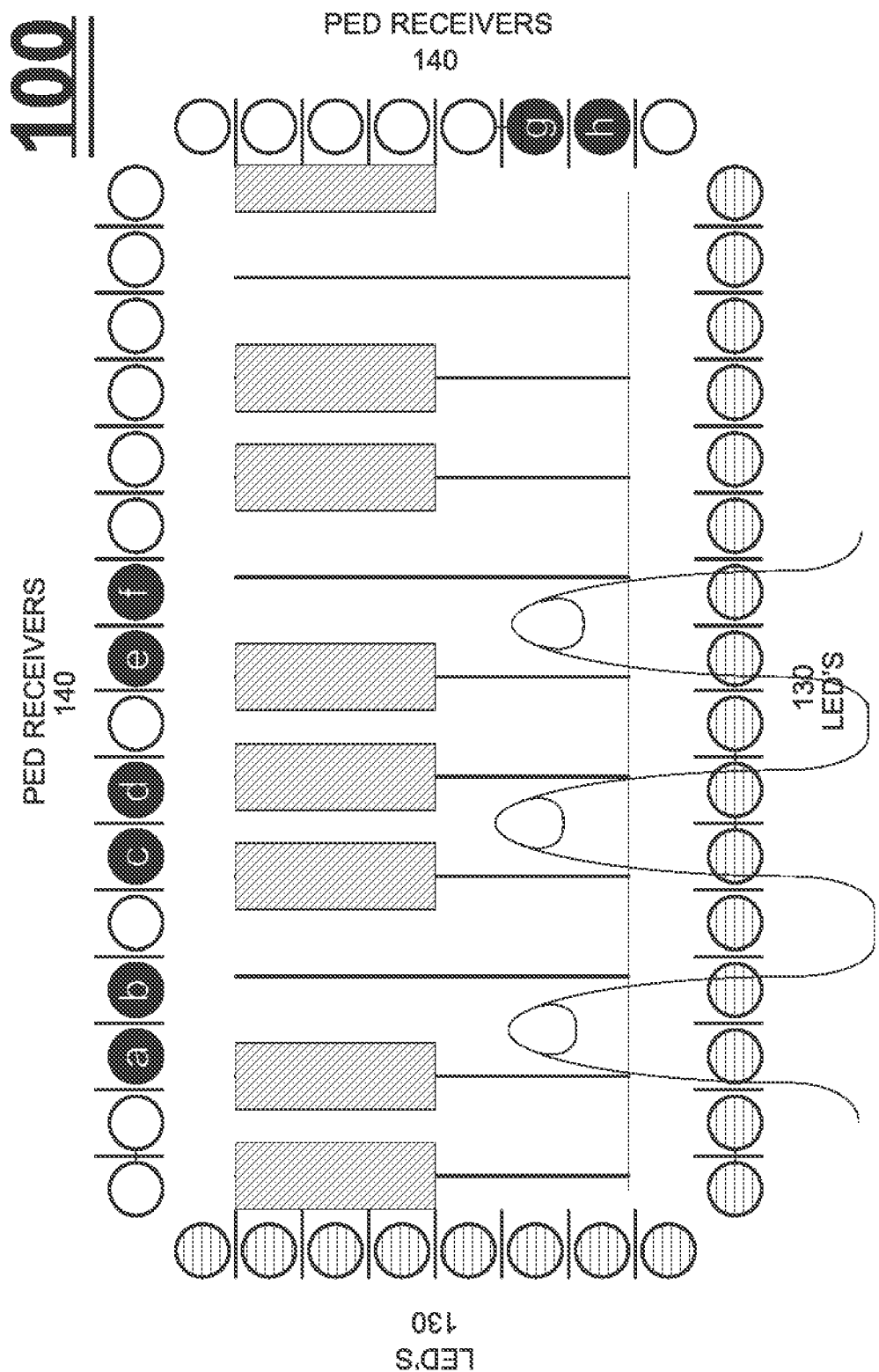
Figure 4B:
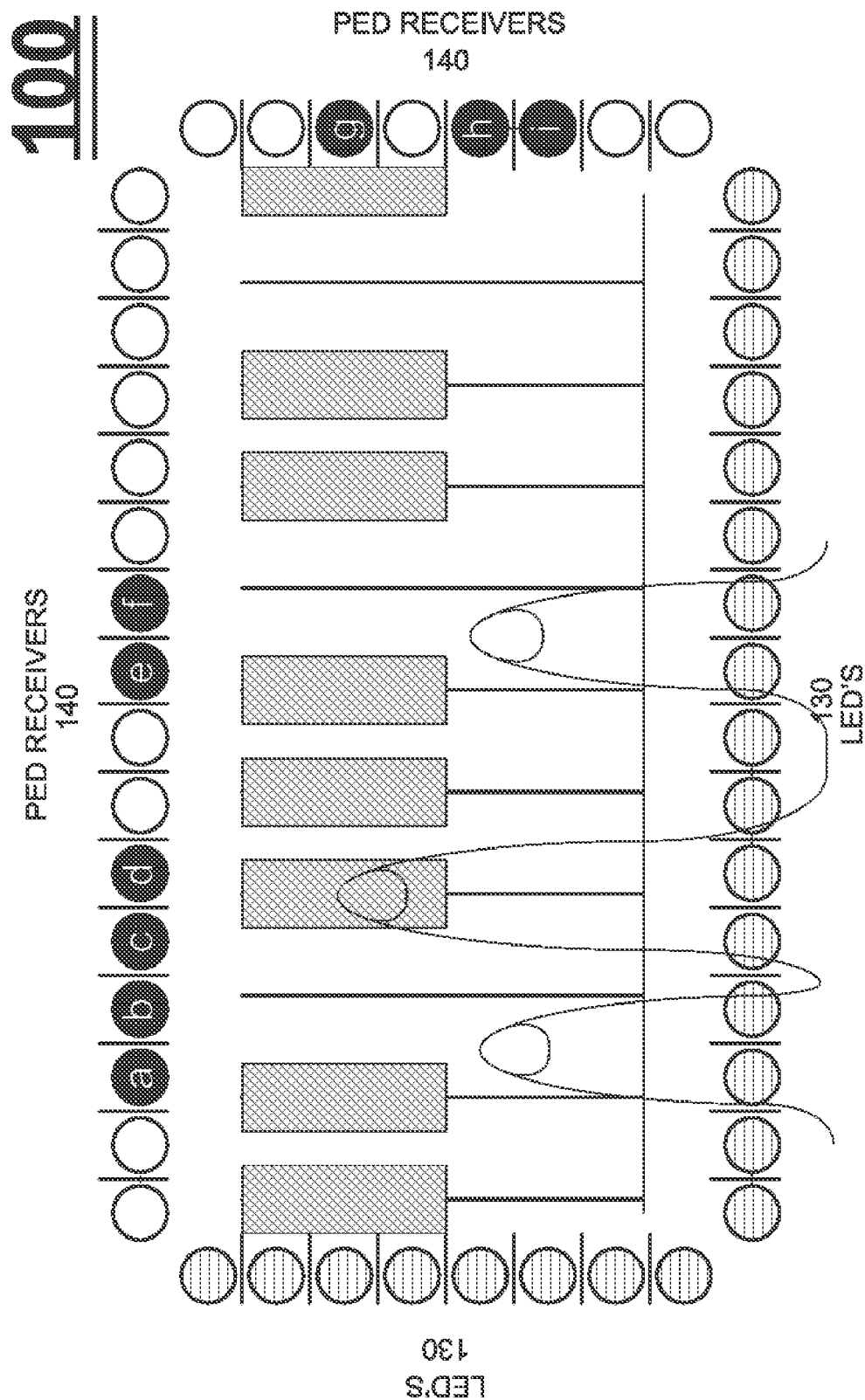

It will be appreciated by those skilled in the art that the present invention also identifies three or more objects that are simultaneously touching touch screen 100. Reference is now made to FIGS. 4A-4C, which are diagrams of a touch screen for a piano keyboard simulator, that detects multiple keys of a displayed piano keyboard that are touched simultaneously, in accordance with an embodiment of the present invention. The touch screen in FIGS. 4A-4C has a different layout than the touch screen in FIGS. 1-3. Piano keys are displayed along a horizontal axis. As such, touch positions along the horizontal axis correspond to keys of the keyboard. The black keys are identified by their positions that straddle two white keys.

The hand shown in FIG. 4A is playing three white keys, and correspondingly the PD receivers denoted a-f are blocked.

The hand shown in FIG. 4B is playing two white keys and one black key, and correspondingly a different plurality of PD receivers, also denoted a-f, are blocked. The hand shown in FIG. 4C is playing four white keys with three fingers. The same PD receivers a-f as in FIG. 4B are blocked in FIG. 4C. In this case, the PD receivers along the right edge of touch screen 100 discriminate between FIG. 4B and FIG. 4C; namely, PD receivers g, h and i are blocked in FIG. 4B, where PD receivers g and h are blocked in FIG. 4C. Blocked PD receiver i in FIG. 4B indicates a depth corresponding to a black piano key.

Figure 1:
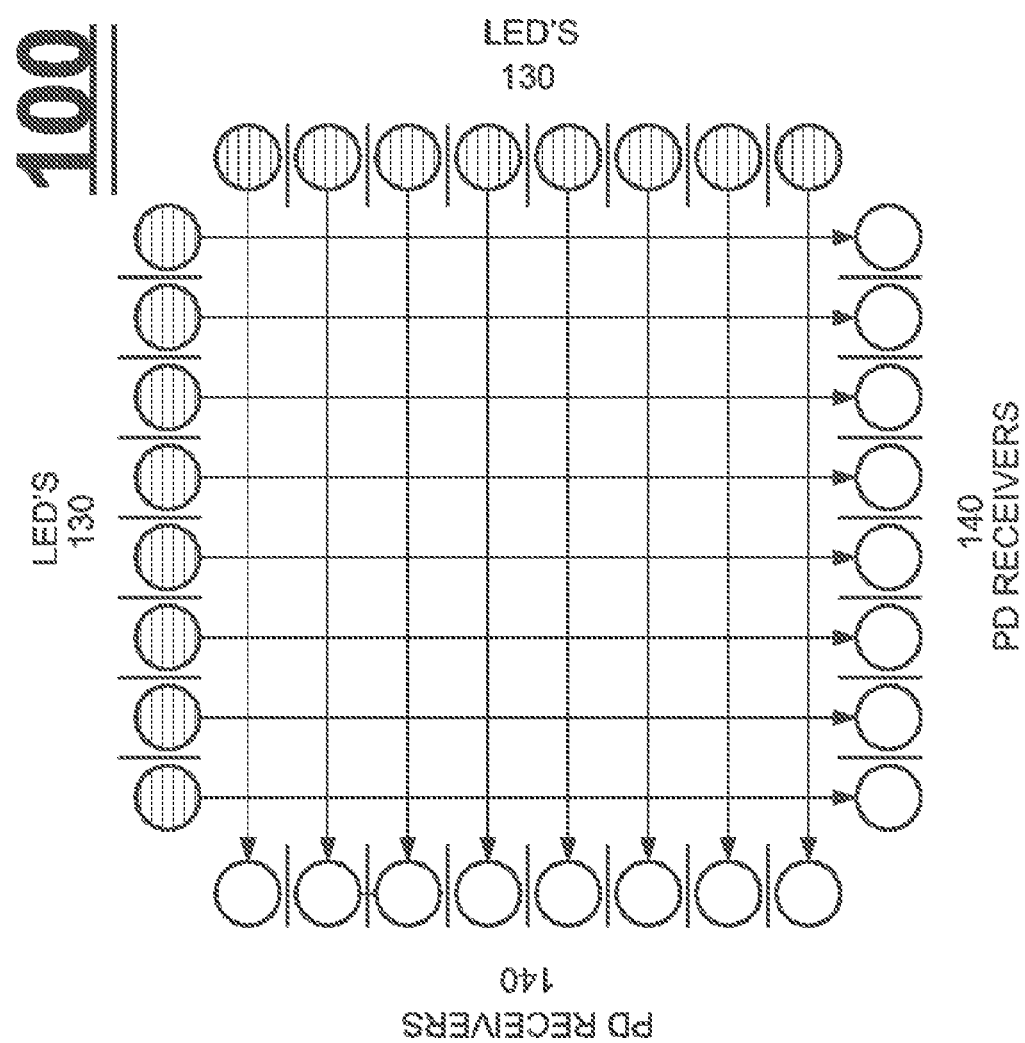
FIG. 1 is a diagram of a touch screen having 16 LEDs and 16 PDs, in accordance with an embodiment of the present invention.
Figure 5:
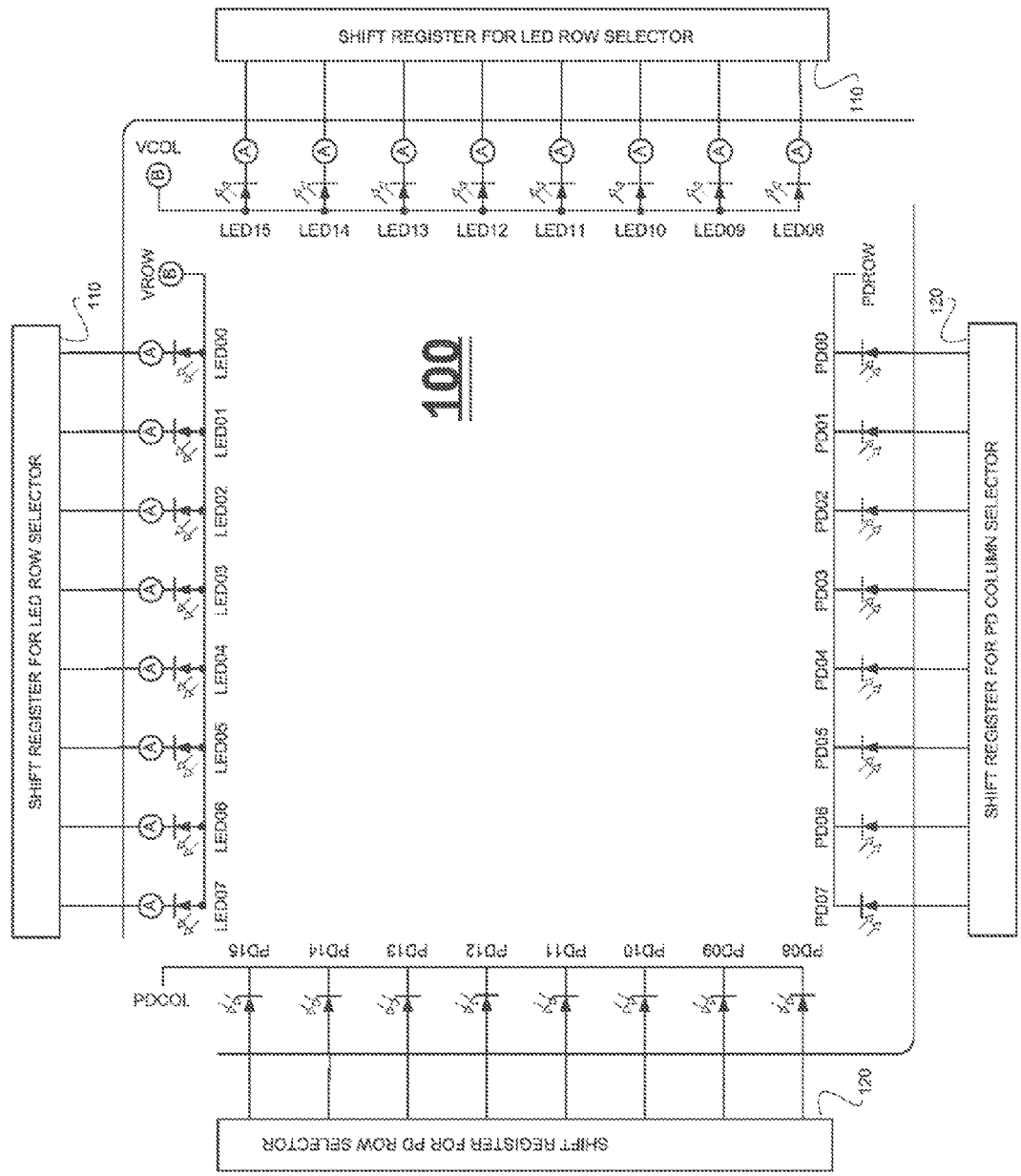
FIG. 5 is a circuit diagram of the touch screen from FIG. 1, in accordance with an embodiment of the present invention.

Reference is now made to FIG. 5, which is a circuit diagram of touch screen 100 from FIG. 1, in accordance with an embodiment of the present invention. The LEDs 130 and PDs 140 are controlled by a controller, shown in FIG. 6A. The LEDs receive respective signals LED00-LED15 from LED switches A, and receive current from VROW and VCOL through current limiters B. Operation of LED switches A is described with reference to FIG. 12. Operation of current limiters B is described with reference to FIGS. 11A and 11B. The PDs receive respective signals PD01-PD15 from shift register 120. PD output is sent to controller 150, via signals PDROW and PDCOL.

According to one embodiment of the present invention, the LEDs are controlled via a first serial interface, which transmits a binary string to a shift register 110. Each bit of the binary string corresponds to one of the LEDs, and indicates whether to activate or deactivate the corresponding LED, where a bit value "1" indicates activation and a bit value "0" indicates deactivation. Successive LEDs are activated and deactivated by shifting the bit string within shift register 110. Operation of shift register 110 is described with reference to FIG. 8.

Similarly, the PDs are controlled by a second serial interface, which transmits a binary string to a shift register 120. Successive PDs are activated and deactivated by shifting the bit string in shift register 120. Operation of shift register 120 is described with reference to FIG. 14.

Figure 11:
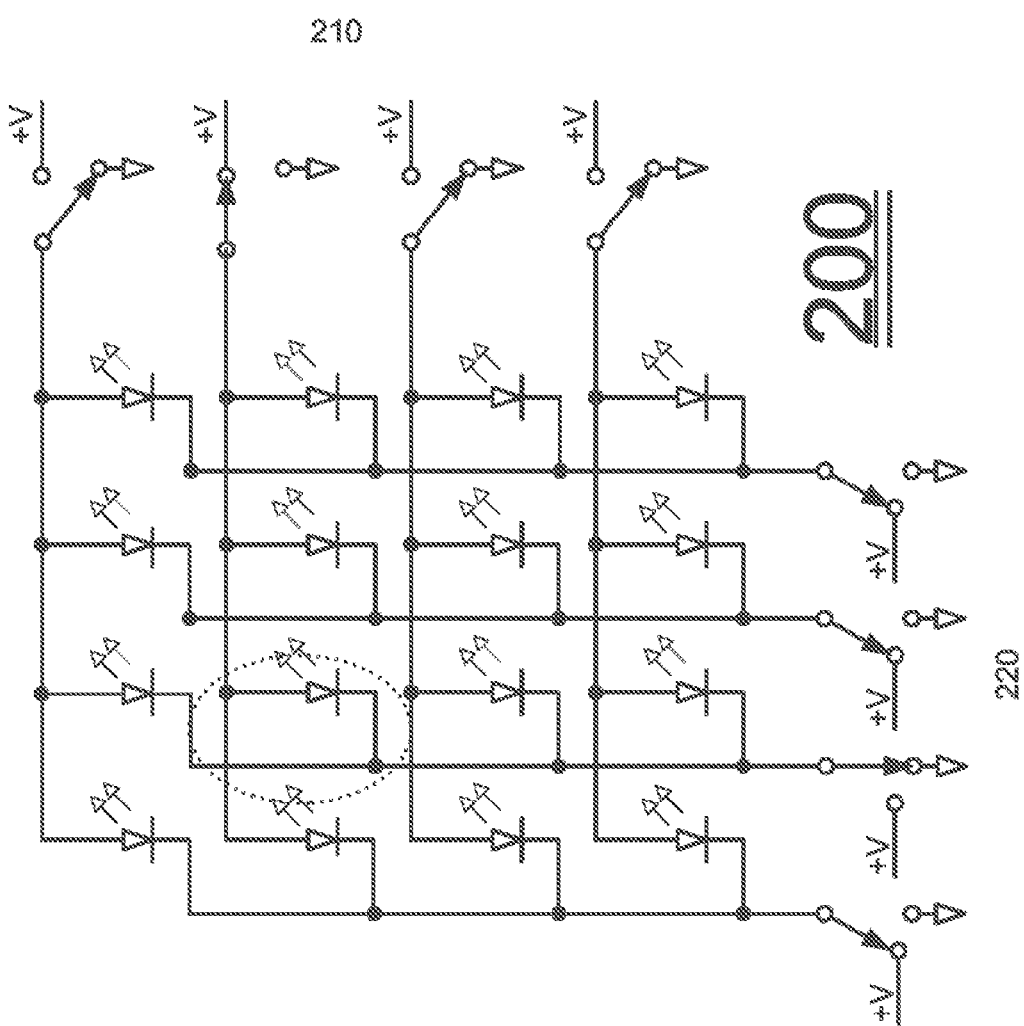
FIG. 11 is a diagram of an LED driver matrix for a touch screen, in accordance with an embodiment of the present invention.
Figure 16:
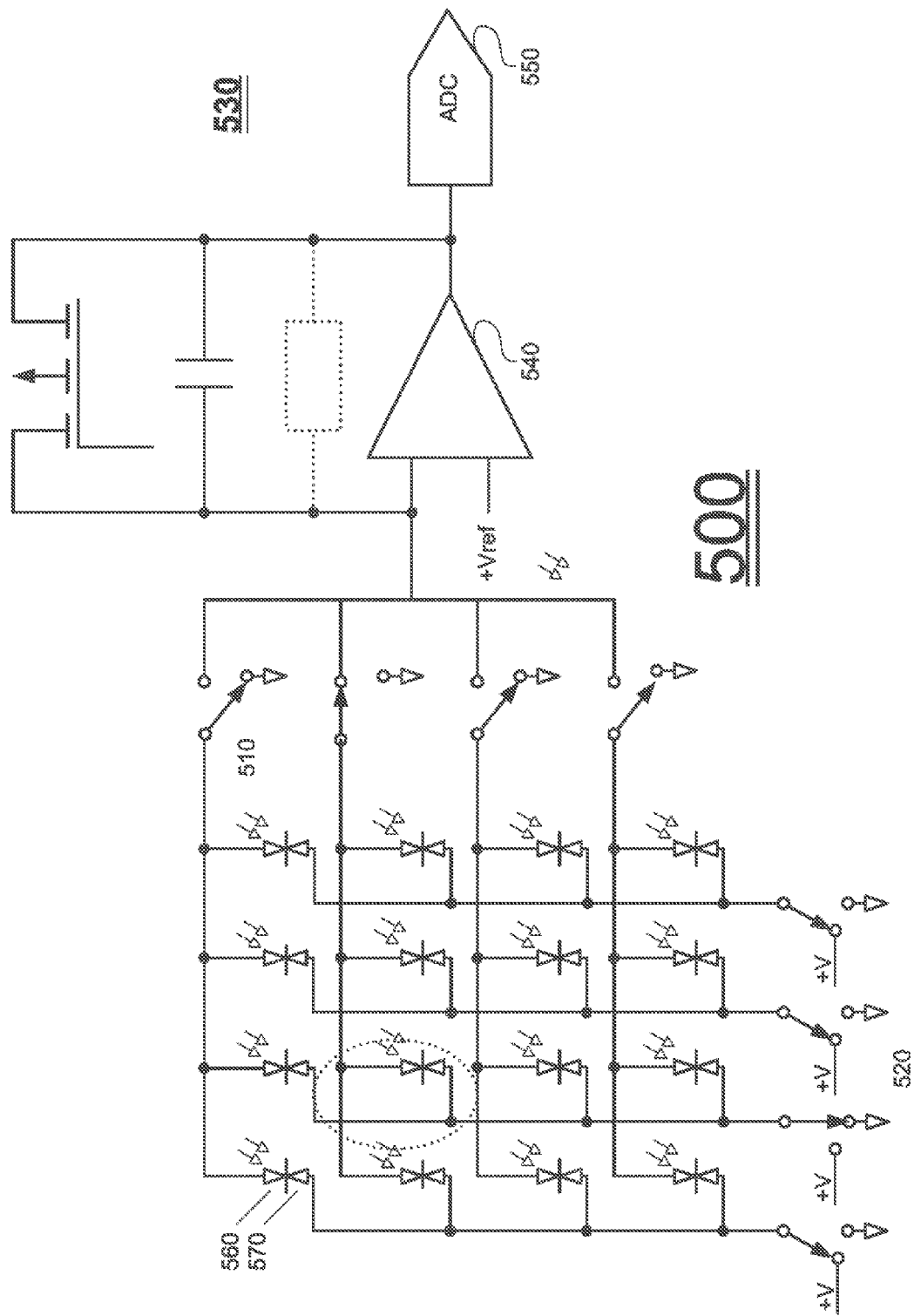
FIG. 16 is a diagram of a photodiode matrix for a touch screen, in accordance with an embodiment of the present invention.

According to another embodiment of the present invention, shown in FIG. 11, the LEDs are logically arranged in a matrix with signals controlling each row and each column in the LED matrix. Each LED matrix signal is connected to a separate pin of a controller. Similarly, as shown in FIG. 16, the PDs may be logically arranged in a matrix with signals controlling each row and each column in the PD matrix.

The ensuing description addresses (1) the electronics, (2) the optics, and (3) applications of touch screen 100.

1. Electronics of Touch Screen 100

Figure 6A:
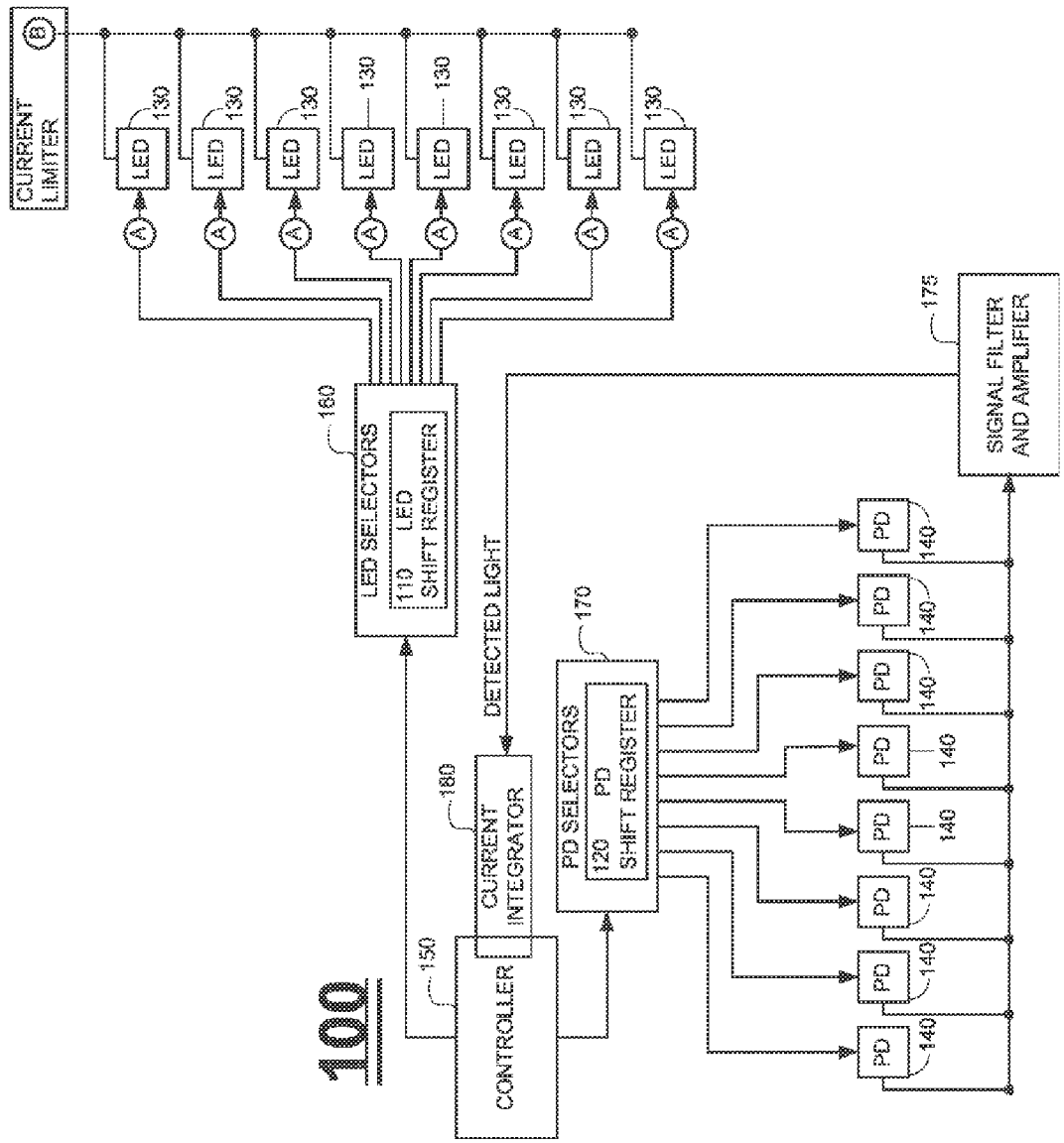
FIG. 6A is a simplified block diagram of electronics for a touch screen, in accordance with an embodiment of the present invention.

Reference is now made to FIG. 6A, which is a simplified block diagram of electronics for touch screen 100, in accordance with an embodiment of the present invention. As shown in FIG. 6A, touch screen 100 includes light-emitting diodes 130, which emit pulses of infra-red light, and photodiodes 140, which detect light intensity. LEDs 130 are selectively activated in a controlled manner by a controller 150, via LED selectors 160 and LED switches A. Current is supplied to LEDs 130 by current limiters B shown in FIGS. 5 and 6A. Each LED requires approximately 2 amps of current, whereas each LED selector 160 only supplies a few milliamps. As such, each LED selector activates an LED switch A that supplies sufficient current. Operation of LED switches A is described with reference to FIG. 12. Operation of current limiters B is described with reference to FIGS. 13A and 13B.

Figure 18A:
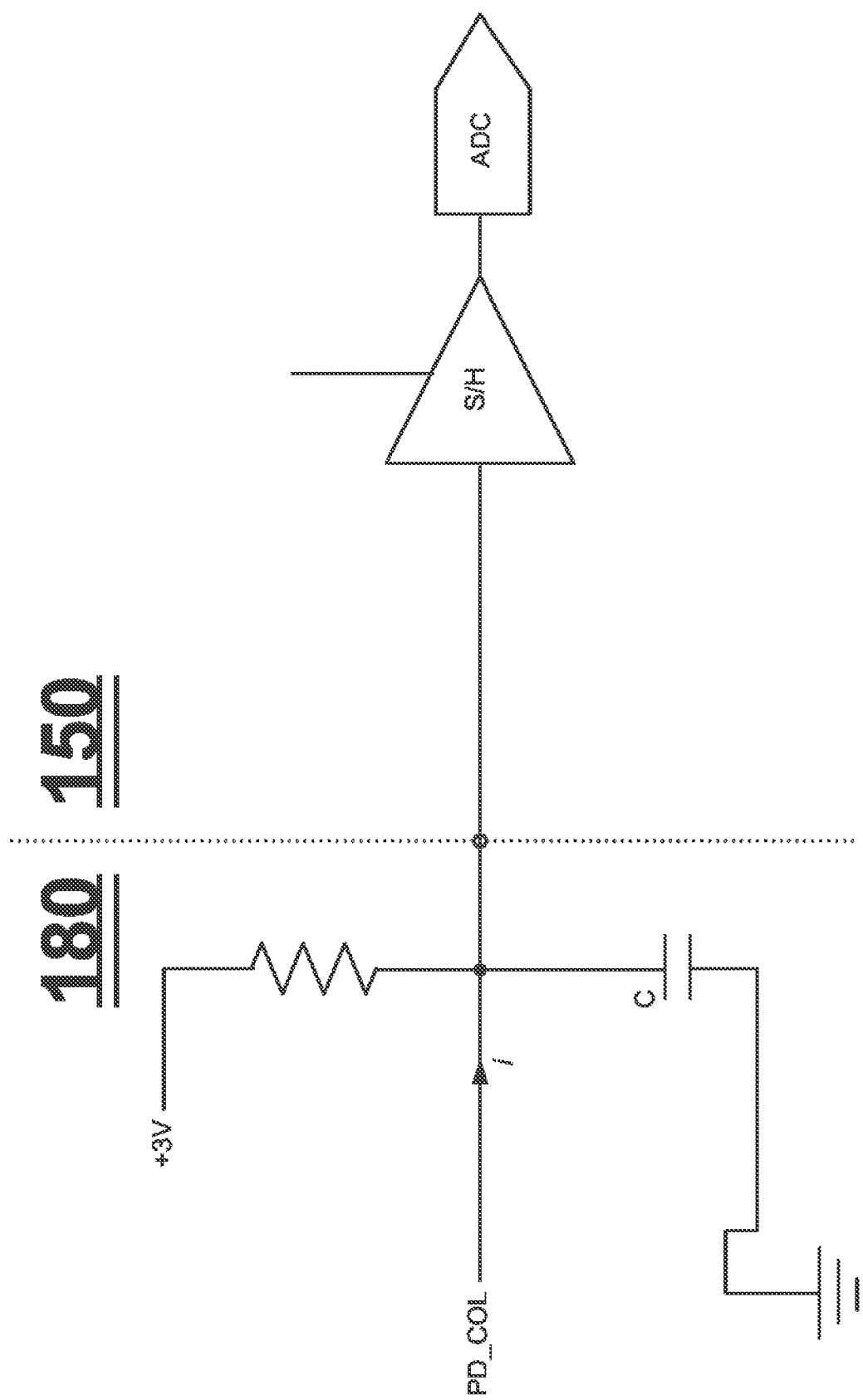
FIG. 18A is a diagram of a resistor-based current integrator used in conjunction with PD receivers in a touch screen, in accordance with an embodiment of the present invention.

Controller 150 also selectively filters PDs 140 in a controlled manner, via PD selectors 170. PDs 140 are selectively activated by PD selectors 170, which activate one of the PDs. The signal from the activated PD is transmitted back to controller 150 via a current integrator 180, which then determines whether or not one or more objects are placed over touch screen 100 and, if so, the positions of the objects. According to an embodiment of the present invention, the signal from the activated PD is transmitted to a signal filter and amplifier 175. The output of signal filter and amplifier 175 is transmitted back to controller 150, which then determines whether or not one or more objects are placed over touch screen 100 and, if so, the positions of the objects. Operation of signal filter and amplifier 175 is described with reference to FIGS. 23A and 23B. Operation of current integrator 180 is described with reference to FIGS. 18A and 18B.

Figure 6B:
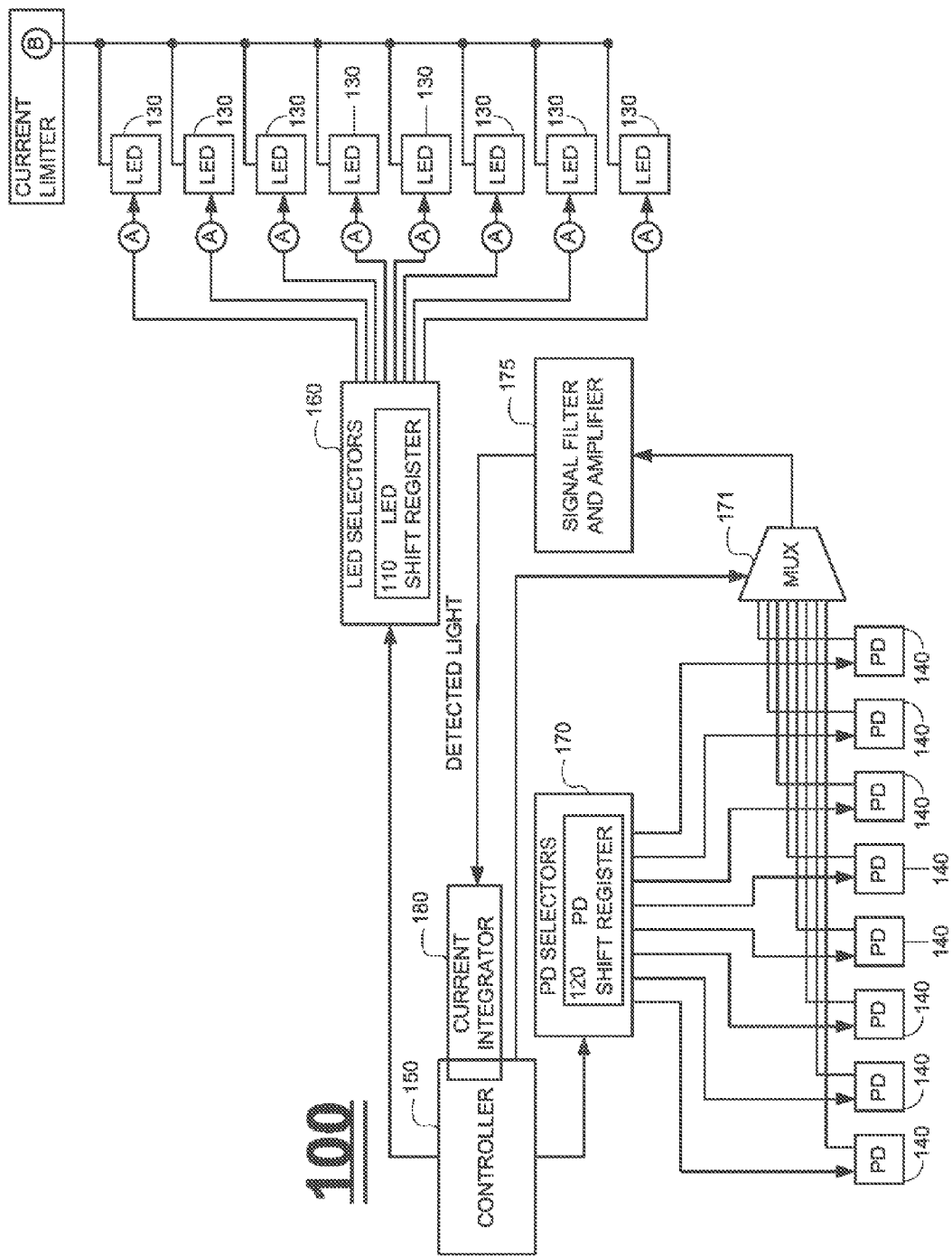
FIG. 6B is a simplified block diagram of alternate electronics for touch screen, in accordance with an embodiment of the present invention.

Reference is now made to FIG. 6B, which is a simplified block diagram of alternate electronics for touch screen 100, in accordance with an embodiment of the present invention. The diagram of FIG. 6B includes an optional multiplexer 171, used to select one from among several PD output signals. In the absence of multiplexer 171, inactive PD signals may affect the signal entering controller 150 and optional filter and amplifier 175. Multiplexer 171 eliminates these effects. Operation of multiplexer 171 is described with reference to FIG. 17.

i. Controller 150

As used herein, the term "controller" includes inter alia programmable processors, RISC processors, dedicated hardware, field programmable gate arrays (FPGA) and application-specific circuits (ASIC). Although FIGS. 6A and 6B show current integrator 180, signal filter and amplifier 175, PD selectors 170, LED selectors 160 and other functional blocks as being external to controller 150, such implementation is for purposes of clarity and exposition. However, it will be appreciated by those skilled in the art that in other implementations of the present invention some or all of these blocks, or portions thereof, may be integrated within controller 150.

Figure 7:
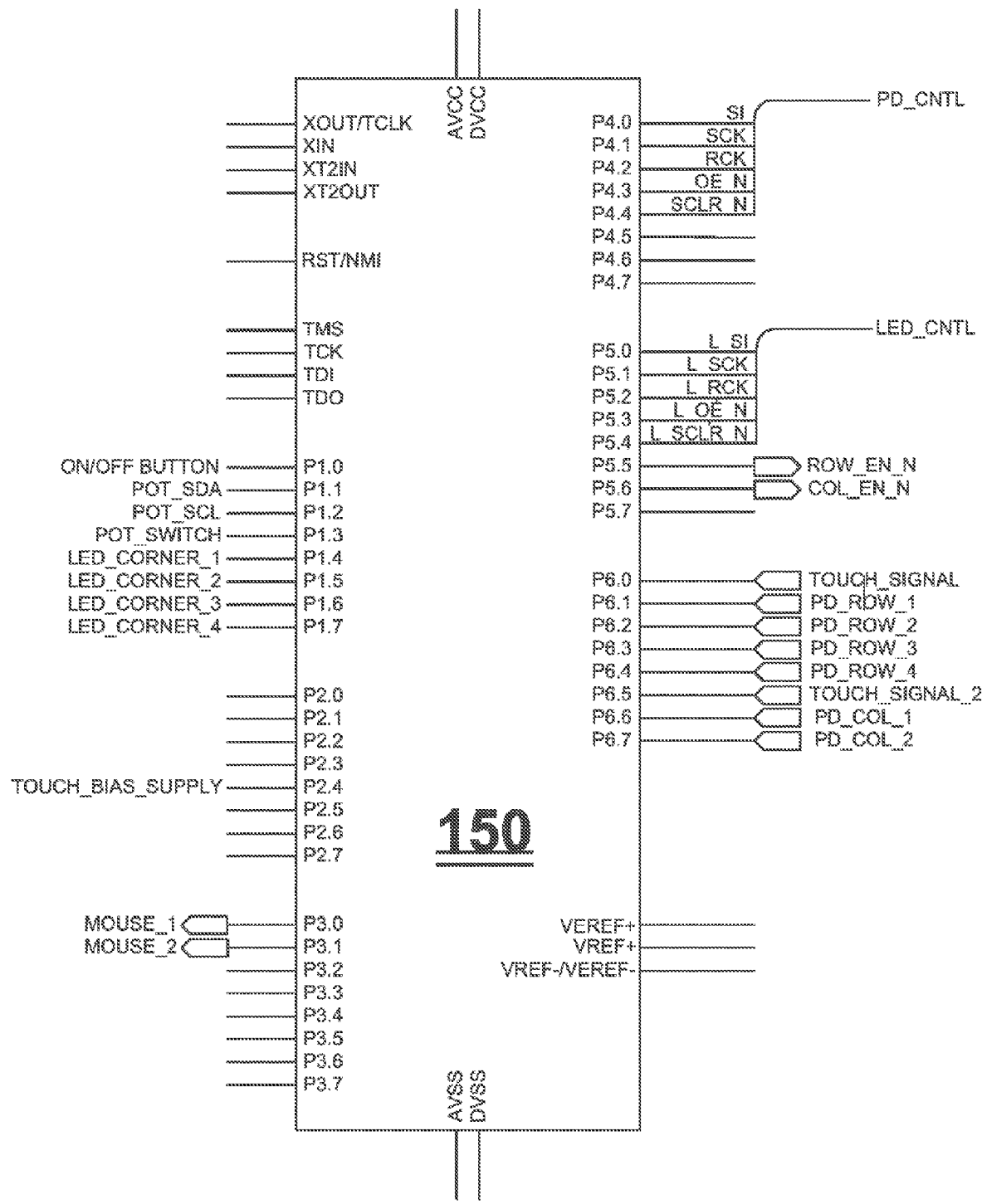
FIG. 7 is a simplified circuit diagram of an exemplary central processing unit for use with the touch screens of FIGS. 6A and 6B, in accordance with an embodiment of the present invention.

Reference is now made to FIG. 7, which is a simplified circuit diagram of an exemplary controller 150 for use with touch screen 100, in accordance with an embodiment of the present invention. The exemplary controller shown in FIG. 7 includes 64 I/O pins, some of which connect to LED selectors 160 and PD selectors 170, and some of which receive touch signals.

Controller 150 shown in FIG. 7 may be an MSP microcontroller, manufactured by Texas Instruments Incorporated of Dallas, Tex.

ii. LED Selector 160 and Shift Register 110

Figure 8:
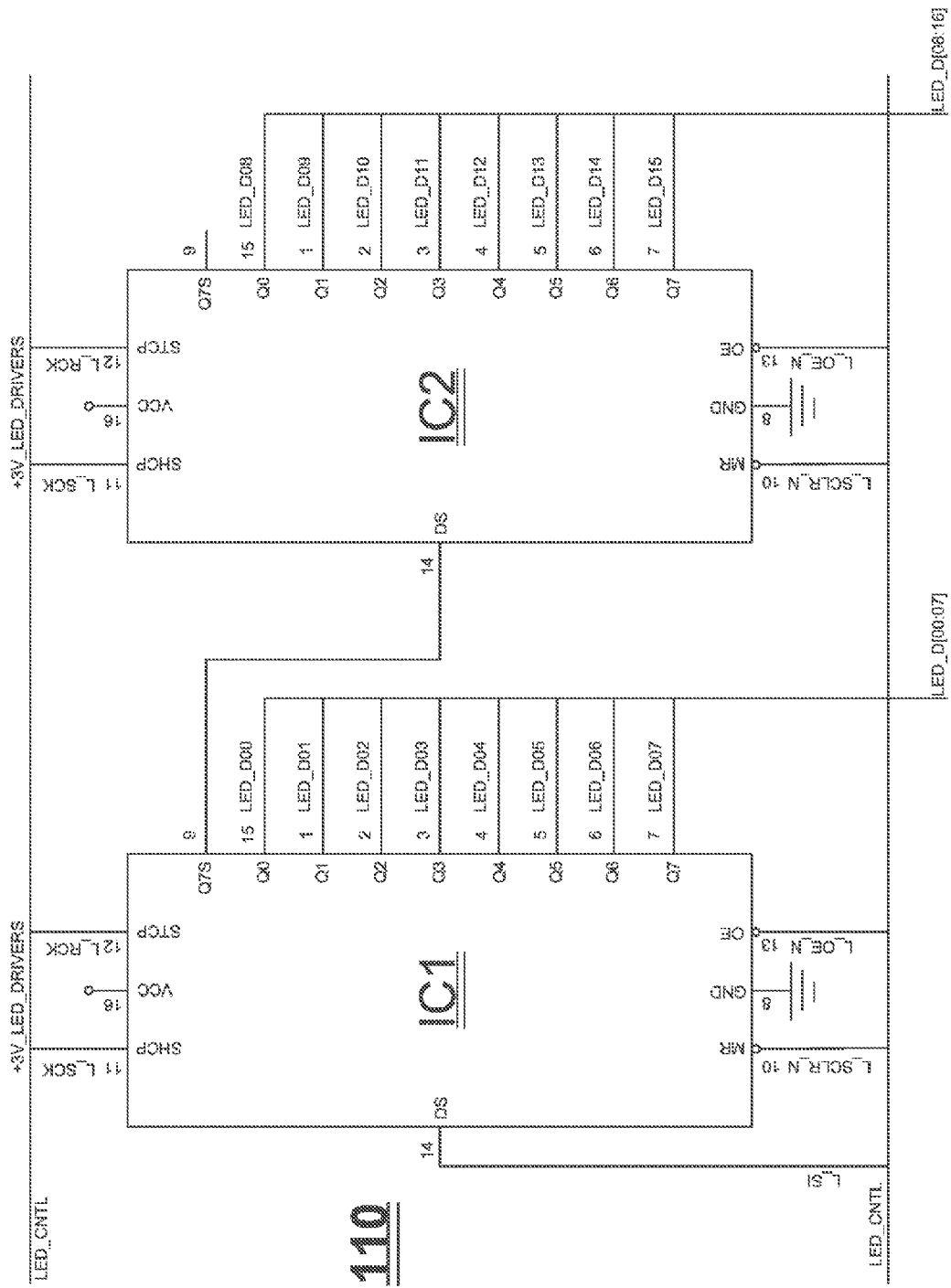
FIG. 8 is a diagram of a shift register for an array of 16 LEDs, in accordance with an embodiment of the present invention.

Reference is now made to FIG. 8, which is a diagram of shift register 110 for an array of 16 LEDs 130, in accordance with an embodiment of the present invention. Shift register 110 is connected to controller 150 via the LED_CTRL signal shown in FIG. 7. Integrated circuit IC1 drives 8 LED switches A via corresponding push-pull drivers denoted LED_D00 thru LED_D07; and integrated circuit IC2 drives another 8 LEDs switches A via corresponding push-pull drivers denoted LED_D08 thru LED_D15.

In accordance with the embodiment shown in FIG. 8, shift register 110 is implemented in IC1 and IC2, wherein the lower 8 bits of shift register 110 are stored in IC1, and the upper 8 bits are stored in IC2. Bits are shifted from IC1 to IC2 via the connection shown in FIG. 8 exiting IC1 at Q7S and entering IC2 at DS.

Referring to the LED_CTRL signals, when L_SCLR_N is low, all LEDs 130 are turned off. In accordance with an embodiment of the present invention, L_SCLR_N resets shift register 110; i.e., resets circuits IC1 and IC2.

Figure 9:
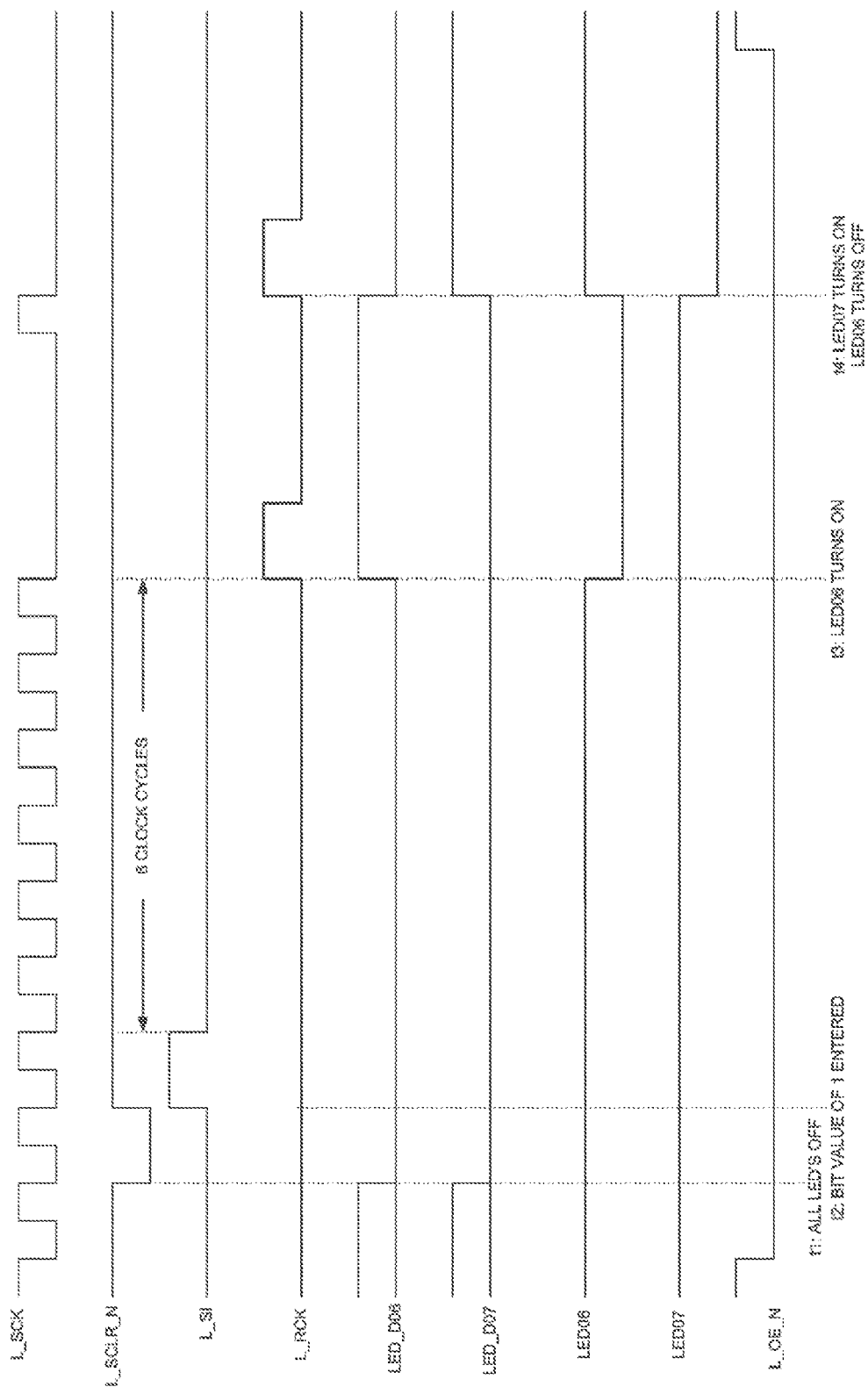
FIG. 9 is an illustration of a waveform for activating LEDs, in accordance with an embodiment of the present invention.

Reference is now made to FIG. 9, which illustrates a waveform for activating LEDs, in accordance with an embodiment of the present invention. FIG. 9 illustrates the use of LED_CTRL signals L_SI, L_SCK, L_RCK, L_SCLR_N and L_EO_N from FIG. 7.

As shown in FIG. 9, at time t1 a low L_SCLR_N signal turns off all LEDs by resetting shift register 110. At time t2, a bit value of 1 is entered into shift register 110 by signal L_SI. Thereafter, at each cycle of L_SCK the data in shift register 110 is shifted one position further into the register, and a new L_SI bit is entered into the first bit of shift register 110. After six L_SCK cycles, corresponding to time t3, the bit value of 1 arrives at bit position 6, corresponding to LED06. A high L_RCK signal activates the LED drivers using the data in shift register 110, driving push-pull driver LED_D06 high, and thereby activating a respective one of switches A and turning on LED06. A subsequent L_SCK cycle, corresponding to time t4, advances the bit value of 1 one bit position further. A subsequent high L_RCK signal activates the LED drivers again, with the bit value of 1 at position 7 and a bit value of 0 at position 6, thereby turning on LED07 and turning off LED06 via respective switches A.

Figure 10:
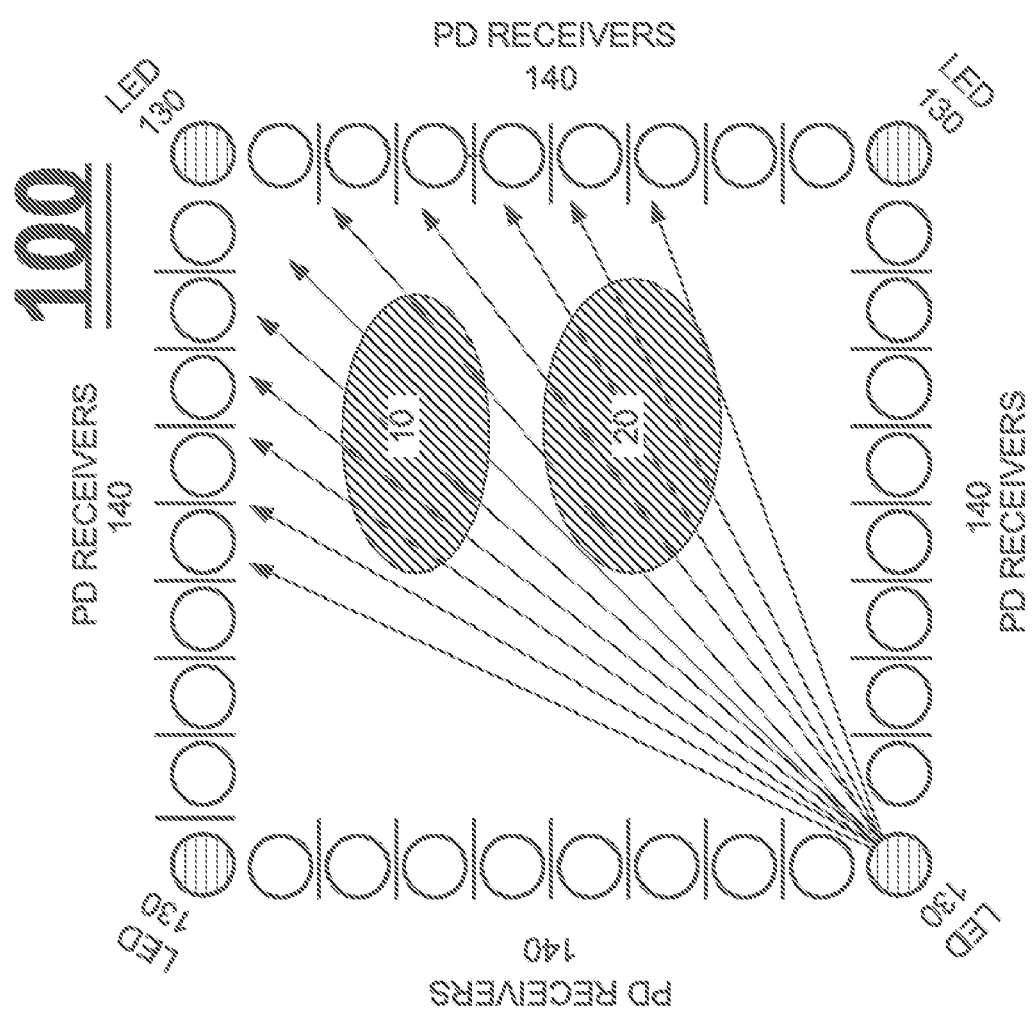
FIG. 10 is a diagram of a touch screen with four LEDs placed in the four corners of the screen, and plural PDs are arranged along the four sides of the screen, in accordance with an embodiment of the present invention.

In distinction to the embodiment shown in FIG. 1, in accordance with another embodiment of the present invention, four LEDs 130 are placed in the four corners of a touch screen, and plural PDs 140 are arranged along the four sides of the screen, as shown in FIG. 10. When an LED 130 is lit, it projects an arc of light substantially parallel to the surface of the screen. The PDs 140 detect respective portions of this light, according to the positions of the LED 130 and the PDs 140. The four LEDs 130 suffice to determine the screen coordinates of an object, such as a finger, placed over a portion of the screen, based on the light intensities detected by the PDs 140.

In yet another embodiment of the invention, the LEDs are inter-connected with the topology of a matrix, and each I/O connector transmits a signal to an entire row or an entire column of LEDs. Such a topology provides an advantage in reducing the total number of I/O connectors required, thereby reducing the cost of the electronics. In this regard, reference is now made to FIG. 11, which is a diagram of an LED driver matrix 200 for a touch screen, in accordance with an embodiment of the present invention. FIG. 11 shows how 16 LEDs are controlled by using only 4 VROW signals and 4 VCOL signals. Each VROW signal controls a respective one of four connections via switch 210, and each VCOL signal controls a respective one of four connections via switch 220. Switches 210 and 220 are connected to respective pins in controller 150. Switches 210 and 220 are similar to LED switches A shown in FIG. 12.

Matrix 200 includes 16 LEDs and 8 IO connectors. More generally, matrix 400 may include an m×n array of mn LEDS and m+n IO connectors. In distinction, prior art LEDs required two IO connectors apiece. As such, it will be appreciated by those skilled in the art that matrix 200 reduces the number of IO connectors required from 2mn to m+n. In turn, this reduces the cost of touch screen 100, since the IO connectors are a significant part of the bill of materials.

As shown in FIG. 11, each LED is accessed by selection of a row and a column IO connector. Four push-pull drivers are used for selecting rows, and four push-pull drivers are used for selecting columns. A designated LED is activated by driving the appropriate push-pull driver for its row to high, and driving the appropriate push-pull driver for its column to low. FIG. 11 shows the second from left push-pull driver driven low, and the second from top push-pull driver is driven high. Correspondingly, the LED circled in FIG. 11 is activated.

It will be appreciated by those skilled in the art that the row and column coordinates of the LEDs are not related to the physical placement of the LEDS and the push-pull drivers. As such, the LEDs do not need to be physically positioned in a rectangular matrix.

In another embodiment of the present invention, current source drivers are used instead of push-pull drivers. In yet another embodiment of the present invention, current sink drivers are used instead of push-pull drivers. In yet another embodiment of the present invention, some of the push-pull drivers are combined with current source drivers and others of the push-pull drivers are combined with current sink drivers.

iii. LED Current Switches A

Figure 12:
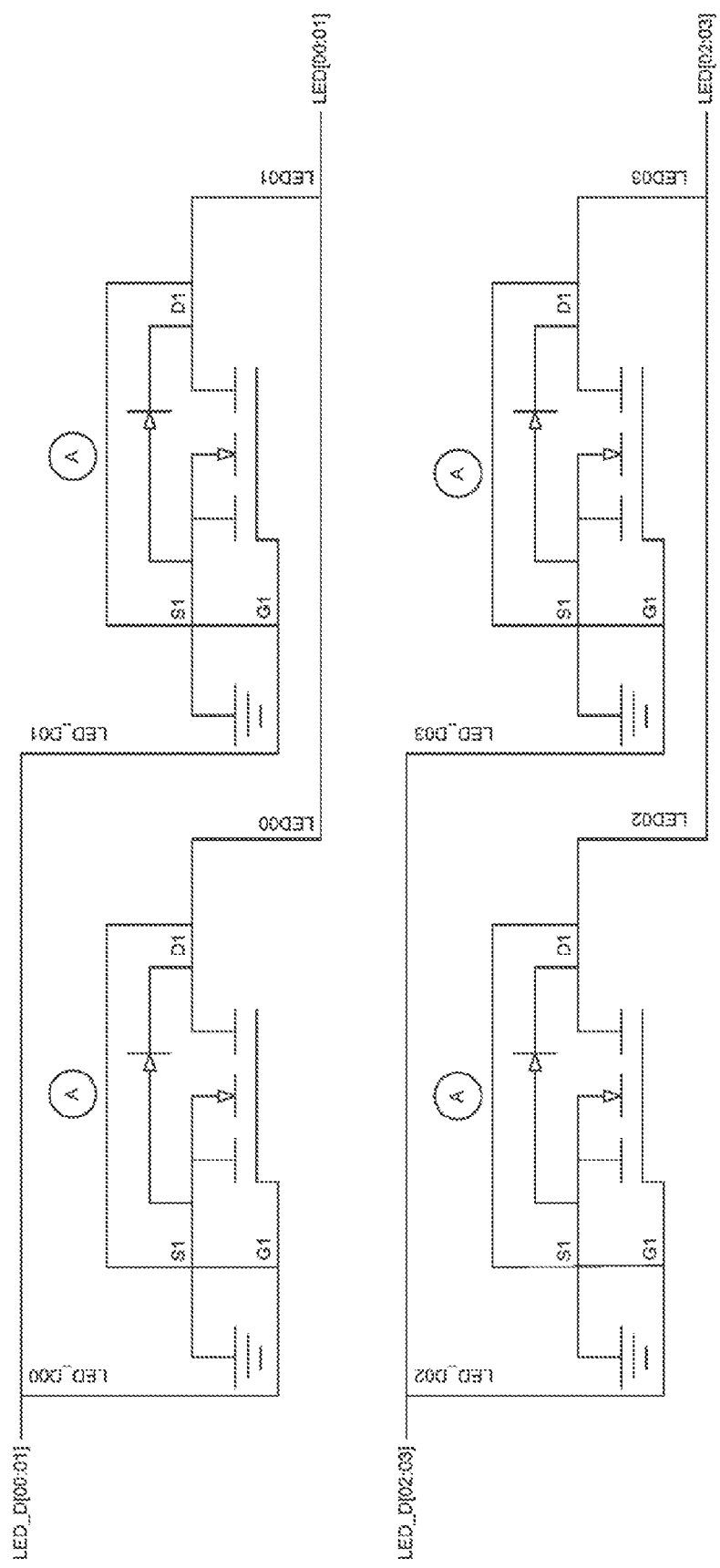
FIG. 12 is a diagram of LED switches, in accordance with an embodiment of the present invention.

Reference is now made to FIG. 12, which is a diagram of LED switches A, in accordance with an embodiment of the present invention. LED switches A are push-pull drivers that control LEDs 130. These push-pull drivers control gates of power transistors in each of the LED circuits LED00-LED15. In systems where the LED drivers supply sufficient current to operate LEDs 130, switches A may be removed, and LEDs 130 may be controlled directly by LED selectors 160.

iv. LED Current Limiters B

Figure 13A:
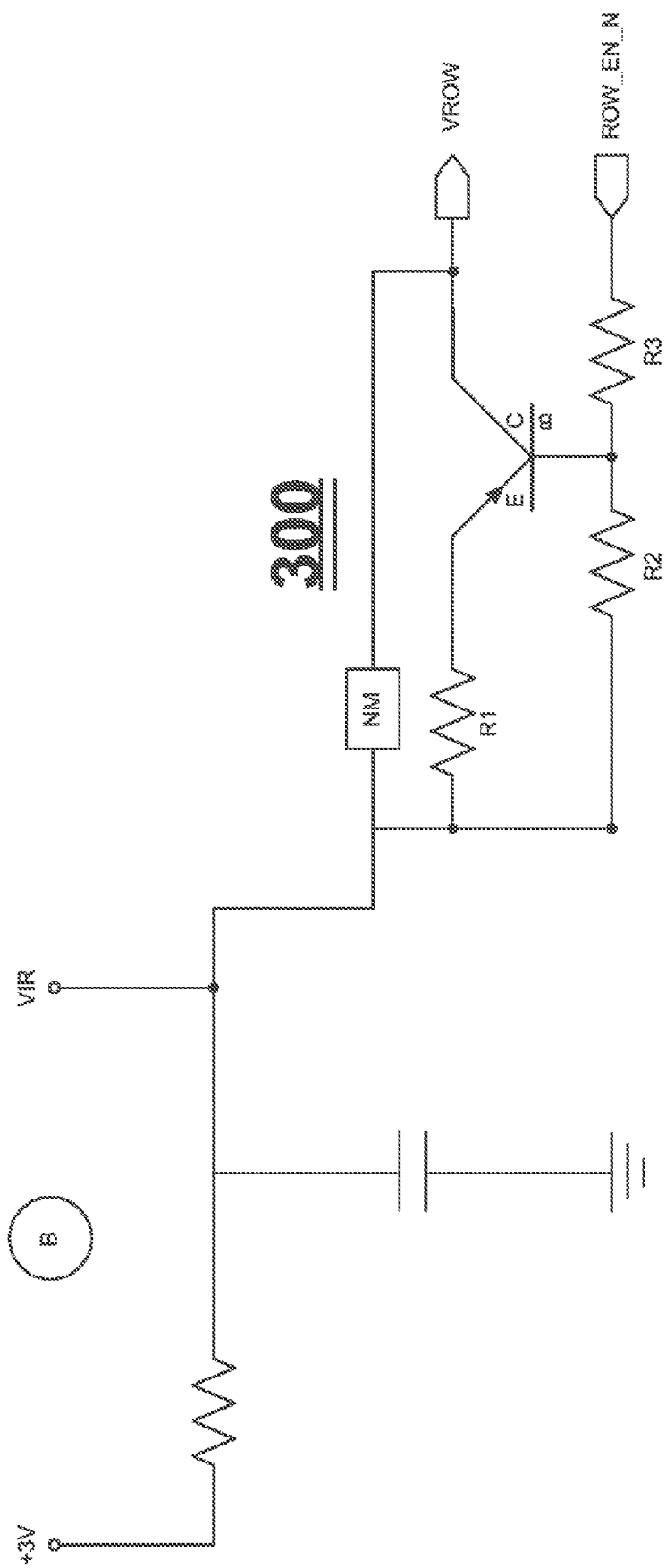
FIG. 13A is a diagram of a current limiter, used for limiting and directing current to LEDs, in accordance with an embodiment of the present invention.

Reference is now made to FIG. 13A, which is a diagram of current limiters B, used for limiting and directing current to LEDs through VROW and VCOL, in accordance with an embodiment of the present invention. As shown in FIG. 13A, a transistor 300 controls the current issued via VROW to the row LEDs 0-7 along the top of touch screen 100 (FIG. 5), by a signal denoted ROW_EN_N. Similarly, a second transistor (not shown) controls the current issued via VCOL to the column LEDs 8-15 along the right side of touch screen 100, by a signal denoted COL_EN_N. When ROW_EN_N is low, any of the row LEDs whose corresponding bit in shift register 110 is set, issue a light pulse. Similarly, when COL_EN_N is low, any of the column LEDs whose corresponding bit in shift register 110 is set, issue a light pulse. Transistor 300 may be a low saturation voltage type transistor, such as the transistors manufactured by NXP Semiconductors of The Netherlands.

The magnitude of the current gated by transistor 300, and issued by VROW, is determined by resistors R1, R2 and R3. Specifically, the current limit VROW, ignoring the base current, are given by:

$$I_{row} = \frac{+3 \text{ V} \frac{R2}{R2-R3} - Ube}{R1}$$

Where +3V is the input voltage to controller 150 (FIG. 6), and Ube is the base-to-emitter voltage on transistor 300.

Figure 13B:
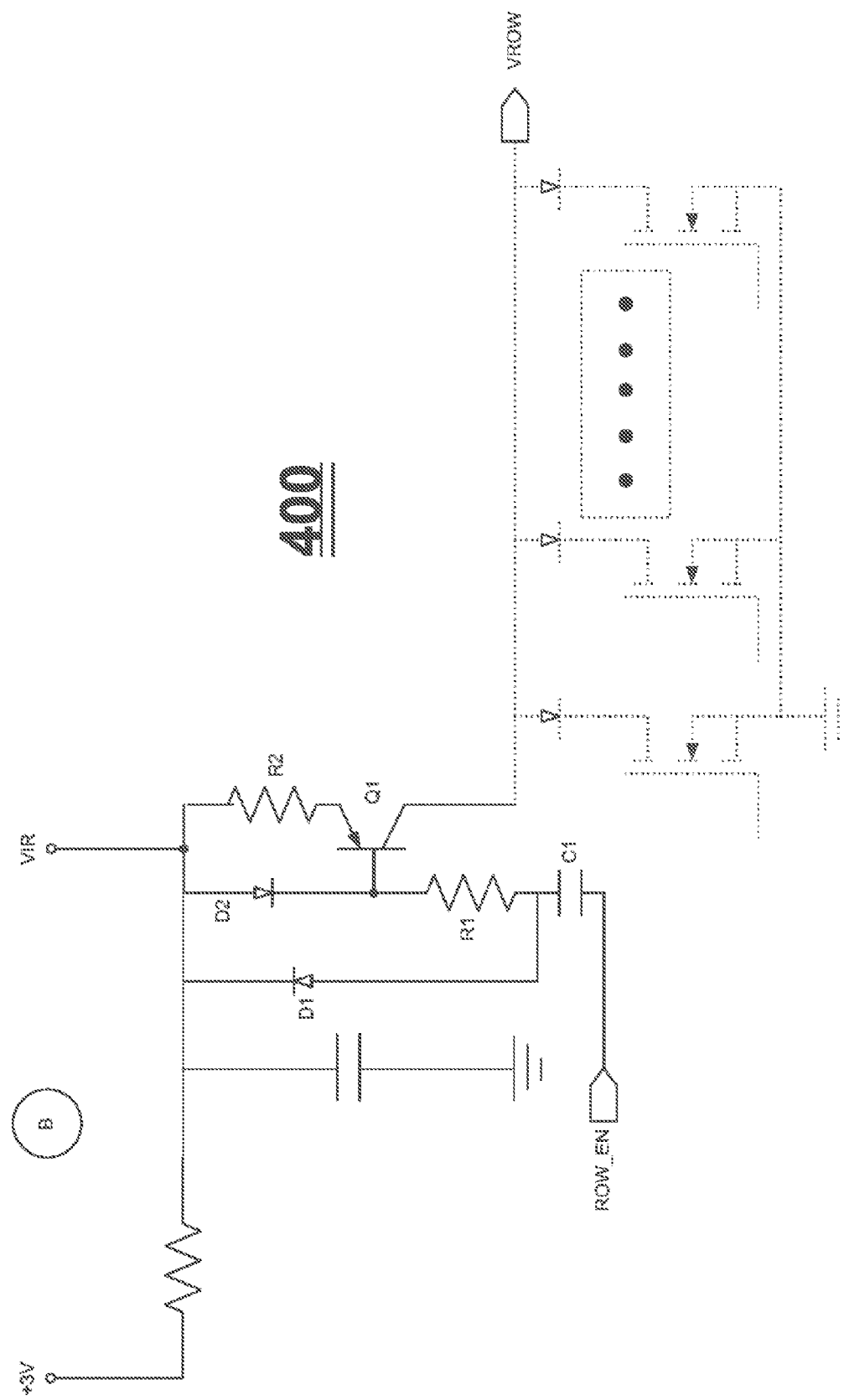
FIG. 13B is a diagram of an alternative current limiter, used for limiting and directing current to LEDs, in accordance with an embodiment of the present invention.

Reference is now made to FIG. 13B, which is a diagram of alternative current limiters B, used for limiting and directing current to LEDs through VROW and VCOL, in accordance with an embodiment of the present invention. As in FIG. 13A, only one current limiter is shown in FIG. 13B, receiving input ROW_EN and controlling current sent over VROW, and a similar current limiter (not shown) receives input COL_EN and controls current sent of VCOL. The dotted portion of circuit 400 represents LED circuits, and the dotted line connected to the solid line corresponds to VROW.

Shown in FIG. 13B is a bandgap voltage stabilizer, D2, or such other voltage stabilizer, which has a contact voltage drop across it irrespective of the current flowing through it. As long as the current is above a holding current, the voltage across D2 is constant. Resistor R1 supplies a diode current and a base current of NPN transistor Q1. The constant diode voltage, denoted by VZ, applies across the base of Q1 and emitter resistor R2.

When circuit 400 is operational, the voltage across R2, denoted by VR2, is given by VR2=VZ−VBE, where VBE is the base-emitter drop of Q1. The emitter current of Q1, denoted by IE, which is also the current through R2, denoted by IR2, is given by $$IR2 = \frac{VR2}{R2} = \frac{VZ - VBE}{R2}$$

Since VZ is constant, and VBE is approximately constant for a given temperature, it follows that VR2 is constant and IE is constant. Due to transistor action, current IE is approximately equal to the collector current of the transistor, denoted by IC, which is the current through the load. Thus, neglecting the output resistance of the transistor due to the Early effect, the load current is constant and the circuit operates as a constant current source.

Provided the temperature does not vary significantly, the load current is independent of the supply voltage, denoted by VR1, and the transistor's gain, R2, allows the load current to be set at any desired value. Specifically, R2 is given by $$R2 = \frac{VZ - VBE}{IR2} \approx \frac{V_z - 0.65}{IR2}$$

Since VBE is generally 0.65V for silicon devices.

VBE is temperature dependent; namely, at higher temperatures, VBE decreases. VZ is also temperature dependent; namely, at higher temperatures, VZ also decreases. As such, circuit 400 is self regulating as both voltages grow or decline simultaneously, resulting in a substantially constant voltage VR2.

When issuing a light pulse, signal ROW_EN is initially set to low. Capacitor C1 is also low, and begins to accumulate charge. Subsequently, ROW_EN is briefly set to high, to activate the light pulse, and the charge on C1 rises accordingly. The presence of bandgap diode D1 ensures that the charge on C1 drops quickly when ROW_EN is again set to low. As such, the presence of diode D1 protects circuit 400 from excessive charge that would otherwise result over the course of multiple pulses.

Resistance R1 is given by $$R1 = \frac{VS - VZ}{IZ + K \cdot IB}$$

where IB is given by $$IB = \frac{IC}{hFE(\min)} = \frac{IE}{hFE(\min)} = \frac{IR2}{hFE(\min)}$$

and hFE(min) is the lowest acceptable current gain for the specific transistor type being used. The parameter K ranges between 1.2 and 2.0, to ensure that R1 is sufficiently low and that IB is adequate.

v. PD Selector 170 and Shift Register 120

Figure 14:
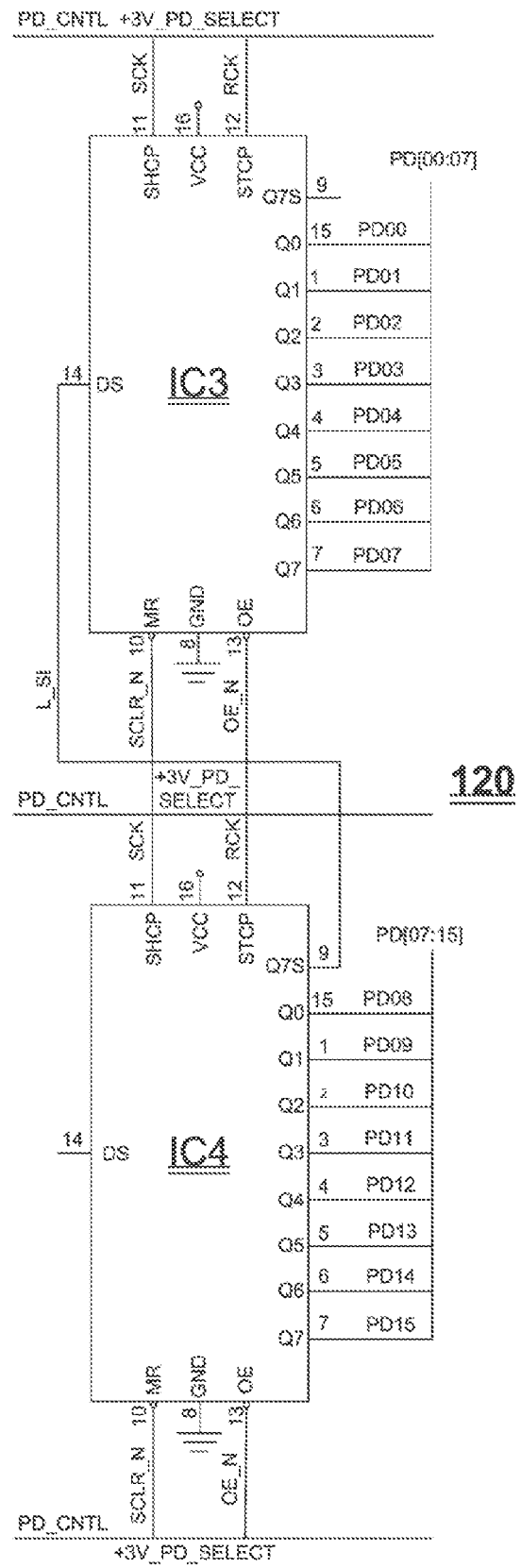
FIG. 14 is a diagram of a shift register for an array of 16 PDs, in accordance with an embodiment of the present invention.

Reference is now made to FIG. 14, which is a diagram of shift register 120 for an array of 16 PDs 140, in accordance with an embodiment of the present invention. The PD shift register shown in FIG. 14 is similar to the LED shift register in FIG. 8. In contrast to LEDs 130, PDs 140 are activated directly without intermediate switches such as switches A used with LEDs 130. Shift register 120 is connected to controller 150 via the PD_CTRL signal shown in FIG. 7. A description of the PD_CTRL signal now follows.

Initially, the PD outputs are set to high. A value of 1 in at least one bit of shift register 120 (FIG. 5) activates at least one corresponding PD by setting its output low. The PD output signal is sent back to controller 150 via signal PDROW or PDCOL.

Figure 15:
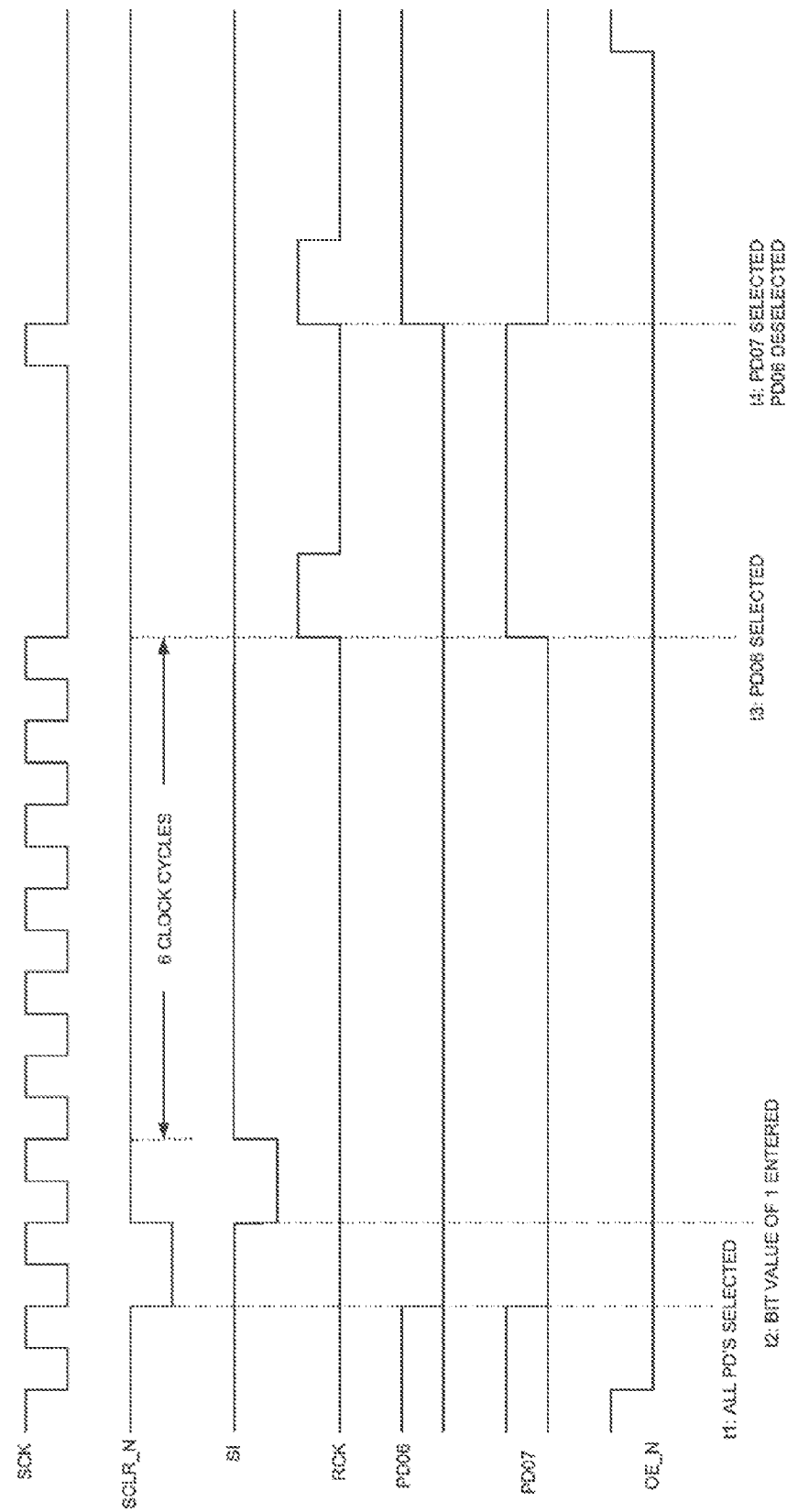
FIG. 15 is an illustration of a waveform for activating selected PDs, in accordance with an embodiment of the present invention.

Reference is now made to FIG. 15, which illustrates a waveform for activating selected PDs, in accordance with an embodiment of the present invention. FIG. 15 illustrates the use of signals SI, SCK, RCK, SCLR_N and OE_N from FIG. 7.

At time t1, a low SCLR_N signal sets all PD outputs low and clears shift register 120. At time t2, a low SI signal enters an activation value of "1" into the beginning of shift register 120. At each rising high edge of signal SCK, the data in shift register 120 is shifted further into the register, and a new bit value is entered in the beginning of the register. A rising high edge of signal RCK transfers data from shift register 120 into IC3 and IC4, selecting or deselecting corresponding PDs, depending on the bit values at corresponding positions within the bit string. Thus, a first high RCK signal selects a first PD based on data in shift register 120, followed by an SCK cycle shifting the data in shift register 120, followed by a second RCK signal that deselects the first PD and selects a second PD based on the shifted data. Thus at time t3, PD06 is selected, and at time t4, PD06 is deselected and PD07 is selected.

As described above for the matrix of LED drivers shown in FIG. 11, a similar matrix of PD receivers may be used in embodiments of the present invention. In this regard, reference is now made to FIG. 16, which is a diagram of a photodiode matrix 500 for a touch screen, in accordance with an embodiment of the present invention. Matrix 500 as shown in FIG. 16 includes a 4×4 array of PDs. In general, matrix 500 may include an array of m×n PDs. Matrix 500 requires only m+n IO connectors. In distinction, prior art systems require two IO connectors per PD to scan a plurality of PDs, and thus matrix 500 represents a savings of 2mn−m−n connectors. Each PD in matrix 500 is accessed by selecting an appropriate row connector and an appropriate column connector, corresponding to the row and column of the PD.

Shown in FIG. 16 are four 1-to-2 analog switches 510, and four push-pull drivers 520. Analog switches 510 are used to select a row, and push-pull drivers 520 are used to select a column. For each analog switch 510, one terminal connects to GND and the other terminal connects to receiver electronics 530, including an amplifier 540 and an ADC 550. Opening one of analog switches 510 to receiver electronics 530 and putting the remaining switches to GND serves to select an active receiver row. Driving one of push-pull connectors 520 low and driving the remaining connectors to high serves to select an active column. For matrix 500 shown in FIG. 13, the second from top analog switch is open and the second from left push-pull connector is low. The PD corresponding to the active row and column is shown circled in matrix 500.

It will be appreciated by those skilled in the art that the row and column coordinates of the PDs are not related to the physical placement of the PDs on touch screen 100. The row and column coordinates are only used for controlled selection of the PDs.

In accordance with an embodiment of the present invention, each PD receiver includes a photodiode 560 and a blocking diode 570. Blocking diodes 570 are used to prevent disturbances between neighboring diodes 560. According to an embodiment of the present invention, blocking diodes 570 are low backwards current and low backwards capacitance type diodes.

Further according to an embodiment of the present invention, the voltage +V at push-pull drivers 520 is greater than or equal to the voltage +Vref at receiver electronics 530. A slightly higher voltage +V at push-pull drivers 520 than +Vref improves performance, since all blocking diodes 570 are in reversed state, except for the blocking diode of the PD receiver corresponding to the active row and column.

vi. PD Receivers 140

In accordance with embodiments of the present invention, multiple configurations are described herein for PD receivers used with touch screen 100. In each configuration, the PD output is sent to an analog-to-digital converter (ADC). The ADC matches the expected output range, and the output range differs from one configuration to another. The accuracy of touch screen 100 depends to a large extent on the accuracy of the ADC.

The PD receiver configuration is determined by three parameters: (1) the number of PD signals that enter controller 150, (2) the type of integrator circuit used to bias and sample PD current as it enters controller 150, and (3) the type of signal filter and amplifier circuit used, if any.

Regarding (1) the number of PD signals that enter controller 150, in a first PD receiver configuration, the PDs along each edge of touch screen 100 have separate outputs. Thus, at least one circuit is provided for PDs that are arranged along one edge of touch screen 100, and at least one other circuit is provided for PDs arranged along the other edge. In this regard, reference is made back to FIG. 5, which shows all PD outputs along one edge channeled into signal PDROW, and all PD outputs along a second edge channeled into signal PDCOL. A capacitor and a biasing resistor are coupled to each of the ADC input signals to control the current and to set a voltage amplitude range.

In a second PD receiver configuration, a limited number of PDs are connected to each ADC input. PDs may be grouped, for example, into sections of up to four PDs per section. Each output thus integrates four PDs. An advantage of this second configuration is less capacitance and less disturbance from non-selected neighboring PDs.

Figure 17:
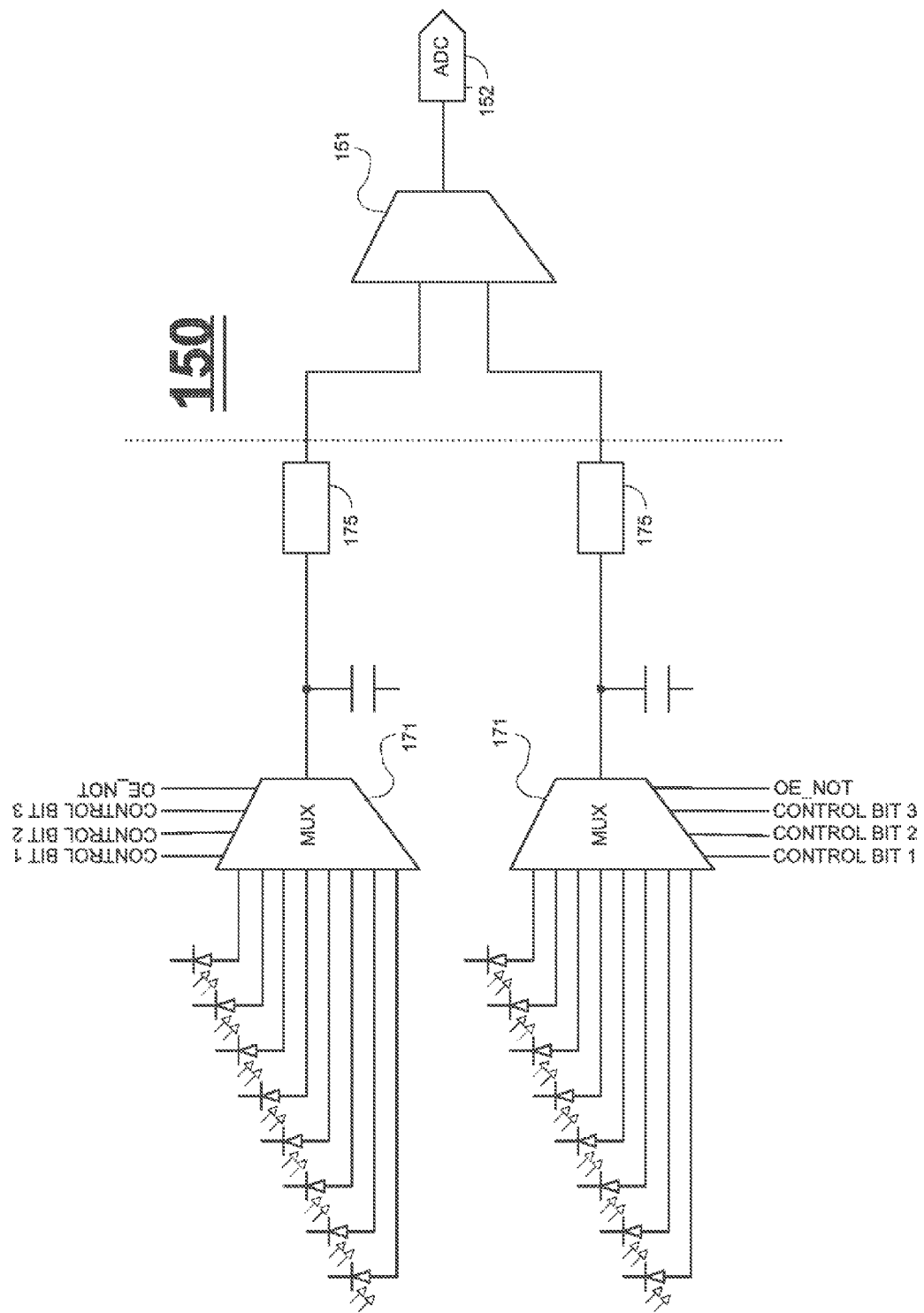
FIG. 17 is a diagram of a PD output selector for use in a touch screen, in accordance with an embodiment of the present invention.

In order to further reduce capacitance and disturbance from non-selected neighboring PDs, an embodiment of the present invention adds at least one multiplexer that outputs only the selected PD signal. In this regard reference is now made to FIG. 17, which is a diagram of multiplexer 171, which operates as a PD output selector, in accordance with an embodiment of the present invention. FIG. 17 shows two parallel multiplexers 171, which each receives eight PD signals as input, and generates a single output signal. As described hereinabove with reference to FIG. 6, the PD output is processed by signal filters and amplifiers 175. For a touch screen with 64 PDs, in a configuration using eight multiplexers 171, each multiplexer taking eight PD input signals and outputting to a signal filter and amplifier 175, eight such filters and amplifier 175 are used.

The dotted line shown in FIG. 17 separates components internal to controller 150, which are shown to the right of the dotted line, from components external to controller 150, which appear to the left of the dotted line. Controller 150 includes a multiplexer 151, which connects to an analog to digital converter 152. The signals entering multiplexers 171 from the top are control signals from controller 150. Each such control signal uses three bits, to control selection of one of the eight input PDs. In general, n control bits suffice for controlling selection of up to $2^n$ input PDs.

In addition to the three control bits used to control selection of the input PDs, each multiplexer 171 receives an output enable control bit, OE_NOT, from controller 150. When OE_NOT is set to zero, the PD driver outputs the selected PD signal. When OE_NOT is set to one, the PD driver outputs a high impedance signal.

TABLE I summarizes the logical input-output relationships used with each PD multiplexer 171.

TABLE I

Logical input-output relationship for PD multiplexers

| Control Bit 1 | Control Bit 2 | Control Bit 3 | OE_NOT | Output |
|---|---|---|---|---|
| 0 | 0 | 0 | 0 | In1 |
| 0 | 0 | 0 | 1 | HighZ |
| 1 | 0 | 0 | 0 | In2 |
| 1 | 0 | 0 | 1 | HighZ |
| 0 | 1 | 0 | 0 | In3 |
| 0 | 1 | 0 | 1 | HighZ |
| 1 | 1 | 0 | 0 | In4 |
| 1 | 1 | 0 | 1 | HighZ |
| 0 | 0 | 1 | 0 | In5 |
| 0 | 0 | 1 | 1 | HighZ |
| 1 | 0 | 1 | 0 | In6 |
| 1 | 0 | 1 | 1 | HighZ |
| 0 | 1 | 1 | 0 | In7 |
| 0 | 1 | 1 | 1 | HighZ |
| 1 | 1 | 1 | 0 | In8 |
| 1 | 1 | 1 | 1 | HighZ |

It will be appreciated by those skilled in the art that the first and second configurations, with and without multiplexers 171, are based on providing PD_ROW and PD_COL signals, each signal corresponding to a signal-generating circuit, or to a plurality of signal-generating circuits.

In accordance with the second configuration, separate current integrator cells are assigned to subgroups of column PDs and to subgroups of row PDs. E.g., one current integrator may be assigned to eight PDs. In this embodiment, multiple inputs to controller 150 are provided, one input for each subgroup. Controller 150, as shown in FIG. 7, may be used this way to accommodate 64 PDs grouped into eight subgroups, via eight input signals to controller 150. Specifically, the eight inputs are PD_ROW_1, PD_ROW_2, PD_ROW_3, PD_ROW_4, PD_COL_1, PD_COL_2, TOUCH_SIGNAL and TOUCH_SIGNAL_2, where TOUCH_SIGNAL and TOUCH_SIGNAL_2 are used as PD_COL_3 and PD_COL_4, respectively.

vii. PD Current Integrator 180

With regard to the type of integrator circuit used to bias and sample PD current as it enters controller 150, several alternative configurations and methods of operation are provided.

According to a first configuration, each of the PD_ROW and the PD_COL signals entering controller 150 is coupled to a biasing resistor that sets the linear amplification, and to a capacitor that integrates the PD current over time. In this regard reference is now made to FIG. 18A, which is a diagram of a resistor-based current integrator 180 used in conjunction with PD receivers 140 in a touch screen 100, in accordance with an embodiment of the present invention. The dotted line shown in FIG. 18A separates components internal to controller 150, which are shown to the right of the dotted line, from components external to controller 150, which appear to the left of the dotted line.

According to a second configuration, the biasing resistor is removed, and a transistor is used to set a voltage amplitude range.

Figure 18B:
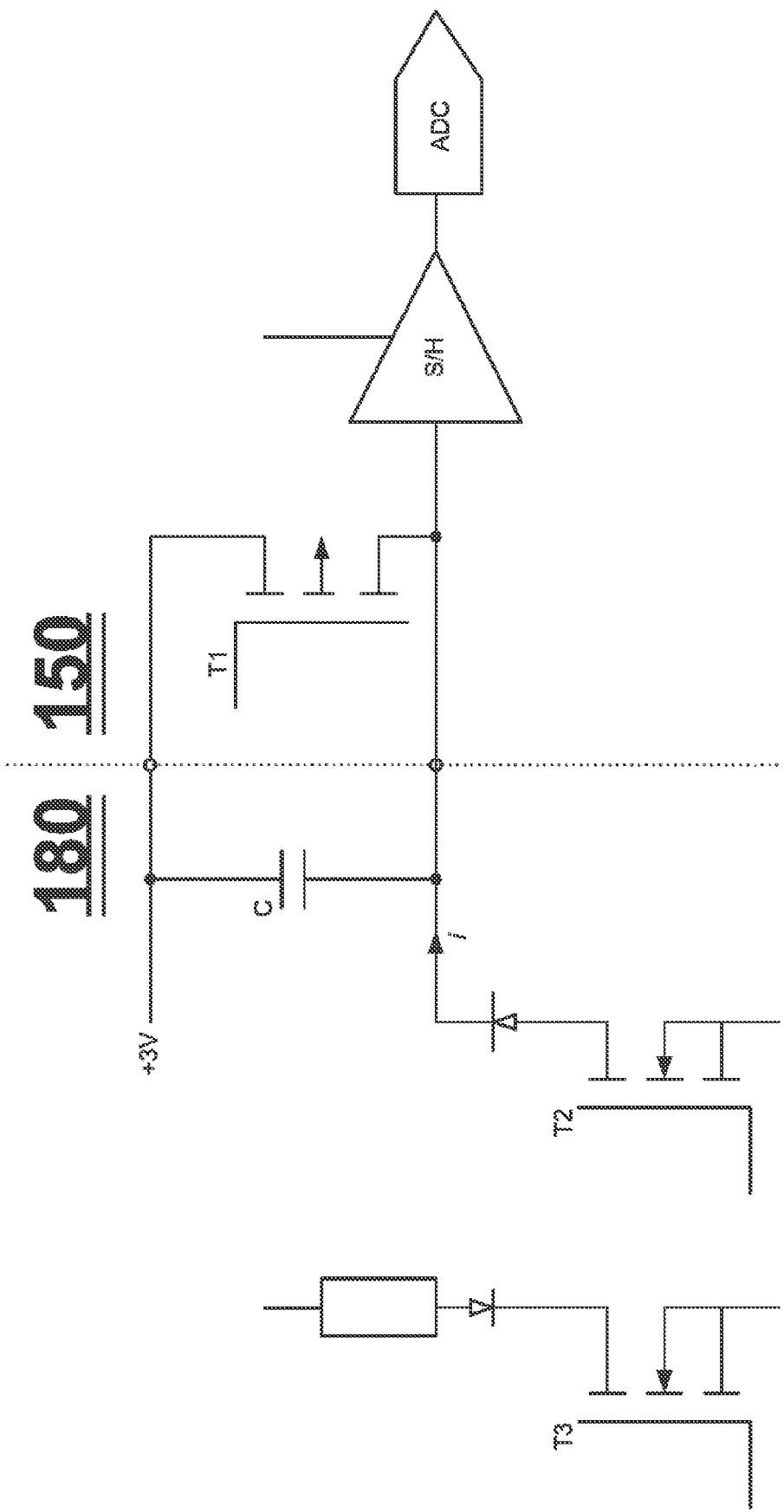
FIG. 18B is a diagram of a transistor-based current integrator used in conjunction with PD receivers in a touch screen, in accordance with an embodiment of the present invention.

In this regard, reference is now made to FIG. 18B, which is a diagram of a transistor-based current integrator 180 used in conjunction with PD receivers 140 in a touch screen 100, in accordance with an embodiment of the present invention. The dotted line shown in FIG. 18B separates components internal to controller 150, which are shown to the right of the dotted line, from components external to controller 150, which appear to the left of the dotted line. A transistor T1 is located within controller 150, and is used to efficiently control current sampled by a selected PD. In alternative embodiments of the present invention, components external to controller 150 are used to control the current.

When transistor T1 is open, capacitor C charges, and integrates the current, i, flowing through the photodiode. The voltage over C is given by $$V = \int C \cdot i \, dt$$

When transistor T1 is closed, capacitor C discharges, and the voltage over C is reduced to 0 volts. In order to obtain a precise measure of the current, the sample and hold (S/H) element in FIG. 18B is discharged before sample integration begins, and S/H is open through sample integration time. In this embodiment, the analog to digital converter ADC in FIG. 18B is not active during integration time.

In an alternative embodiment, S/H is configured to sample at the end of the integration period, without previously having discharged the S/H internal capacitors. In this embodiment, there may be a voltage differential between the capacitor associated with S/H and the integrator circuit.

As indicated hereinabove with reference to controller 150, elements illustrated in the figures as being external to controller 150 may, in other implementations, reside internal to controller 150.

Figure 19:
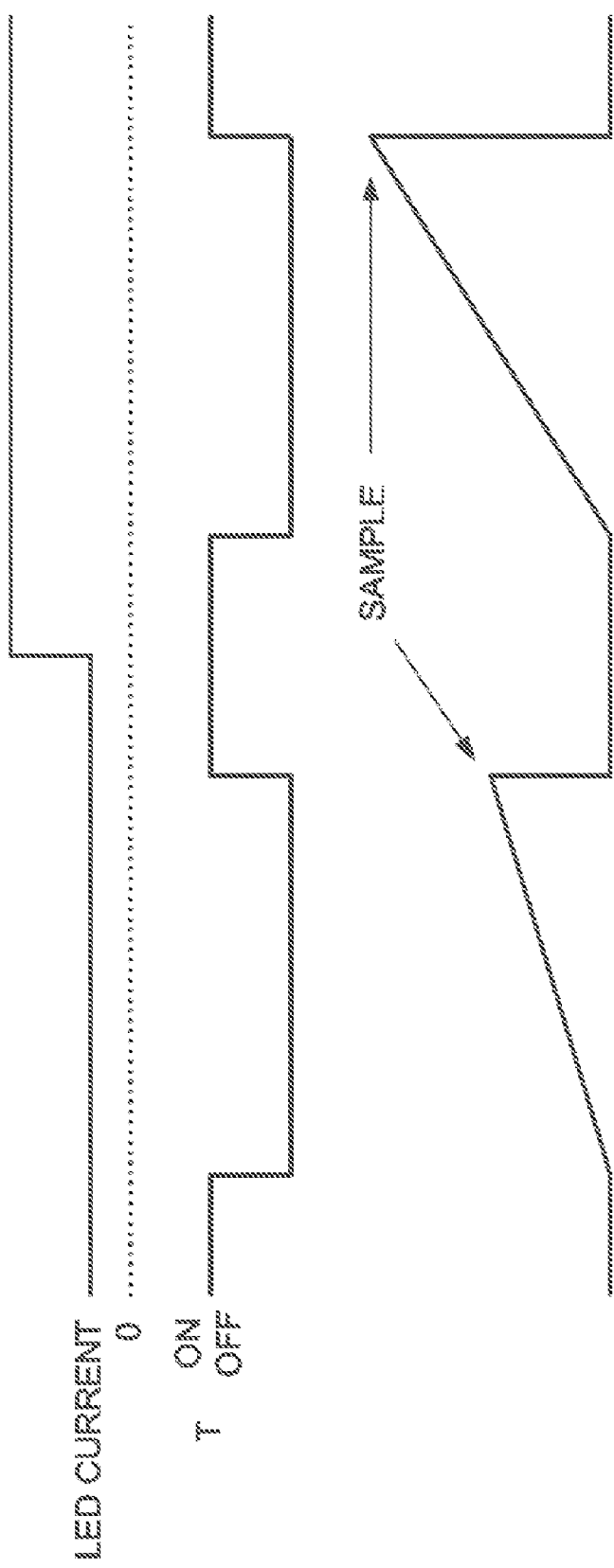
FIG. 19 is an illustration of current integration over time, in accordance with an embodiment of the present invention.

Reference is now made to FIG. 19, which illustrates current integration over time, in accordance with an embodiment of the present invention. As shown in FIG. 19, when transistor T1 is turned on, the current in capacitor C is reset to zero. When transistor T1 is turned off, capacitor C begins integrating current over time. The measurement used is the current value at the end of the sample window.

The transistor-based circuit offers several advantages over the use of resistors for setting the linear amplification of the PD signal. The resistors have a higher bias to low frequency noise, such as ambient light and, as such, the ambient light is amplified more than the light pulse. Moreover, the system measures the ambient light sensed by a designated PD prior to issuing a light pulse from a selected LED, in order to establish a baseline value. Thus resistor bias to low frequency ambient light amplifies the ambient light measurement more than the light pulse measurement. By eliminating these resistors, the system registers similar levels of bias for both ambient light measurements and light pulse measurements.

Another advantage of the transistor-based circuit is that the resistors in the resistor configurations require longer time to completely discharge between measurements, than transistor T1. In turn, this enables use of shorter intervals between measurements of successive PDs, as well as between successive measurements of the same PD. In particular, in cases in which a successive PD senses less ambient light, or other such noise, than a previous PD, a relatively long discharge interval is required to fully discharge the circuit below the ambient level of the previous PD with the resistor configurations. This problem is overcome in the transistor-based circuit, in which the resistors are eliminated. Since the current measurement is linearly integrated over time, with little residual current present in the measuring circuit, the transistor-based circuit requires uniform measuring intervals. As such, this configuration requires precise timing to ensure that the measurement be integrated over the same amount of time. In distinction, when resistors are used, because they are inherently less precise, sampling has less stringent timing requirements. Clock jitter, for example, impairs performance of a system with transistor-based circuits, more so that for systems with resistors.

Figure 20:
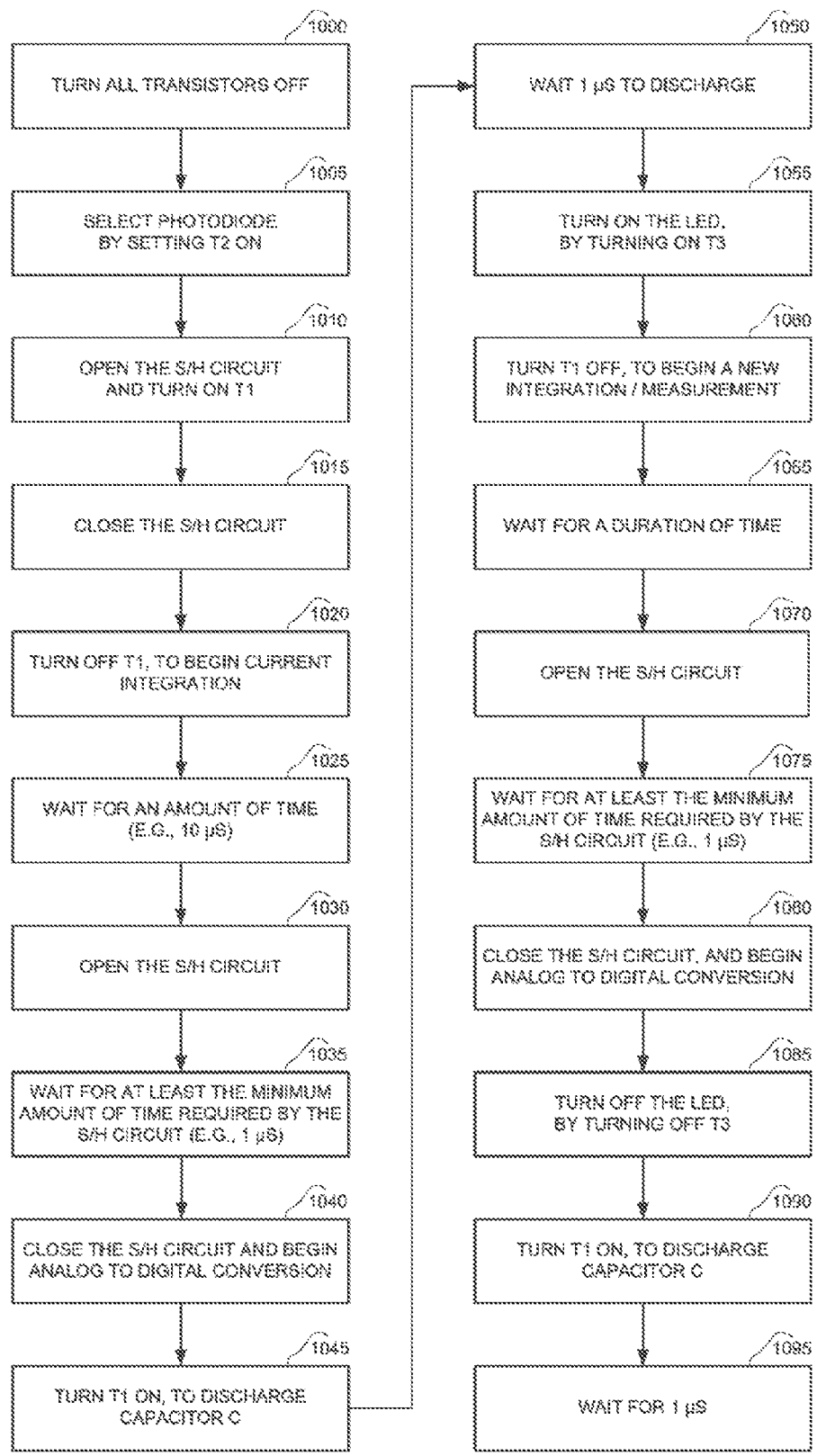
FIG. 20 is a simplified flowchart of a method for PD sampling, in accordance with an embodiment of the present invention.

Reference is now made to FIG. 20, which is a simplified flowchart of a method for PD sampling, in accordance with an embodiment of the present invention. The method shown in FIG. 20 relates to the transistor-based circuit of FIG. 18B, used to sample PDs.

At step 1000 all transistors, T1, T2 and T3, are turned off. At step 1005 a PD is selected by turning on transistor T2. At step 1010 the S/H circuit is opened, and transistor T1 is turned on. This causes capacitor C and the capacitor inside the S/H circuit to discharge. If the S/H circuit is not discharged, then residuals from previous measurements may arise. At step 1015 the S/H circuit is closed, for holding. At step 1020 transistor T1 is turned off, in order to begin current integration. At step 1025 the method waits a designated amount of time, such as 10 µs. At step 1030 the S/H circuit is opened. At step 1035 the method waits for at least the minimum amount of time required by the S/H circuit; e.g., 1 µs. At step 1040 the S/H circuit is closed, and the analog to digital conversion begins.

At step 1045 transistor T1 is turned on, in order to discharge capacitor C. At step 1050 the method waits 1 µs for the capacitor for discharge. At step 1055 the LED is turned on, by turning on transistor T3.

At step 1060 transistor T1 is turned off, to begin a new integration/measurement. At step 1065 the method waits for a designated amount of time, generally the same amount of time as in step 1025. Step 1065 is done for performance. At step 1070 the S/H circuit is opened. The conversion from step 1040 must be ready and stored. At step 1075 the method waits for at least the minimum amount of time required by the S/H circuit; e.g., 1 µs. At step 1080 the S/H circuit is closed, and the analog to digital conversion begins. At step 1085 the LED is turned off, by turning off transistor T3. At step 1090 transistor T1 is turned on, in order to discharge capacitor C. Finally, at step 1095 the method waits 1 µs for the capacitor for discharge.

In accordance with an embodiment of the present invention, steps 1000-1095 of FIG. 20 are repeated several times, e.g., 5-20 times, in order to obtain a plurality of measurements when the LED is on, and a plurality of measurements when the LED is off. The background ambient light is then measured by accumulating values when the LED is on and subtracting values when the LED is off.

Figure 21:
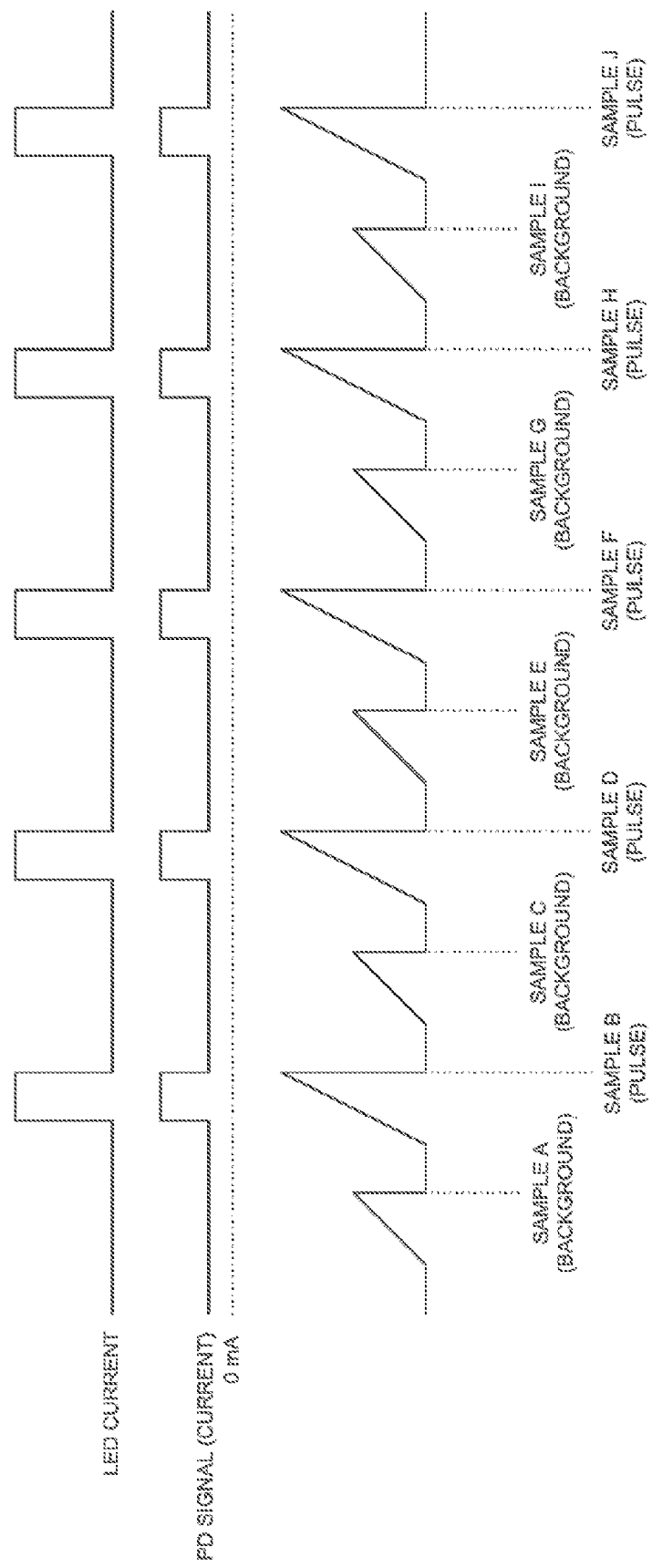
FIG. 21 is an illustration of measuring ambient light by summing pulses when an LED is on and subtracting pulses when the LED is off, in accordance with an embodiment of the present invention.

In this regard, reference is now made to FIG. 21, which illustrates measuring ambient light by summing pulses when an LED is on and subtracting pulses when the LED is off, in accordance with an embodiment of the present invention. In terms of samples A thru J shown in FIG. 21, the accumulated signal is B−A+D−C+F−E+H−G+J−I. A signal to noise ratio is given by $$\frac{S}{N} = \frac{\sum \text{signals}}{\sqrt{\sum \text{noise}^2}}$$

The signal is accumulated based on a voltage metric that is a square of power. The noise is accumulated by a power metric that is the square root of the voltage. In case the signal is significantly less than the background light, then DC blocking is used.

It will be appreciated by those skilled in the art that the method of FIG. 20 affords many advantages, including inter alia:

quick switch between measurements of different PDs, and short settle time;
substantially equal amplification of background (AC) and light pulses (DC); and
ability to measure pulse trains.

In an alternative embodiment of the present invention, integration and analog to digital conversion are performed in sequence. This alternative embodiment has the advantage that the capacitor in the S/H circuit is discharged prior to each current integration, providing for more accurate measurement. Thus if this alternative embodiment is implemented using an ASIC, then the integrator and the S/H may be in the same function block. However, if analog to digital conversion of a first signal is to be done simultaneous with integration of a second signal, then the integrator and the S/H should be in separate function blocks.

Figure 22:
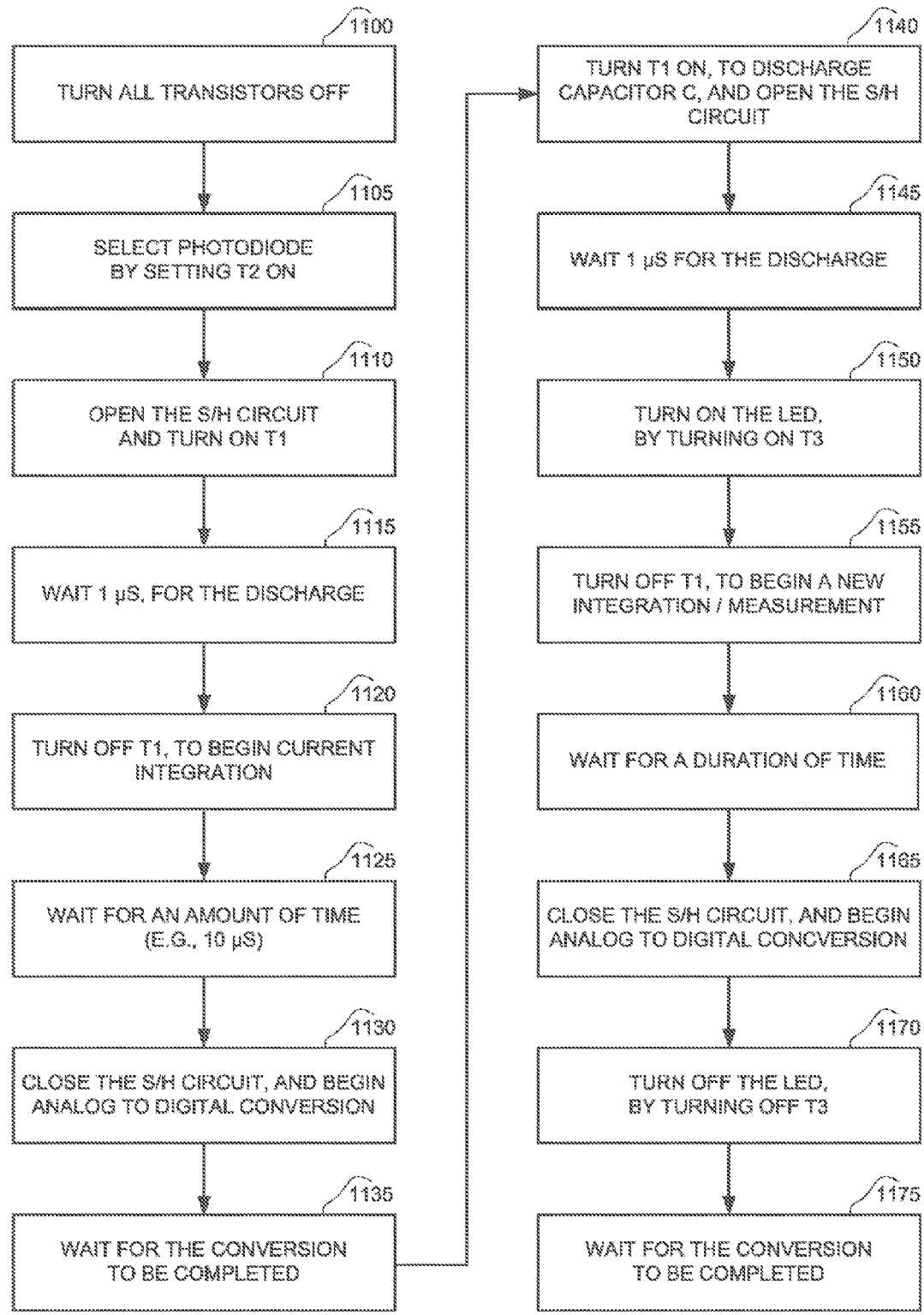
FIG. 22 is a simplified flowchart of an alternative method for PD, in accordance with an embodiment of the present invention.

Reference is now made to FIG. 22, which is a simplified flowchart of an alternative method for PD sampling, in accordance with an embodiment of the present invention. The method shown in FIG. 22 relates to the transistor-based circuit of FIG. 18B, used to sample PDs.

At step 1100 all transistors, T1, T2 and T3, are turned off. At step 1105 a PD is selected by turning on transistor T2. At step 1110 the S/H circuit is opened and transistor T1 is turned on. This serves to discharge capacitor C and the capacitor inside the S/H circuit. If the S/H circuit is not discharged, then residuals from previous measurements may arise. At step 1115 the method waits 1 µs for the capacitor to discharge. At step 1120 transistor T1 is turned off, to begin current integration. At step 1125 the method waits a designated amount of time; e.g., 10 µs. At step 1130 the S/H circuit is closed, and the analog to digital conversion begins. At step 1135 the method waits for the conversion from step 1130 to complete.

At step 1140 transistor T1 is turned on, to discharge capacitor C, and the S/H circuit is opened. At step 1145 the method waits 1 µs for the capacitor to discharge. At step 1150 the LED is turned on, by turning on transistor T3. At step 1155 transistor T1 is turned off, to begin a new integration/measurement. At step 1160 the method waits a designated amount of time, generally the same amount of time as from step 1125. Step 1160 is done for performance.

At step 1165 the S/H circuit is closed, and the analog to digital conversion begins. At step 1170 the LED is turned off, by turning off transistor T3. At step 1175 the method waits for the conversion to complete.

As with the method of FIG. 20, steps 1105-1175 of FIG. 22 are repeated for a plurality of pulses. Values when the LED is on are accumulated, and values when the LED is off are subtracted, in order to measure the ambient light.

viii. PD Signal Filter and Amplifier 175

Figure 23A:
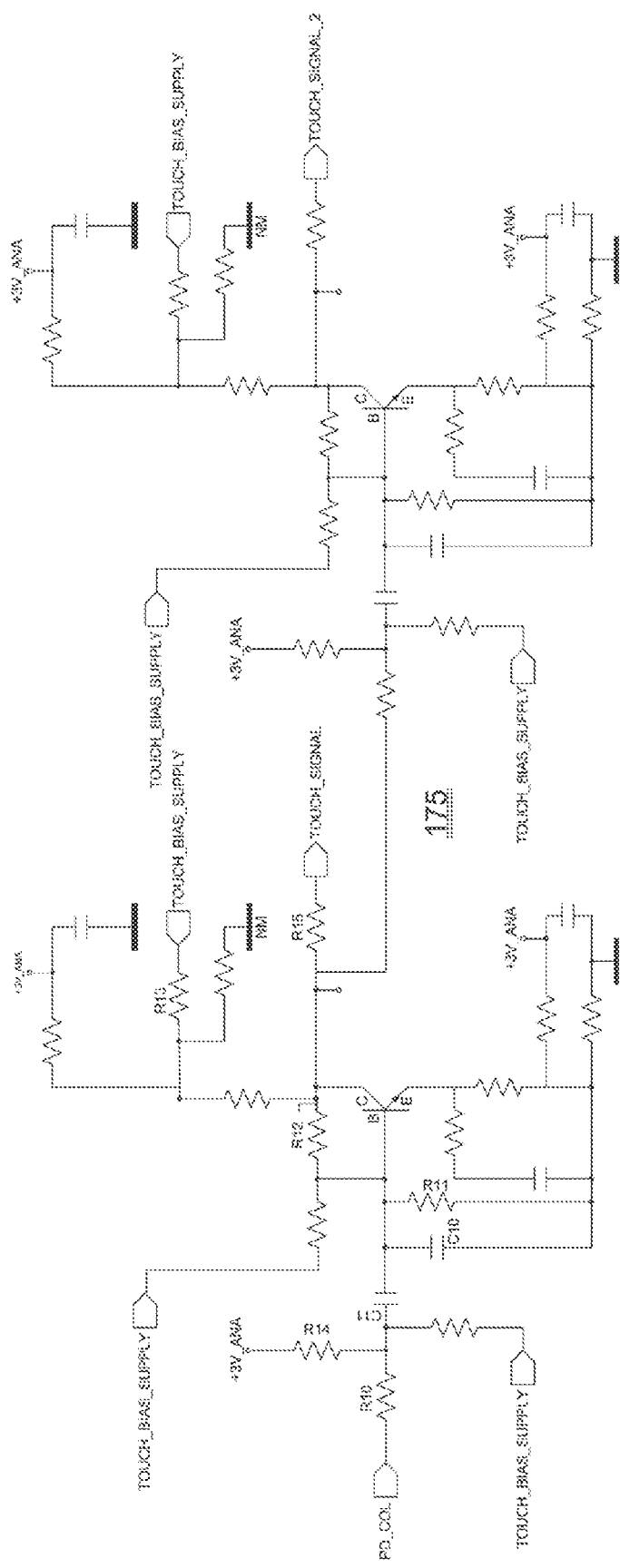
FIG. 23A is a circuit diagram of a signal filter and amplifier, used for PDs arranged along one edge of a touch screen, in accordance with an embodiment of the present invention.

Discussion now turns to the type of signal filter and amplifier circuit used, if any. FIG. 23A is a circuit diagram of signal filter and amplifier 175 used for PDs arranged along one edge of touch screen 100, in accordance with an embodiment of the present invention. The input to signal filter and amplifier 175, denoted PD_COL, is the output current from a selected column PD. The output current of signal filter and amplifier 175 is sent to controller 150 via the TOUCH_SIGNAL signal shown in FIG. 7. A similar circuit (not shown), used for PDs arranged along the other edge of touch screen 100, processes current from a selected row PD, and sends the output current to controller 150 via one of the PD_ROW_n signals shown in FIG. 7. In this embodiment, the remaining PD_ROW and PD_COL signals are not used. Additional filter and amplifier circuits are used when PDs along one edge are grouped into subgroups as described above with respect to the second PD receiver configuration. In this case additional PD_ROW and PD_COL signals are used as required by the number of ADC inputs to controller 150.

The circuit shown in FIG. 23A includes two filter and amplifier paths. One path ends at TOUCH_SIGNAL in the middle of FIG. 23A, and another path, which performs a second filter and amplification, ends at TOUCH_SIGNAL_2 at the right of FIG. 23A. In one embodiment of the present invention, both outputs TOUCH_SIGNAL and TOUCH_SIGNAL_2 are connected to controller 150, and firmware running on controller 150 is used to select one of the two signals. In another embodiment of the present invention, only one of the outputs is connected to controller 150.

Signal filter and amplifier 175 includes passive sub-circuits that have two resistors, such as resistors R10 and R11, and one capacitor, such as capacitor C10. Resistors such as R12 and R13 are pass-through zero-ohm resistors.

PD_COL connects with the ADC input via resistors R10, R12, R13 and R14, and via capacitors C10 and C11. According to an embodiment of the present invention, capacitor C11 is a zero-ohm capacitor. The signal level is set by resistor R13 and capacitor C1. R13 sets the voltage amplitude range entering the ADC, and C1 integrates the current to generate voltage input to the ADC. According to this configuration, the signal does not have to be biased to within a predetermined range, such as between V and VCC, because open collectors are used to read the active PD output value. It is noted in FIG. 23A that the signal is in the range of +3V and below.

Figure 23B:
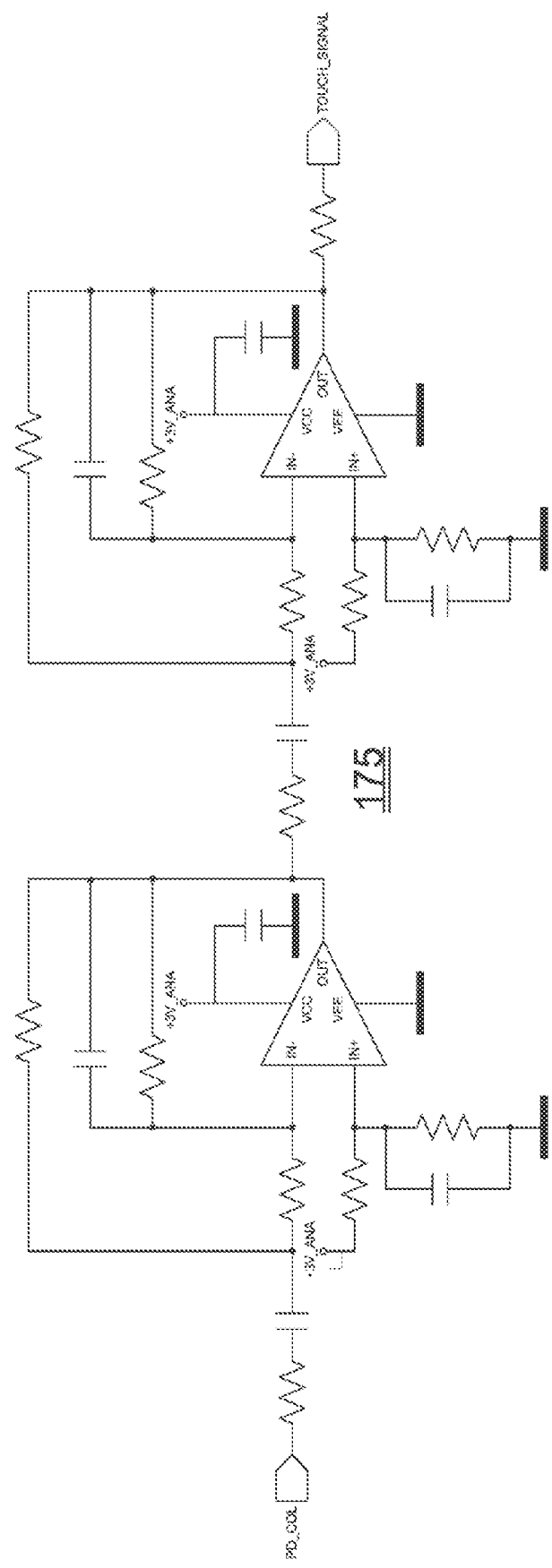
FIG. 23B is a circuit diagram of an alternative signal filter and amplifier circuit, using an OP amplifier, in accordance with an embodiment of the present invention.

An alternative signal filter and amplifier circuit is shown in FIG. 23B, in accordance with an embodiment of the present invention. In this embodiment, an OP amplifier acts like a low impedance current to a voltage amplifier; i.e., a trans-impedance. This configuration results in less sensitivity to capacitance and truer current sensing. For this embodiment, the relationship between light and current is substantially linear.

Referring to FIG. 23B, signal filter and amplifier 175 receives as input the output current from a selected column PD, denoted PD_COL. The output current of signal filter and amplifier 175 is sent to controller 150 via the TOUCH_SIGNAL signal shown in FIG. 7. A similar circuit (not shown), used for PDs arranged along the other edge of touch screen 100, processes current from a selected row PD, and sends the output current to controller 150 via the TOUCH_SIGNAL_2 signal shown in FIG. 7

This embodiment uses a large phase margin in order to eliminate high amplification grade that causes the amplifier to oscillate.

The discrete transistor amplifier circuits of FIG. 23A are of advantage in having high frequency response and low cost. However, they are of disadvantage in having non-linear integration over time.

A feature of the discrete transistor amplifier circuits of FIG. 23A is that DC amplification is reduced, and the PD receiver may thus be made entirely AC current. However, problems may arise when shifting between PDs having a large signal difference between them. E.g., suppose a first PD receives little light and is amplified by the transistor-based amplifier to be within a designated range, and a second PD receives substantially more light, based on its position relative to ambient light sources. Then the transistor-based amplifier, having greatly amplified the first signal, will also greatly amplify the second AC signal, and also the rising edge of the difference between signals, including the second signal DC values. The combination of these amplified DC values, together with the AC of the second PD, may amplify the resulting signal beyond the maximum voltage, say, 3V.

2. Optics of Touch Screen 100

Figure 24:
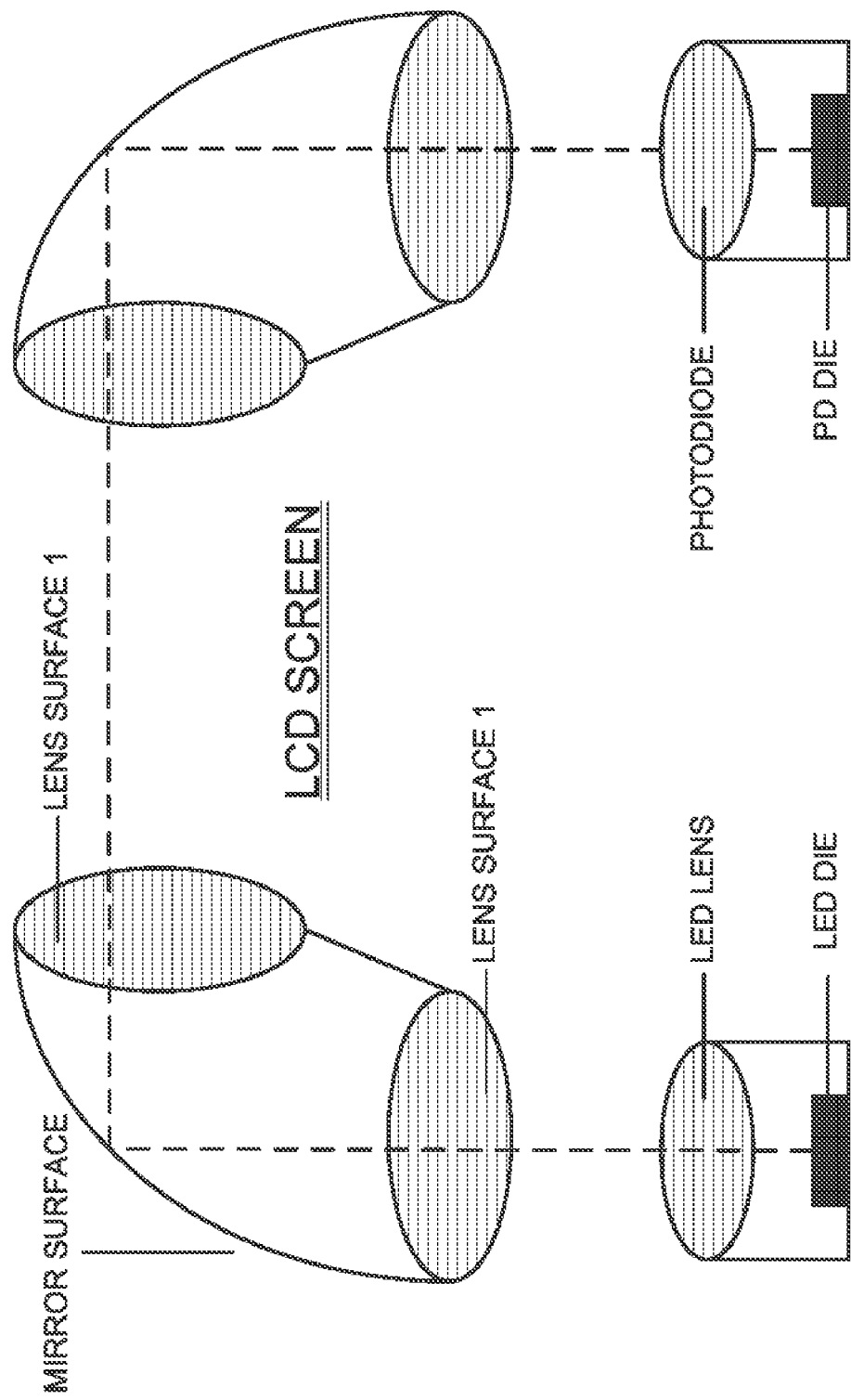
FIG. 24 is a diagram of a prior art lens assembly for an LED and PD.

Reference is now made to FIG. 24, which is a diagram of a prior art lens assembly for an LED and PD.

Figure 25A:
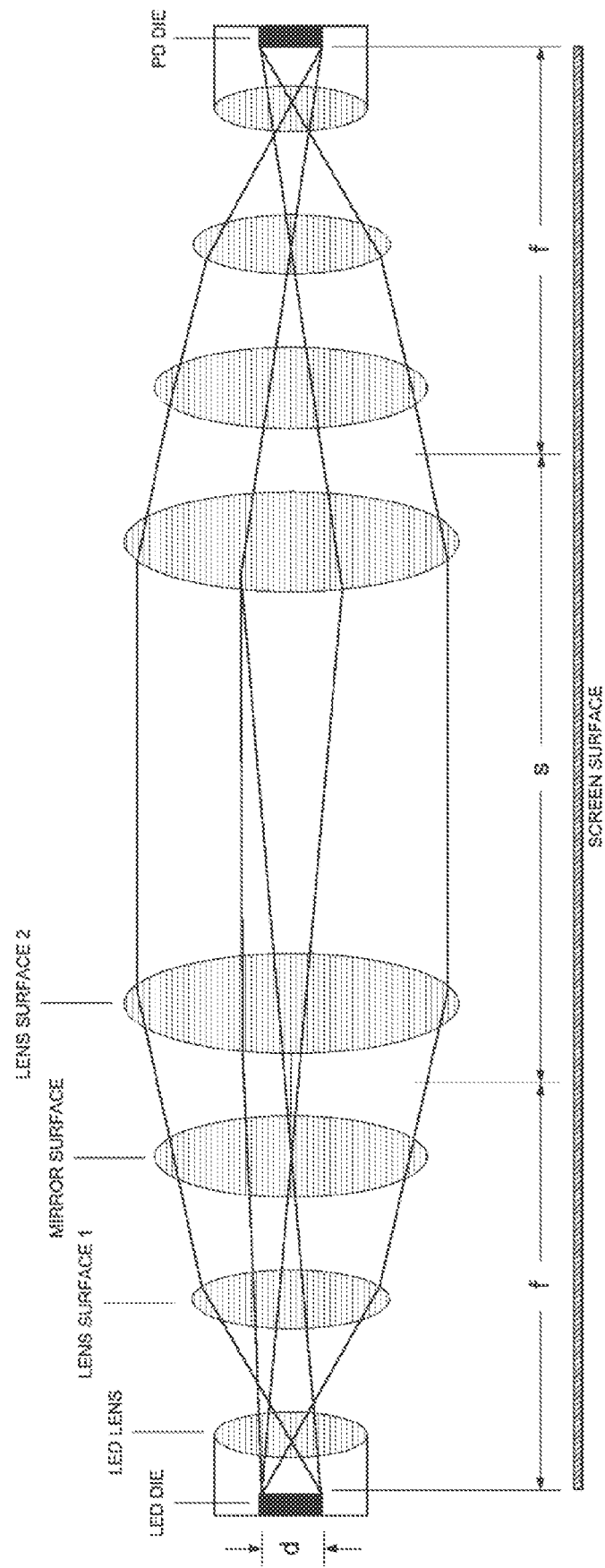
FIG. 25A is a diagram of a lens assembly for use with LEDs and PDs for a touch screen, in accordance with an embodiment of the present invention.

Reference is now made to FIG. 25A, which is a diagram of a lens assembly for use with LEDs and PDs for a touch screen, in accordance with an embodiment of the present invention. Shown in FIG. 25A are four optical surfaces for the LED lens side, and four optical surfaces for the PD side. The focal length, f, is not necessarily the same as the distance from the LED to the last lens surface, LENS SURFACE 2. It may be larger or smaller than such distance. If the focal length is smaller than such distance, then the light spreads over a larger receiving area, and the receiving side scans a larger area and thus receives more background light. Nevertheless, there is an advantage to having a focal length slightly smaller than the distance from the LED to the last lens surface, because an optimized design is able to sense for tolerances of the optical elements.

Figure 25B:
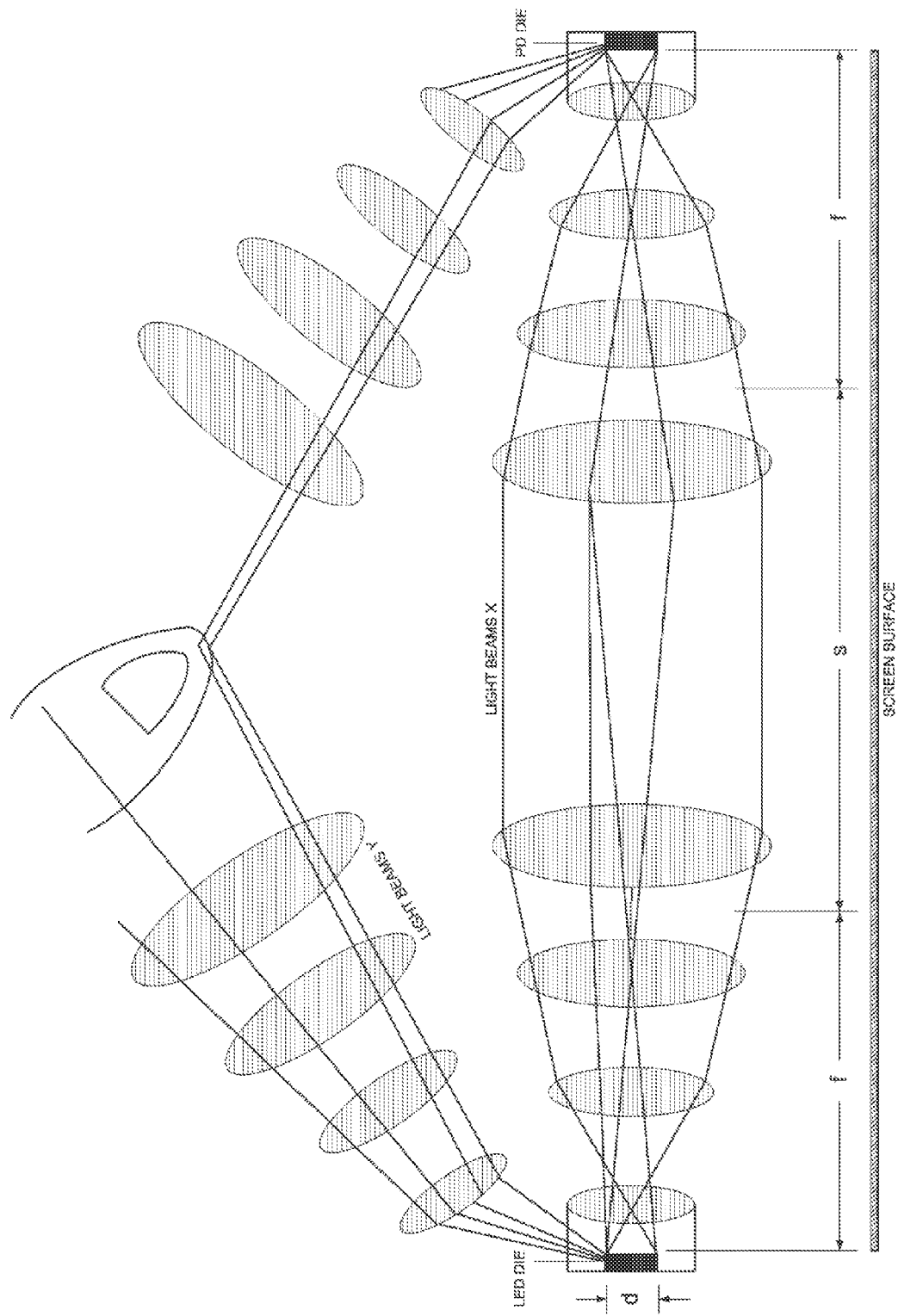
FIG. 25B is a diagram of a lens assembly for distributing two groups of light beams, in accordance with an embodiment of the present invention.

Reference is now made to in FIG. 25B, which is a diagram of a lens assembly for distributing two groups of light beams, denote by X and Y, in accordance with an embodiment of the present invention. Shown in FIG. 25B is a lens assembly aligned substantially parallel with the surface of the touch screen, and a second lens assembly skewed at an angle with the surface of the touch screen. The second lens assembly is arranged so that a finger or stylus positioned near the touch screen, reflects some or all of light beams Y to the PD receivers.

It will be appreciated by those skilled in the art that although FIGS. 25A and 25B illustrate convex lenses, concave and/or convex lenses may be used to achieve the dual foci.

The lens assembly shown in FIG. 25A is designed with the following objectives:
- as much as possible of the LED light arrives at the PD;
- as little as possible of the sounding background light arrives at the PD;
- the horizontal components of the light beams should be as wide as the distance between LEDs, which improves performance in interpolating position between light beams; and
- the vertical components of the light beams are limited by the height of a frame over the LCD screen.

Figure 26A:
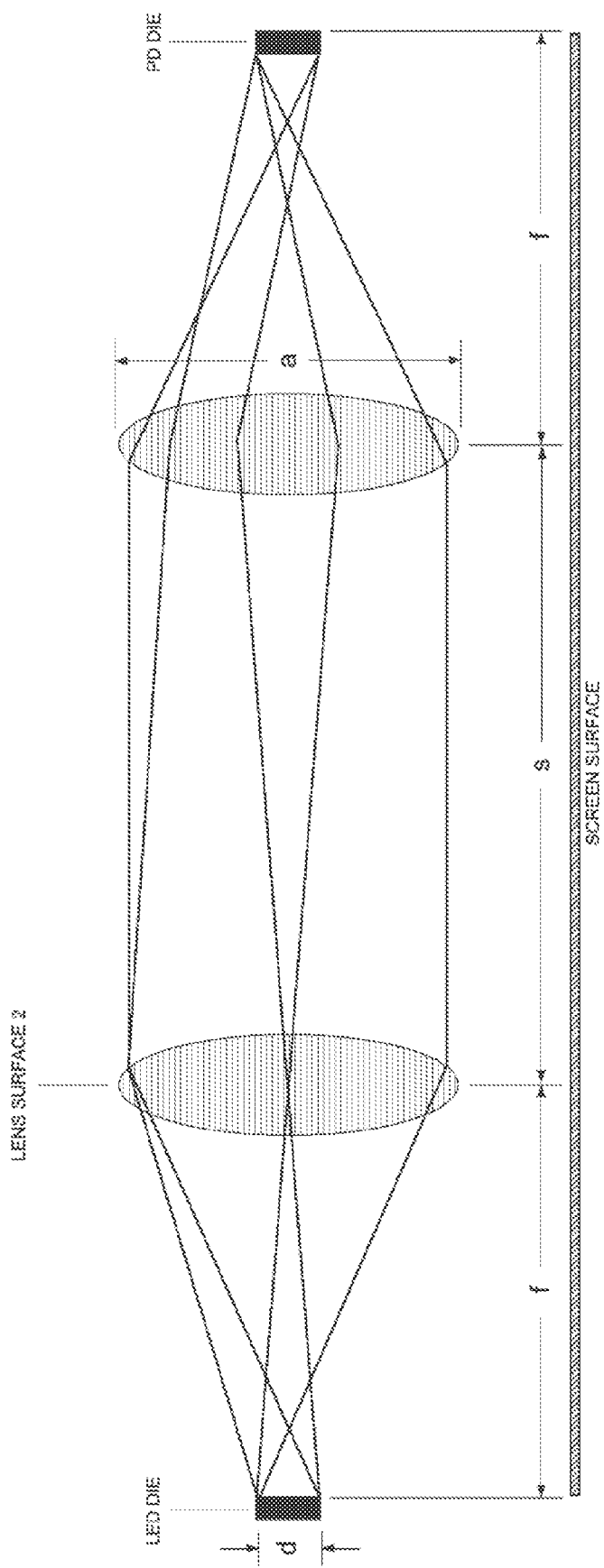
FIGS. 26A and 26B are diagrams of simplified lens assemblies corresponding to the respective lens assemblies of FIGS. 25A and 25B, in accordance with an embodiment of the present invention.
Figure 26B:
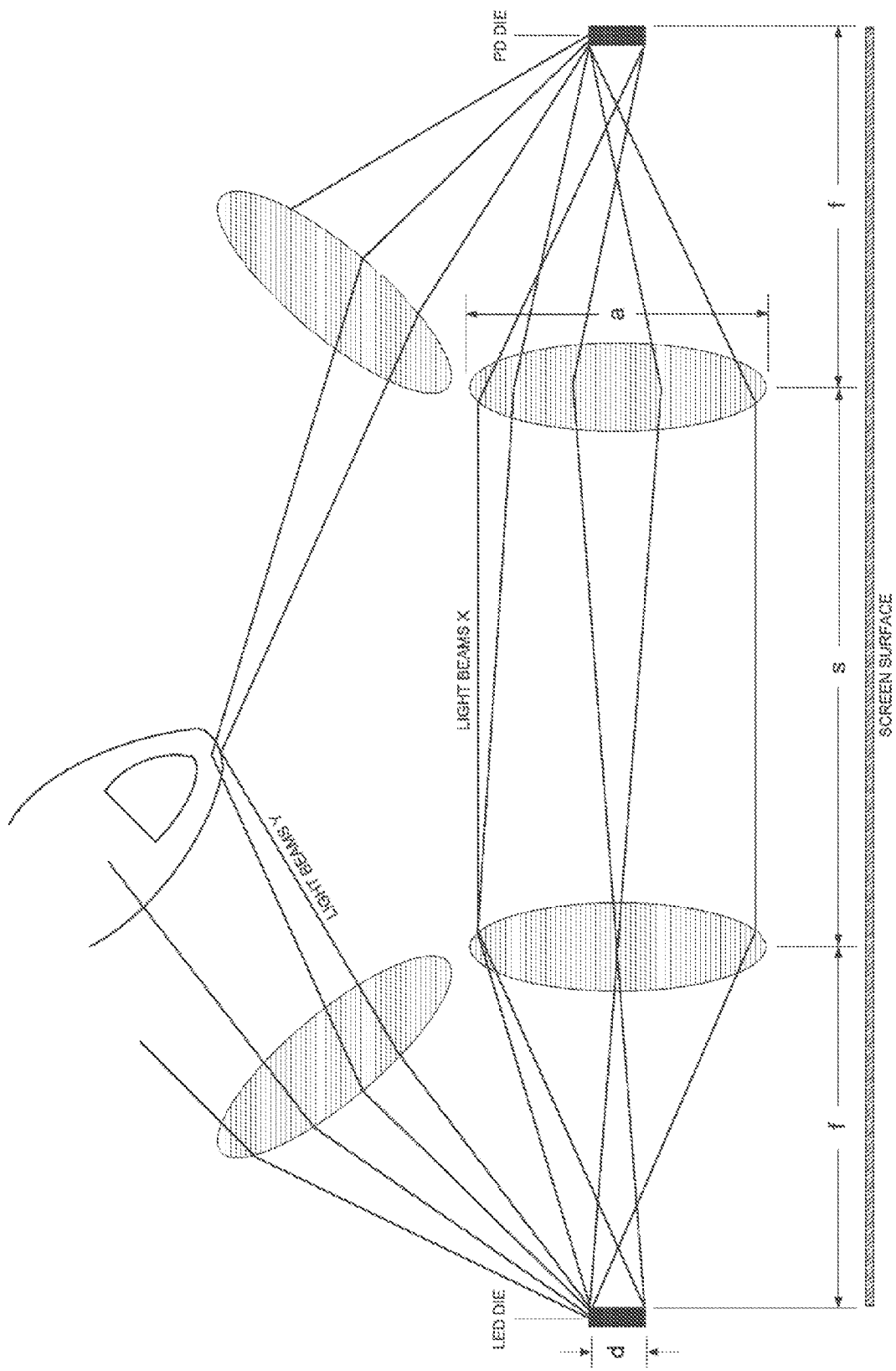

Reference is now made to FIGS. 26A and 26B, which are diagrams of simplified lens assemblies corresponding to the respective lens assemblies of FIGS. 25A and 25B, in accordance with an embodiment of the present invention. The simplified lens assembly in FIG. 26A resembles that of a camera lens, and is useful for determining LED and PD die sizes, denoted by d, focal length, denoted by f, PD lens aperture, denoted by a, and distance between LED and PD lens surfaces, denoted by s. The PD lens aperture is approximately equal to the distance between neighboring PDs and to the distance between neighboring LEDs. Ideally, the LED projects over the PD lens aperture, which corresponds to the relationship d/a=f/s. Sample design parameters for a horizontal lens and for a vertical lens are provided in TABLE II. It is noted that the horizontal and vertical foci are significantly different. Ideally, the horizontal and vertical foci are directed away from the LED center, and towards the target PD, so that all light emanating from the LED lens arrives at the PD.

TABLE II

Design parameters for touch screen optics

| parameter | symbol | horizontal lens | vertical lens |
|---|---|---|---|
| LED die size | d | 0.3 mm | 0.3 mm |
| PD die size | d | 0.3 mm | 0.3 mm |
| aperture | a | 5 mm | 1 mm |
| distance between LED and PD edges | s | 30 mm | 30 mm |
| focal length | f | 1.8 mm | 9 mm |

3. Applications of Touch Screen 100

Aspects of the present invention relate to applications for the touch screen described hereinabove. The ensuing discussion includes (i) user input based on finger motion, (ii) mobile phone handset, (ii) touch-screen as mouse-type input device for a computer, and (iii) touch-based storefront window.

i. User Input Based on Finger Motion

As indicated in FIGS. 6A and 6B, the output of PD receivers 140 is processed by controller 150, to determine, from the measured light intensities, if one or more objects are positioned over touch screen 100. The optical assembly of FIG. 25 enables measurements of light intensities at several heights above touch screen 100; i.e., three-dimensional measurements at various heights over the surface of the touch screen 100. In this regard, reference is now made to FIG. 27, which shows three-dimensional measurements of light intensities over the surface of touch screen 100, in accordance with an embodiment of the present invention. The top chart corresponds to measured light intensities at seven locations, when no finger is positioned on touch screen 100. The bottom left chart corresponds to measured light intensities at the seven locations, when a finger is positioned over touch screen 100. The bottom right chart also corresponds to measured light intensities when the finger is positioned over touch screen 100. The bottom right chart corresponds to measurements taken slight after the measurements used for the bottom left chart were taken. The difference in charts indicates that the finger is moving downward, closer to the touch screen. As a result, light intensity is being blocked at lower z-values, i.e., heights.

Figure 27:
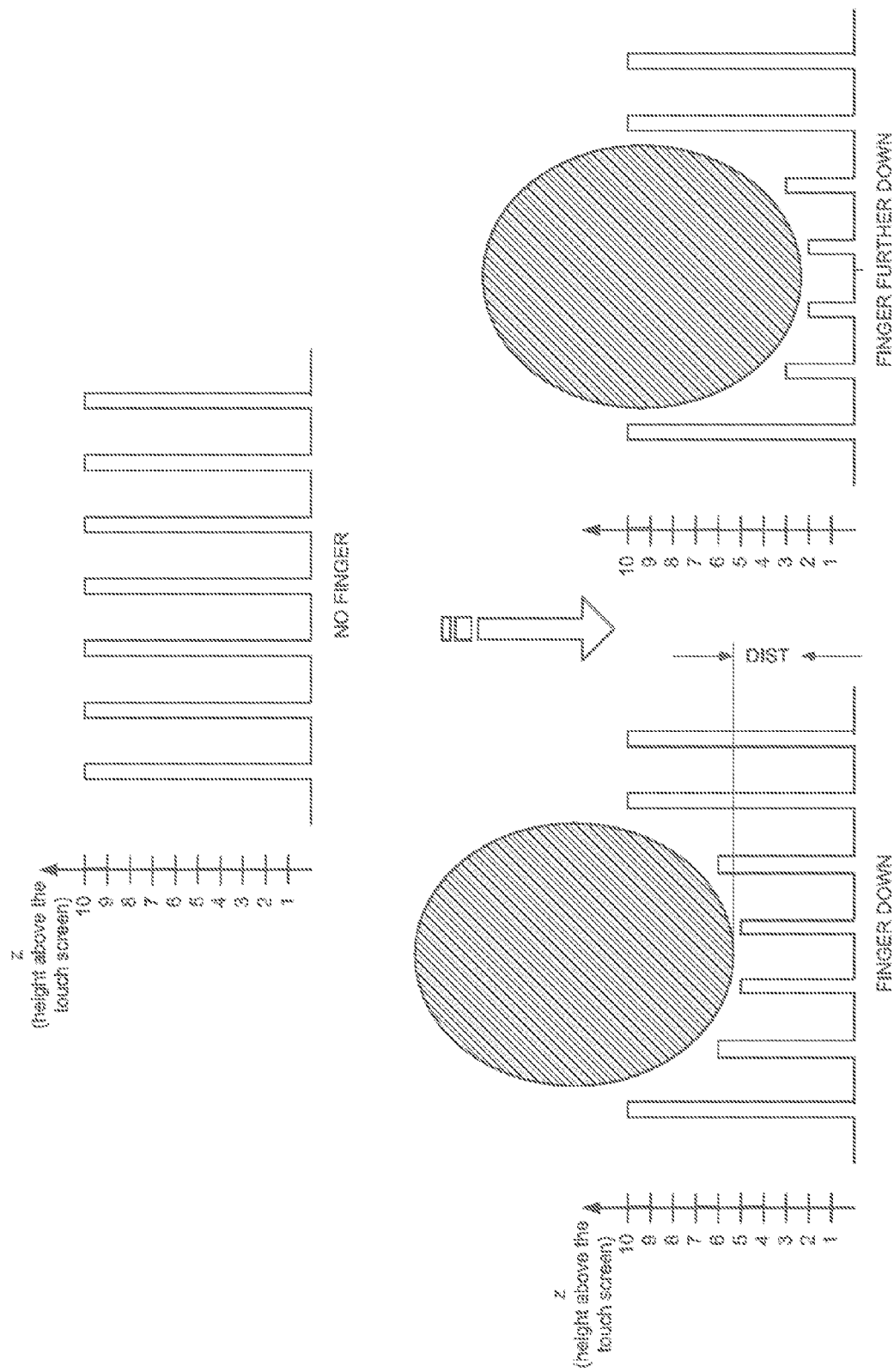
FIG. 27 shows three-dimensional measurements of light intensities over the surface of a touch screen, in accordance with an embodiment of the present invention.

It will thus be appreciated by those skilled in the art that the measurements of light intensities at various heights above touch screen 100 enables determination of both position and motion of an object on touch screen 100. Referring to FIG. 27, the distance between the finger positions from the bottom left chart and the bottom right chart, denoted by DIST, may be determined from the light intensity readings. Knowing the time difference between the measurements for the two charts enables determination of a finger velocity vector. If the velocity vector is substantially downward, then the magnitude of the velocity vector is an indication of how hard the finger is pressing on touch screen 100. If the velocity vector is substantially rightward, then the finger is making a rightward gesture.

By determining motion information, touch screen 100 is able to distinguish between a variety of user inputs, including inter alia tap, press, and directional finger gesture, and to process them accordingly.

Figure 28:
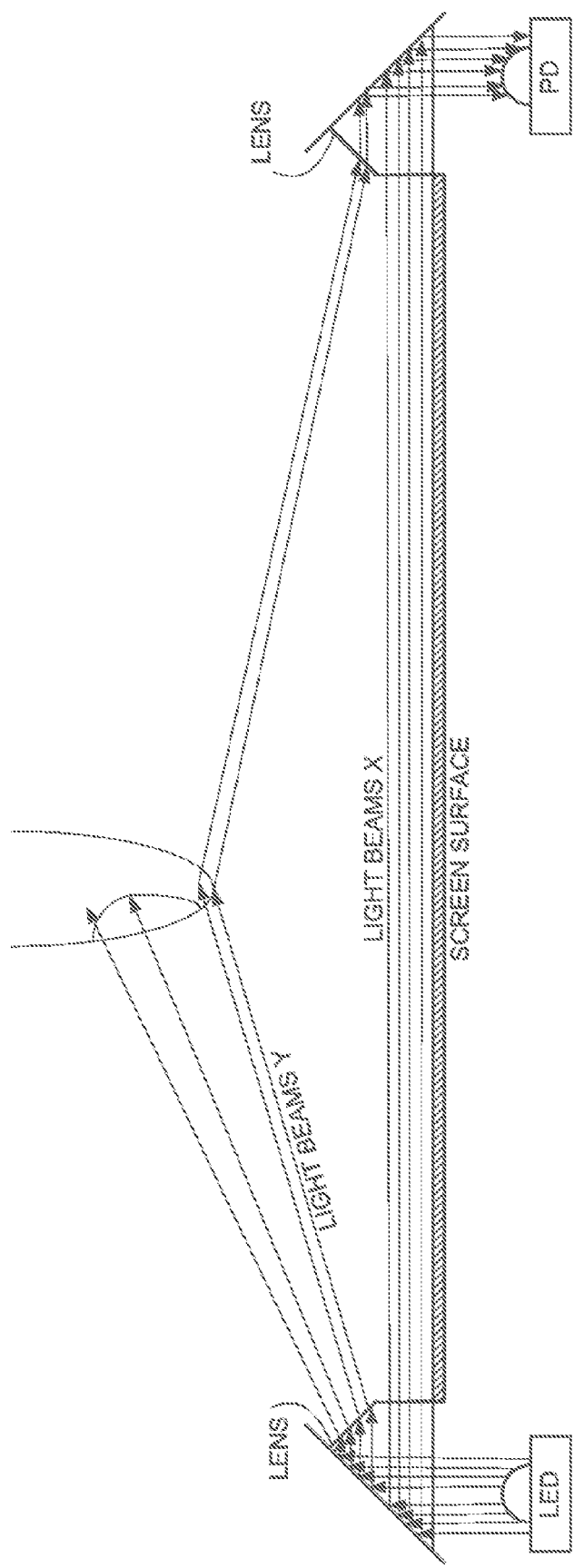
FIG. 28 is an illustration of a touch screen with three-dimensional sensing functionality, in accordance with an embodiment of the present invention.

Reference is now made to FIG. 28, which is an illustration of a touch screen with three-dimensional sensing functionality, in accordance with an embodiment of the present invention. Touch screen 100 functions as a three-dimensional sensor. Increases or decreases in light intensities measured by PD receivers are used to sense the presence of a finger or other object above the screen surface. As shown in FIG. 28, a lens or array of lenses, distributes light emitted by an LED in a plurality of directions. Two groups of light beams are identified in FIG. 28; namely, light beams denoted by X, which are directed along a plane substantially parallel to the screen surface, and light beams denoted by Y, which are directed diagonally across and upward to the screen surface.

When no object is near the screen surface, the PD receiver measures all of light beams X. When a finger or other object is positioned above the screen surface, it reflects a portion of light beams Y to the PD receivers, via a second lens or array of lenses. The PD receiver accordingly senses an increased light intensity corresponding to the sum of light beams X and Y. It will be appreciated by those skilled in the art that use of a reflective object, such as a silver pen, to point at the touch screen, enhances reflection of light beams Y.

Figure 29:
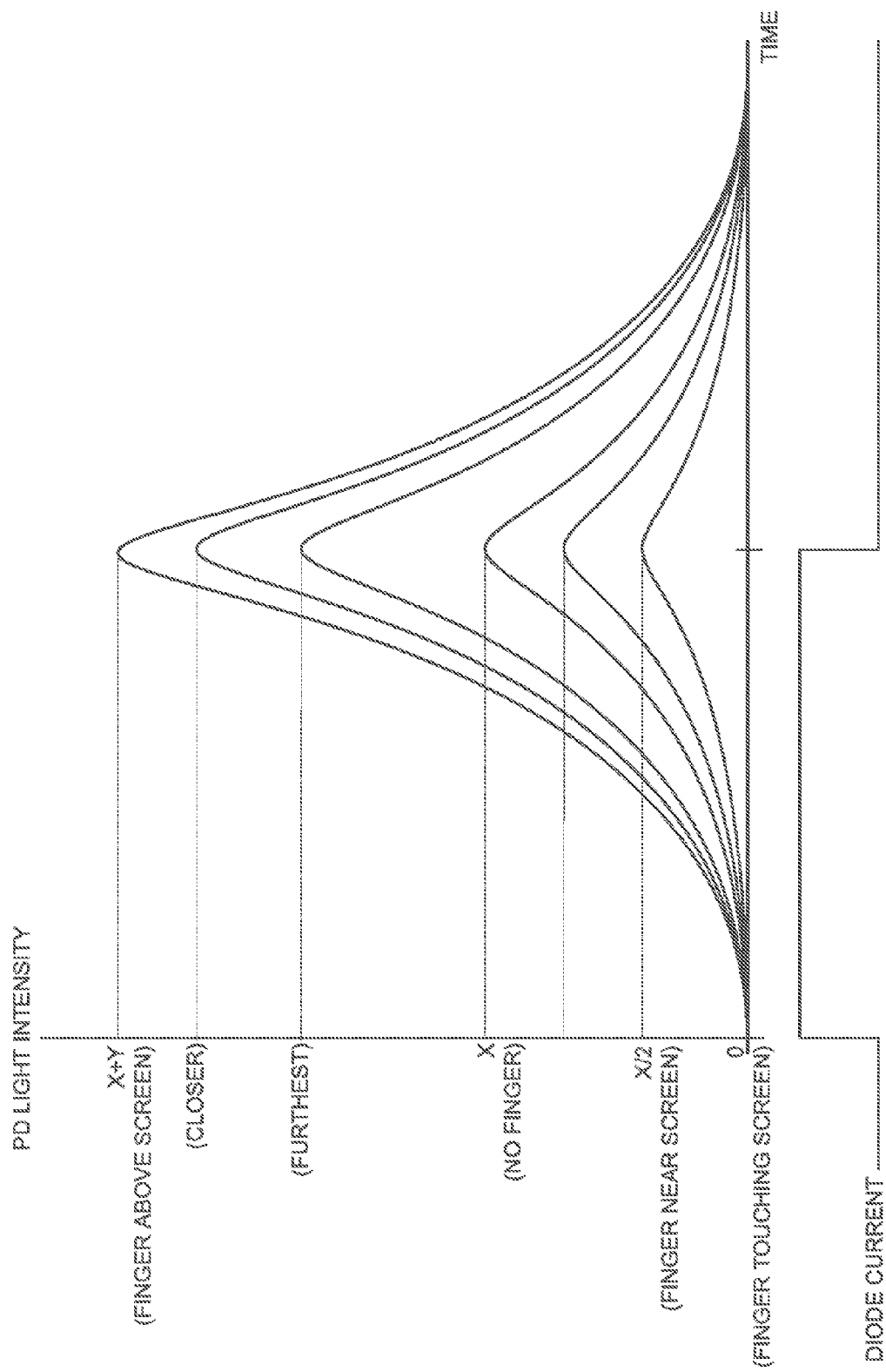
FIG. 29 is a graph illustrating different light intensities measured by a PD receiver corresponding to proximity of an object to a touch screen surface, in accordance with an embodiment of the present invention.

Reference is now made to FIG. 29, which is a graph illustrating different light intensities measured by a PD receiver corresponding to proximity of an object to a touch screen surface, in accordance with an embodiment of the present invention. The middle portion of the graph corresponds to light beams X, indicating that no object is obstructing light beams X, and none of light beams Y are reflected to the PD receiver. This portion of the graph is the default PD receiver intensity when no object is near the screen surface.

The signals shown in FIG. 29 rise and decline. When the PD current is activated, as shown at the bottom of FIG. 29, the signals rise. When the PD current is terminated, the signals decline.

The highest portion of the graph corresponds to a finger or object reflecting a large portion of light beams Y to the PD receiver. As the finger or object is moved closer to the screen surface, the magnitude of measured light intensity changes, based on the amount of light beams Y directed to the PD receiver by the finger or object. The effect of increasing intensity of reflected light beams Y is similar to the effect of increasing intensity when a finger is brought close to a light bulb. Namely, as the finger approaches the light bulb, the intensity of light on the fingertip increases; i.e., more light is reflected by the fingertip.

When a finger or object is brought very close to the screen surface such that it blocks a portion of light beams X, the measured light intensity at the PD receiver drops to below its default value, and approaches zero as the object touches the screen and substantially completely blocks light beams X. Referring back to FIGS. 25A, 26A and 27 it is seen that the light intensity detected by a PD receiver is a function of a finger's proximity to the screen surface, when the finger blocks a portion of light beams X.

ii. Mobile Phone Handsets

The touch screens of the present invention are particularly suitable for small mobile phones. Phones that have these touch screens do not required keypads, since the screens themselves may serve as touch-based keypads. The touch screens serve as input devices, for receiving touch-based user inputs, and as output devices, for displaying data generated by a phone modem.

US Publication No. 2008/007533 A1 entitled INFORMATION MANAGEMENT SYSTEM WITH AUTHENTICITY CHECK by Ericson et al. describes a system for identifying the location of a pen above a sheet of paper, whereby the pen includes a camera that captures images of a varying pattern on the sheet of paper. A computer unit analyzes a captured image and determines therefrom the location of the pen. Further, by analyzing a sequence of images captured by the camera as the pen is moved over the pattern, the computer unit identifies strokes made by the pen.

In one embodiment, the present invention provides a similar system for a touch screen. Instead of providing a pattern on a sheet of paper, a light pattern is projected over the touch screen. When a finger or other object is positioned above the touch screen, the finger or other object reflects a portion of the projected light pattern. Only the reflected portion of the projected pattern is substantially visible.

A camera communicatively coupled with the touch screen captures an image of space above the touch screen. The captured image shows the pattern reflected by the finger or other object. The captured image is transmitted to a controller that determines the location of the finger or other object over the touch screen by analyzing the captured image. Further, by providing a sequence of images captured as the finger or other object moves over the touch screen, the controller identifies a stroke or gesture made by the finger or other object.

Figure 30A:
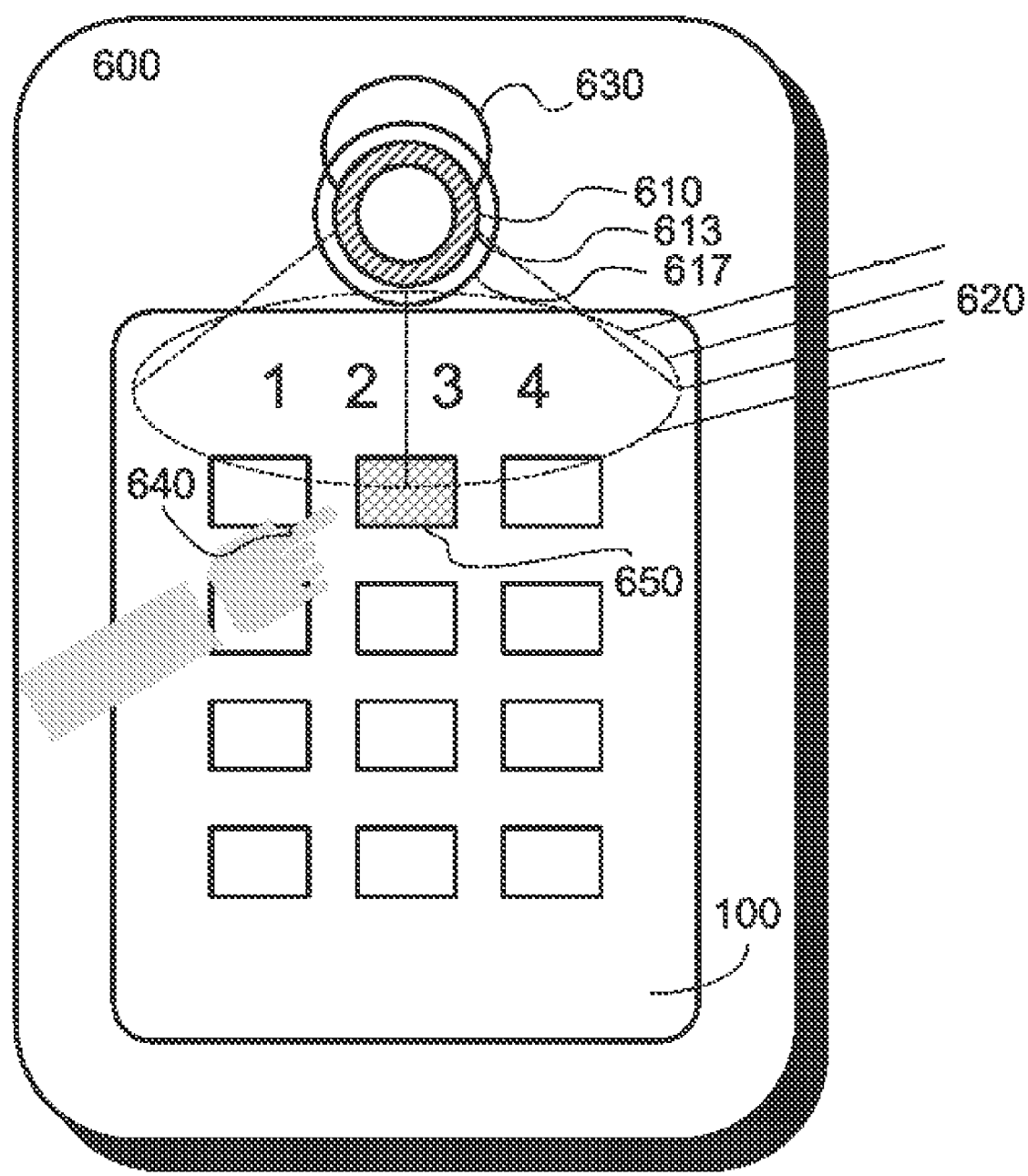
FIG. 30A is a simplified illustration of a handset with a touch screen, in accordance with an embodiment of the present invention.

Reference is now made to FIG. 30A, which is a simplified illustration of a handset 600 with a touch screen 100, in accordance with an embodiment of the present invention. Handset 600 includes a projector 610, a barrier 613 that blocks portions of light projected by projector 610, and a lens 617 that spreads the light over a specific angle, denoted by θ. Barrier 613 may be implemented as an etched metal plate that only allows light to penetrate through the etched openings. Barrier 613 may alternatively be implemented as a material that has transparent portions and non-transparent portions. The transparent portions may be in the form of digital, letters, dots, or such other shape. Barrier 613 may alternatively be a grating, with openings through which light projected by projector 610 passes. When projector 610 projects light at barrier 613, a light pattern 620 is generated above touch screen 100.

Handset 600 further includes a camera 630 which captures images of projected pattern 620. When an object, such as a user's finger 640, is within range of projected pattern 620, portions of pattern 620 are reflected by finger 640. In turn, the images captured by camera 630 show the reflected portions of pattern 620, from which distance and position information of finger 640 is derived. Since finger 640, or such other reflecting object such as a stylus or pen, is not a flat surface, the reflected portion of pattern 620 is warped or otherwise distorted when viewed from an angle other than the angle of projection. By aligning camera 630 with projector 610, the images of finger 640 are captured at substantially the angle of projection, as a result of which the reflected portion of pattern 620 is not significantly distorted.

Figure 30B:
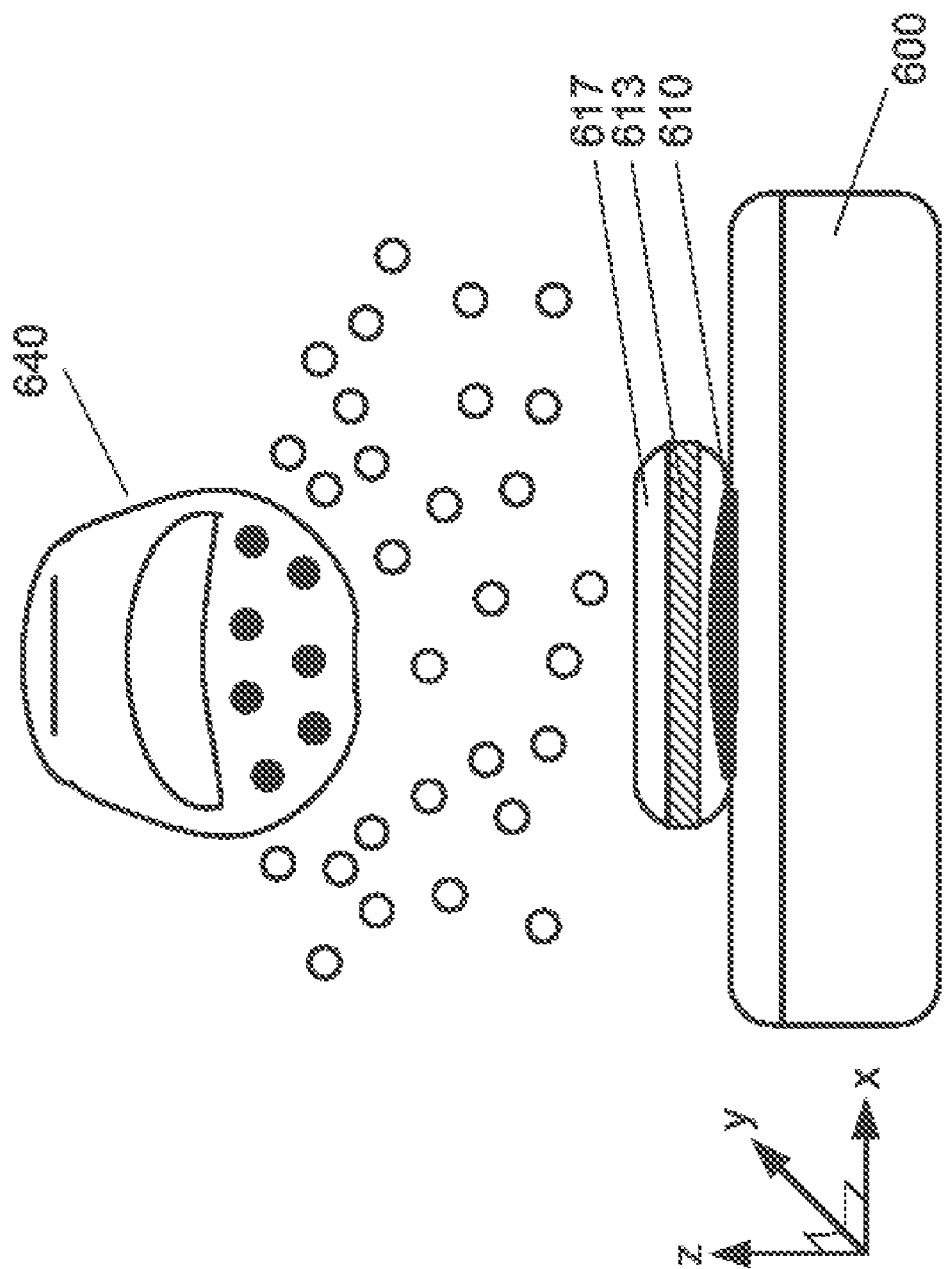
FIG. 30B is a simplified illustration of a pattern of dots projected into the space above a touch screen, in accordance with an embodiment of the present invention.

Reference is now made to FIG. 30B, which is a simplified illustration of a pattern of dots projected into the space above screen 100, in accordance with an embodiment of the present invention. The pattern of dots shown in FIG. 30B may be generated by a barrier 613 that is implemented as a metal plate having holes etched therein. A portion of the dot pattern, shown as black dots, is reflected by finger 640; and a portion of the dot pattern, shown as white dots, is not reflected by finger 640. By analyzing the pattern of dots reflected by finger 640, the touch screen controller determines the three-dimensional position of finger 640 relative to touch screen 100.

Finger 640 in FIG. 30B reflects a pattern of seven dots. As finger 640 moves to the right or to the left, different dot patterns appear on finger 640, based on the dots shown in FIG. 30B to the right and to the left of finger 640, respectively. Similarly, when finger 640 moves up or down, different dot patterns appear on finger 640, based on the absence of dots above finger 640 and the dots shown below finger 640. As such, the dot pattern on finger 640 determines the height of finger 640 above touch screen 100, along the z-axis, and the position of finger 640 along the width of touch screen 100, along the x-axis.

The position of finger 640 along the length of touch screen 100, along the y-axis, is determined from the scale of the image reflected by finger 640 or, equivalently, by the sizes of the elements of the projected pattern. Since projector 610 projects the pattern across a wide angle, as shown in FIG. 30A, the closer finger 640 is to projector 610, the denser is the reflected pattern. As such, the density of the reflected image determines the distance between finger 640 and projector 610. In turn, this distance determines the position of finger 640 along the length of touch screen 100, along the y-axis.

Figure 30C:
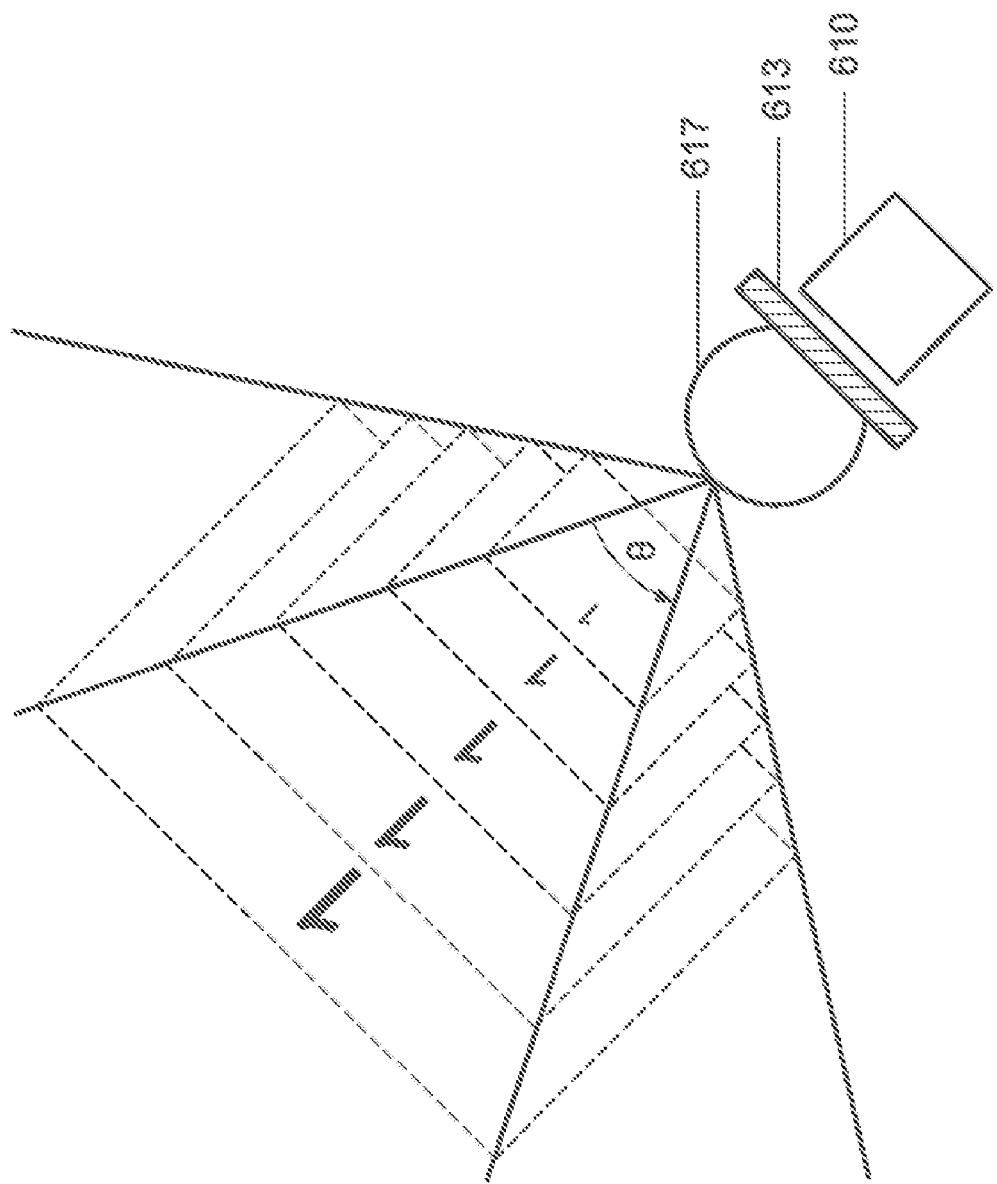
FIG. 30C is a simplified illustration showing how the density of a pattern projected by a projector in the space above a touch screen, and reflected by an object, is dependent upon the distance of the object from a projector, in accordance with an embodiment of the present invention.

Reference is now made to FIG. 30C, which is a simplified illustration showing how the density of pattern 620 projected by projector 610 in the space above touch screen 100, and reflected by finger 640, is dependent upon the distance of finger 640 from projector 610, in accordance with an embodiment of the present invention. It is noted that the reflected pattern 620, signified in FIG. 30C by a "1" digit, scales larger the further it is from projector 610. The protected pattern 620 is spread over an angle θ by lens 617. The angle θ and the sizes of the captured pattern elements are used to determine the distance of the reflected pattern 620 from projector 610.

In an alternative embodiment of the present invention, a second projector and barrier is situated along a second edge of touch screen 100. The two sets of relative (x, z) position coordinates of finger 640, determined by the two cameras, suffice to determine the y coordinate of finger 640.

In accordance with an embodiment of the present invention, the distance and position information of finger 640 is used to further derive the location 650 on touch screen 100 where finger 640 is aimed. Touch screen 100 highlights location 650 so that a user can see the location to which finger 640 is aimed, and to adjust the position of finger 640 if necessary.

Figure 30D:
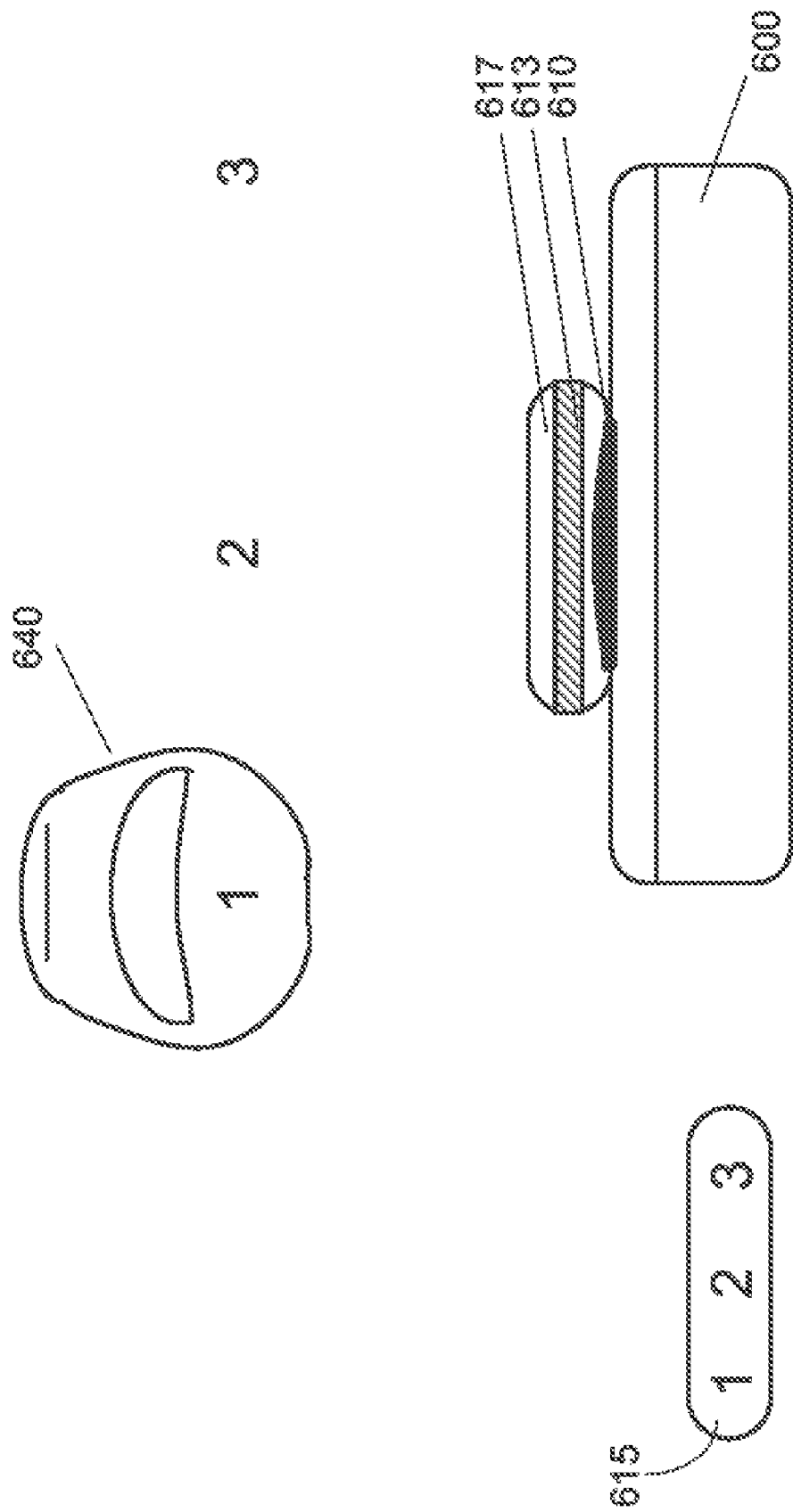

Reference is now made to FIG. 30D, which is a simplified illustration of a pattern of digits projected into the space above screen 100, in accordance with an embodiment of the present invention. The pattern of digits shown in FIG. 30D may be generated by a barrier 613 that is implemented as a metal plate having the digits "1", "2" and "3" etched thereon lithographically, or by such other etching process. When projector 610 projects light at barrier 613, the digits "1", "2" and "3" are projected above screen 100. When finger 640 is positioned over screen 100 to the left of projector 610, as shown in FIG. 30D, the digit "1" appears on the finger, and is captured by camera 630. The digits "2" and "3" are not visible.

Similarly, when finger 640 is positioned in front of projector 610 (not shown), the digit "2" appears on the finger, and is captured by camera 630; and when finger 640 is positioned to the right of projector 610 (not shown), the digit "3" appears on the finger, and is captured by camera 630.

Reference is now made to FIG. 30E, which is a simplified illustration of another pattern of digits projected into the space above screen 100, in accordance with an embodiment of the present invention. The pattern of digits shown in FIG. 30E may be generated by a barrier 613 that is implemented as a metal plate having two rows of digits etched thereon. When projector 610 projects light through barrier 613, the digits "1", "2" and "3" are projected closer to the surface of screen 100, and the digits "4", "5" and "6" are projected further from the surface of screen 100. When finger 640 is positioned over screen 100 to the upper left of projector 610, as shown in FIG. 30E, the digit "4" appears on finger 640, and is captured by camera 630. The remaining digits are invisible.

Similarly, when finger 640 is positioned over screen 100 to the lower left of projector 610 (not shown), the digit "1" appears on finger 640, and is captured by camera 630.

FIGS. 30B-30E illustrate that the location of finger 640 relative to touch screen 100 is determined by analyzing images captured by camera 630. As the number of unique patterns, such as digits, is increased in barrier 613, the position of finger 640 may be determined more accurately.

iii. Touch Screen as Mouse-Type Input Device for a Computer

Figure 31:
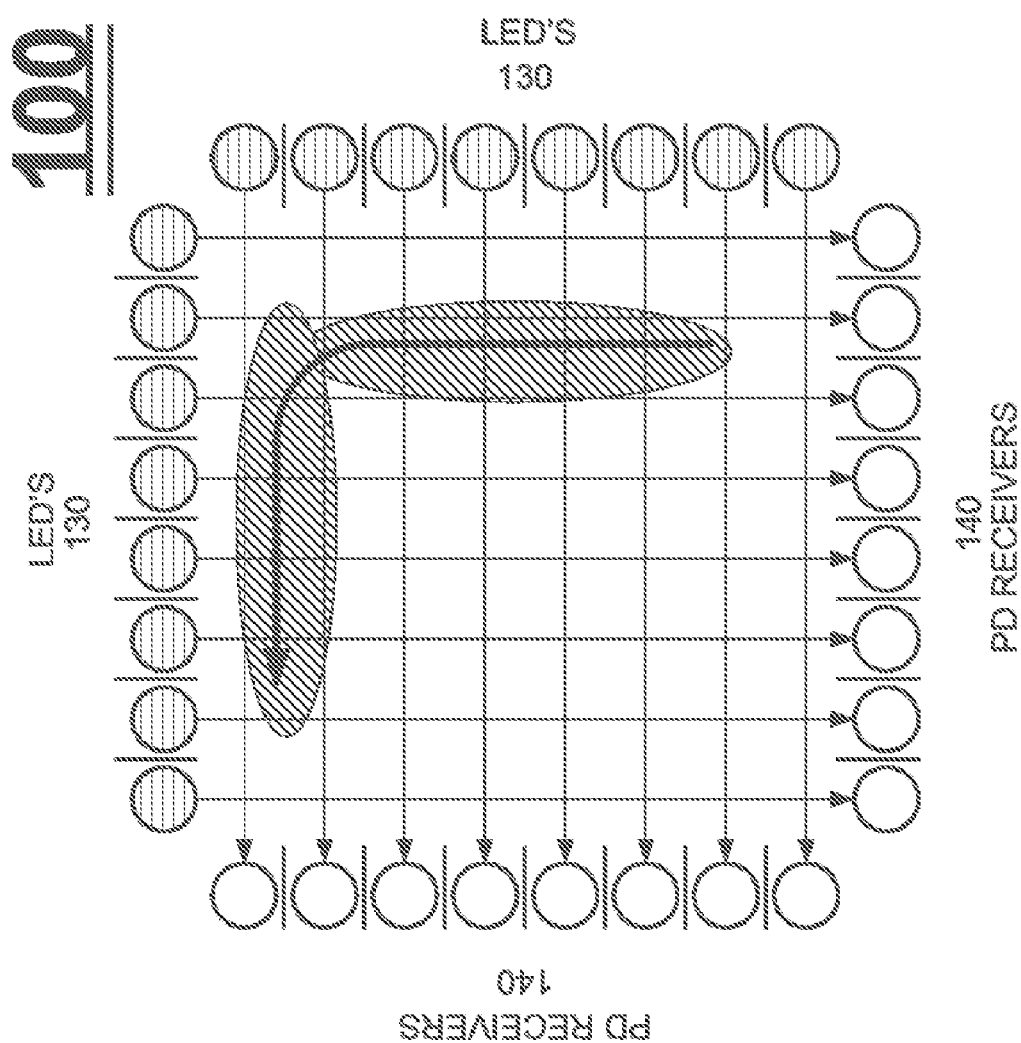
FIG. 31 is an illustration of use of a touch screen for processing finger motions as input to a computer, in accordance with an embodiment of the present invention.

Aspects of the present invention apply to a touch screen which serves as a mouse-type input device for a computer. Reference is now made to FIG. 31, which is an illustration of use of touch screen 100 for processing finger motions as input to a computer, in accordance with an embodiment of the present invention. Shown in FIG. 31 is a finger motion that is detected by touch screen 100. Controller 150 (FIGS. 6A and 6B) recognizes the finger motion and converts the motion to mouse pointer coordinates, for input to a computer. Thus it may be appreciated that touch screen 100 is able to emulate mouse movement.

Additionally, left and right mouse clicks may also be emulated by displaying two objects on touch screen 100. Touching a first one of the objects corresponds to a left mouse click, and touching a second one of the objects corresponds to a right mouse click.

Further single and double clicking may be emulated by velocities of approach of touch screen 100. As described above with respect to FIG. 27, measurement of light intensities at different heights above touch screen 100 enables determination of finger velocity. A slow approach, made by a light tap, corresponds to a single click, and a fast approach, made by a hard press, corresponds to a double click.

Referring to FIG. 31, it will be appreciated by those skilled in the art that the path of finger motion shown involves relative motion between a finger and touch screen 100. The path shown may be generated by a moving finger and a stationary touch screen. It may also be generated by a moving touch screen and a stationary finger, or other stationary object.

As such, a dual embodiment of the present invention operates by moving touch screen 100 over a stationary object. The relative motion of touch screen 100 generates the path shown in FIG. 31 and, in turn, the path information is converted into mouse coordinates.

iv. Touch-Based Storefront Window

Aspects of the present invention relate not only to use of touch-based position and motion information for input to a computing device, but also to use of this information for data processing purposes. In general, the sensed position and motion information for touch screen 100 may be transmitted to a data processor for further analysis. An application of such data processing is a touch-sensitive interactive storefront window, which enables passersby to interact with a display showcase or a video display. The storefront window system responds to passersby touch inputs, and also records and analyzes their touch inputs.

Figure 32:
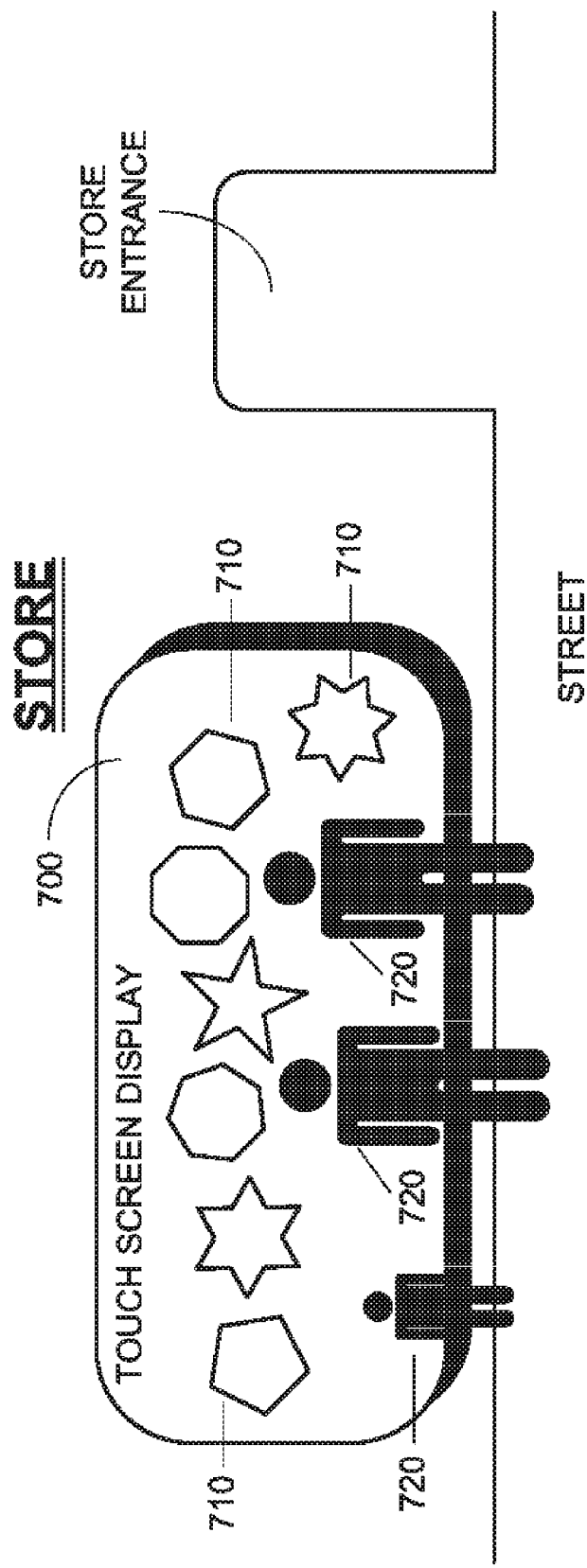
FIG. 32 is a simplified illustration of a touch sensitive display case containing items of merchandise, in accordance with an embodiment of the present invention.

In this regard, reference is now made to FIG. 32, which is a simplified illustration of a touch sensitive display case 700 containing items of merchandise 710, in accordance with an embodiment of the present invention. In accordance with an embodiment of the present invention, the perimeter of an opening in the display case is fitted with light sensors and light emitters, thereby providing the display case with touch screen functionality. Additionally, display case 700 includes mechanical apparatus to automatically move, rotate or otherwise manipulate a displayed item 710, in response to a passerby 720 touching the display case at a location corresponding to the displayed item.

A passerby 720 may interactively manipulate selected items by touching and making gestures with his finger on display case 700. For example, touching display case 700 causes a corresponding item 710 to be selected. A rotating gesture on display case 700 causes item 710 to be rotated. A swipe on display case 700 in one direction causes item 710 to be moved closer to passerby 720, and a swipe in display case 700 in the opposite direction causes item 710 to be moved away from passerby 720. An x-shaped gesture on display case 700 causes item 710 to be de-selected.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A light-based touch surface for an electronic device, comprising:
    a housing that exposes an upper surface of an encased component that enables user input to an electronic device;
    a plurality of infra-red light emitting diodes (LEDs), situated inside said housing below the upper surface of the encased component, for generating light beams;
    at least one LED selector, fastened on said housing and connected with said LEDs, for controllably selecting and deselecting one or more of said LEDs;
    a plurality of photodiode (PD) receivers, situated inside said housing below the upper surface of the encased component, for generating output currents in accordance with received light beam intensities;
    at least one PD selector, fastened on said housing and connected with said PD receivers, for controllably selecting and deselecting one or more of said PD receivers;
    a first lens, fastened on said housing and in contact with the upper surface of the encased component, for projecting and distributing light beams generated by said LEDs above and across the upper surface at a plurality of heights above the upper surface;
    a second lens, fastened on said housing and in contact with the upper surface of the encased component, for collecting and directing the light beams projected and distributed by said first lens onto said PD receivers; and
    a controller, fastened on said housing and coupled with said at least one LED selector, with said at least one PD selector and with said PD receivers, (i) for controlling said at least one LED selector, (ii) for controlling said at least one PD selector, and (iii) for detecting position of an object by measuring light intensities at various heights above the upper surface of the encased component, based on the resulting output currents of said PD receivers.

2. The touch surface of claim 1 wherein the encased component is rectangular, wherein said LEDs are fastened along two adjacent edges of the encased component, and wherein said PD receivers are fastened along two other adjacent edges of the encased component.

3. The touch surface of claim 1 wherein the encased component is rectangular, and wherein each LED is fastened near a corner of said encased component.

4. The touch surface of claim 1 wherein said at least one LED selector generates a bit string for a shift register, and wherein each bit position of the shift register is mapped to a corresponding LED, whereby the bit at that position indicates whether to select or to deselect the corresponding LED.

5. The touch surface of claim 1 wherein said at least one PD selector generates a bit string for a shift register, and wherein each bit position of the shift register is mapped to a corresponding PD receiver, whereby the bit at that position indicates whether to select or to deselect the corresponding PD receiver.

6. The touch surface of claim 1 further comprising a multiplexer coupled with said PD receivers and with said controller, for selecting one PD output current from a group of PD output currents, based on control signals received from said controller.

7. The touch surface of claim 1 further comprising a resistance based current integrator for biasing and sampling the output currents entering said controller from said PD receivers.

8. The touch surface of claim 1 further comprising a transistor based current integrator for biasing and sampling the output currents entering said controller from said PD receivers.

9. The touch surface of claim 1 further comprising a transistor based filter and amplifier for sensing and amplifying the output currents entering said controller from said PD receivers.

10. The touch surface of claim 1 further comprising an operational amplifier based filter and amplifier for converting the PD receiver output currents to voltages, and for amplifying the voltages.

11. A light-based method for providing user input to an electronic device, comprising:
    providing a user interface component encased in an electronic device and having an exposed upper surface;
    controlling a plurality of light-emitting diodes (LEDs) situated inside the electronic device below the upper surface of the encased component, to select and deselect at least one of the LEDs, whereby a selected LED emits infra-red light beams into a first lens in contact with the upper surface, and whereby the first lens projects and distributes light beams emitted by the selected LED above and across the upper surface at a plurality of heights above the upper surface;
    controlling a plurality of photodiode (PD) receivers situated inside the electronic device below the upper surface of the encased component, to select and deselect at least one of the PD receivers, whereby at least a portion of the light beams projected and distributed by the first lens are collected and directed onto a selected PD by a second lens in contact with the upper surface, and whereby the selected PD generates output currents in accordance with a light intensity of the light beams collected and directed by the second lens; and
    determining position of an object by measuring light intensities at various heights above the upper surface of the encased component, based on the resulting output currents of the selected PD receiver.

12. The method of claim 11 wherein said controlling a plurality of LEDs comprises generating a bit string for a shift register, wherein each bit position of the shift register is mapped to a corresponding LED, whereby the bit at that position indicates whether to select or to deselect the corresponding LED.

13. The method of claim 11 wherein said controlling a plurality of PD receivers comprises generating a bit string for a shift register, wherein each bit position of the shift register is mapped to a corresponding PD receiver, whereby the bit at that position indicates whether to select or to deselect the corresponding PD receiver.

14. The method of claim 11 further comprising applying linear amplification to the output currents of the selected PD receiver prior to said determining.

15. The method of claim 11 further comprising compensating for ambient light by adding a plurality of PD output signals when an LED is turned on and subtracting therefrom a plurality of PD output signals when an LED is turned off.

16. The method of claim 11 further comprising sampling the output currents of the plurality of selected PD receiver prior to said determining, the sampling comprising:
- turning off a transistor to begin current integration within a capacitor;
- turning on a sample and hold circuit at a pre-designated amount of time after said turning off the transistor;
- turning off the sample and hold circuit at a pre-designated amount of time after said turning on the sample and hold circuit;
- measuring a charge in the capacitor; and
- turning on the transistor to discharge the capacitor.

17. The touch surface of claim 1 wherein said controller determines the position of the object based on output currents that are lower than baseline output currents.

18. The touch surface of claim 1, wherein the encased component is a display, wherein said controller further determines a location of the object relative to the upper surface of the encased component based on the output currents, and wherein said controller generates an indication on the display corresponding to the determined location.

19. The touch surface of claim 1 wherein, when the object approaches the upper surface of the encased component by a user gesture, said controller further determines a velocity of the object in a direction perpendicular to the upper surface, based on a sequence of progressively decreasing output currents.

20. The touch surface of claim 19, wherein said controller generates a first user gesture input instruction in response to said controller determining a high velocity of the object in a direction perpendicular to the upper surface, and generates a second user gesture input instruction in response to said controller determining a low velocity of the object in a direction perpendicular to the upper surface.

21. The touch surface of claim 1 wherein said controller detects the position of the object based on output currents that are greater than baseline output currents.

22. The touch surface of claim 1 wherein, when the object approaches the upper surface, said controller determines a plurality of object positions over time based on a sequence of output currents of said PD receivers, wherein a first portion of the sequence comprises output currents that are greater than baseline output currents, and a second portion of the sequence comprises output currents that are lower than the baseline output currents.

23. The touch surface of claim 22, wherein said controller further determines a position and a velocity of the object in a direction perpendicular to the upper surface of the encased component, based on the determined plurality of object position.

24. The touch surface of claim 1, wherein said controller detects positions of two objects situated at different heights above the upper surface of the encased component, based on the output currents of said PD receivers.

25. The method of claim 11 wherein said determining the position of the object is based on output currents that are lower than baseline output currents.

26. The method of claim 11 wherein said determining the position of the object is based on output currents that are greater than baseline output currents.

27. The method of claim 11 wherein said determining determines multiple positions of the object over time, based on a sequence of output currents of selected PD receivers, wherein a first portion of the sequence comprises output currents that are greater than baseline output currents, and a second portion of the sequence comprises output currents that are lower than the baseline output currents.

28. The method of claim 11 wherein said determining determines respective positions and respective velocities of two objects concurrently situated at different heights above the upper surface of the encased component, based on a sequence of output currents of selected PD receivers.

29. The method of claim 11, wherein the encased component is a display surface, wherein said controller further determines a position of the object relative to the upper surface of the encased component, and further comprising generating an indication on the display corresponding to the determined position of the object.

30. The method of claim 11, further comprising:
- determining a velocity of the object in a direction perpendicular to the upper surface of the encased component based on a sequence of output currents of selected PD receivers;
- generating a first user gesture input instruction in response to determination of a high velocity of the object in a direction perpendicular to the upper surface; and
- generating a second user gesture input instruction in response to determination of a low velocity of the object in a direction perpendicular to the upper surface.

31. The surface of claim 1 wherein the determined position of the object corresponds to a relative amount of current in at least one of the output currents, relative to a baseline amount of current.

32. The surface of claim 31 wherein the controller determines multiple positions of the object over time, and determines a velocity of the object therefrom.

33. The surface of claim 32 wherein the multiple determinations over time differ from each other in the relative amounts of current.

34. The method of claim 11 wherein the determined position of the object corresponds to a relative amount of current in at least one of the output currents, relative to a baseline amount of current.

35. The method of claim 34 wherein said determining determines multiple positions of the object over time, and determines a velocity of the object therefrom.

36. The method of claim 35 wherein the multiple determinations over time are based on differences in the relative amounts of current.

37. A light-based touch surface for an electronic device, comprising:
- a housing that exposes an upper surface of an encased component that enables user input to an electronic device;
- a plurality of infra-red light emitting diodes (LEDs), situated inside said housing alongside the encased component, for generating light beams;
- at least one LED selector, fastened on said housing and connected with said LEDs, for controllably selecting and deselecting one or more of said LEDs;
- a plurality of photodiode (PD) receivers, situated inside said housing alongside the encased component, for generating output currents in accordance with received light beam intensities;
- at least one PD selector, fastened on said housing and connected with said PD receivers, for controllably selecting and deselecting one or more of said PD receivers;
- a first lens fastened on said housing and in contact with the upper surface of the encased component, for projecting and distributing light beams generated by said LEDs above and across the upper surface at a plurality of heights above the upper surface;

a second lens fastened on said housing and in contact with the upper surface of the encased component, for collecting and directing the light beams projected and distributed by said first lens onto said PD receivers; and a controller, fastened on said housing and coupled with said at least one LED selector, with said at least one PD selector and with said PD receivers, (i) for controlling said at least one LED selector, (ii) for controlling said at least one PD selector, and (iii) for detecting position of an object by measuring light intensities at various heights above the upper surface of the encased component, based on the resulting output currents of said PD receivers.

38. The surface of claim 37 wherein the determined position of the object corresponds to a relative amount of current in at least one of the output currents, relative to a baseline amount of current.

39. The surface of claim 38 wherein the controller determines multiple positions of the object over time, and determines a velocity of the object therefrom.

* * * * *